United States Patent
Mitola, III

(10) Patent No.: US 9,519,804 B2
(45) Date of Patent: Dec. 13, 2016

(54) DOMAIN-SPECIFIC HARDWIRED SYMBOLIC MACHINE THAT VALIDATES AND MAPS A SYMBOL

(71) Applicant: Hackproof Technologies Inc., St. Augstine, FL (US)

(72) Inventor: Joseph Mitola, III, Saint Augustine, FL (US)

(73) Assignee: Hackproof Technologies, Inc., Cocoa Beach, FL (US)

( * ) Notice: Subject to any disclaimer, the term of this patent is extended or adjusted under 35 U.S.C. 154(b) by 643 days.

(21) Appl. No.: 13/799,277

(22) Filed: Mar. 13, 2013

(65) Prior Publication Data

US 2014/0223561 A1    Aug. 7, 2014

Related U.S. Application Data

(60) Provisional application No. 61/760,913, filed on Feb. 5, 2013.

(51) Int. Cl.
| | |
|---|---|
| *G06F 21/71* | (2013.01) |
| *G06F 21/56* | (2013.01) |
| *G06F 21/76* | (2013.01) |
| *G06F 11/00* | (2006.01) |
| *H04L 29/08* | (2006.01) |

(52) U.S. Cl.
CPC .............. *G06F 21/71* (2013.01); *G06F 11/00* (2013.01); *G06F 21/56* (2013.01); *G06F 21/76* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,875,227 | B2 * | 10/2014 | Kundu | ................ G06F 21/6245 707/822 |
| 2011/0302397 | A1 | 12/2011 | Mitola, III | |
| 2012/0131316 | A1 | 5/2012 | Mitola, III et al. | |

OTHER PUBLICATIONS

Perkowski, Marek Andrzej, "Learning Hardware," Jun. 24, 2010, retrieved from http://web.cecs.pdx.edu/mperkows/CLASS_VHDL_99/tran888/lecture008-learning-hardware.pdf, retrieved Jun. 13, 2014, pp. 1-119.

(Continued)

*Primary Examiner* — Kenneth Kim
(74) *Attorney, Agent, or Firm* — Banner & Witcoff, Ltd.

(57) ABSTRACT

A domain-specific hardwired symbolic machine is disclosed that processes information via the flexible formation and hardwired mapping of symbols from one or more domains onto other such domains, computing and communicating with improved security because it has no CPU, no Random Access Memory (RAM), no instruction registers, no Instruction Set Architecture (ISA), no operating system (OS) and no applications programming. The machine may learn, e.g. from its users, via hardwired analysis of domain faults with associated recovery. The machine may modify itself according to interaction with its authorized authenticated users with self-modification via learning within application-specific, user-specific constraints hardwired into the original machine, eliminating configuration management and computer programming.

20 Claims, 25 Drawing Sheets

(56) References Cited

OTHER PUBLICATIONS

Perkowski, et al, "Evolvable Hardware or Learning Hardware? Induction of State Machines from Temporal Logic Constraints," Evolvable Hardware, 1999. Proceeding of the First NASA/DOD Workshop O N. Pasadena, CA, Jul. 19-21, 1999, pp. 129-138.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Notification of Transmittal the International Search Report and The Wirtten Opinion of the International Searching Authority dated Jul. 2, 2014, in International Application No. PCT/US2014/013337, 10 pages.

Sep. 28, 2015 (WO) International Search Report—App. PCT/US2015/037182.

WebPHY DATABUS: "WebPHY DATABUS—A Web Server/Ethernet IP Core for FPGAs", Jun. 3, 2013, Retrieved from the Internet: URL: https:ljwww.youtube.com/watch?v=QQRmjNZXH5g, 1 page, retrieved on Sep. 17, 2015.

Magdaleno, et al., "A FPGA Embedded Web Server for Remote Monitoring and Control of Smart Sensors Networks," Sensors, vol. 14, No. 1, Dec. 27, 2013, pp. 416-430.

Arab, Gawen, "Web Server on a FPGA, without CPU, only VHDL (French)," Jan. 29, 2010, Retrieved from the Internet: URL:https://www.youtube.com/watch?, v=7syu5E, retrieved on Sep. 17, 2015, 1 page.

Anonymous: "Anatomy of an HTTP Transaction—Web Performance Monitoring and Optimization," catchpoint.com; May 14, 2013, Retrieved from the Internet: URL:https://web.archive.org/web/20130514104338//http://blog.catchpoint.com/2010/09/17//anatomyhttp; [retrieved on Sep. 18, 2015] p. 1-4.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

* cited by examiner

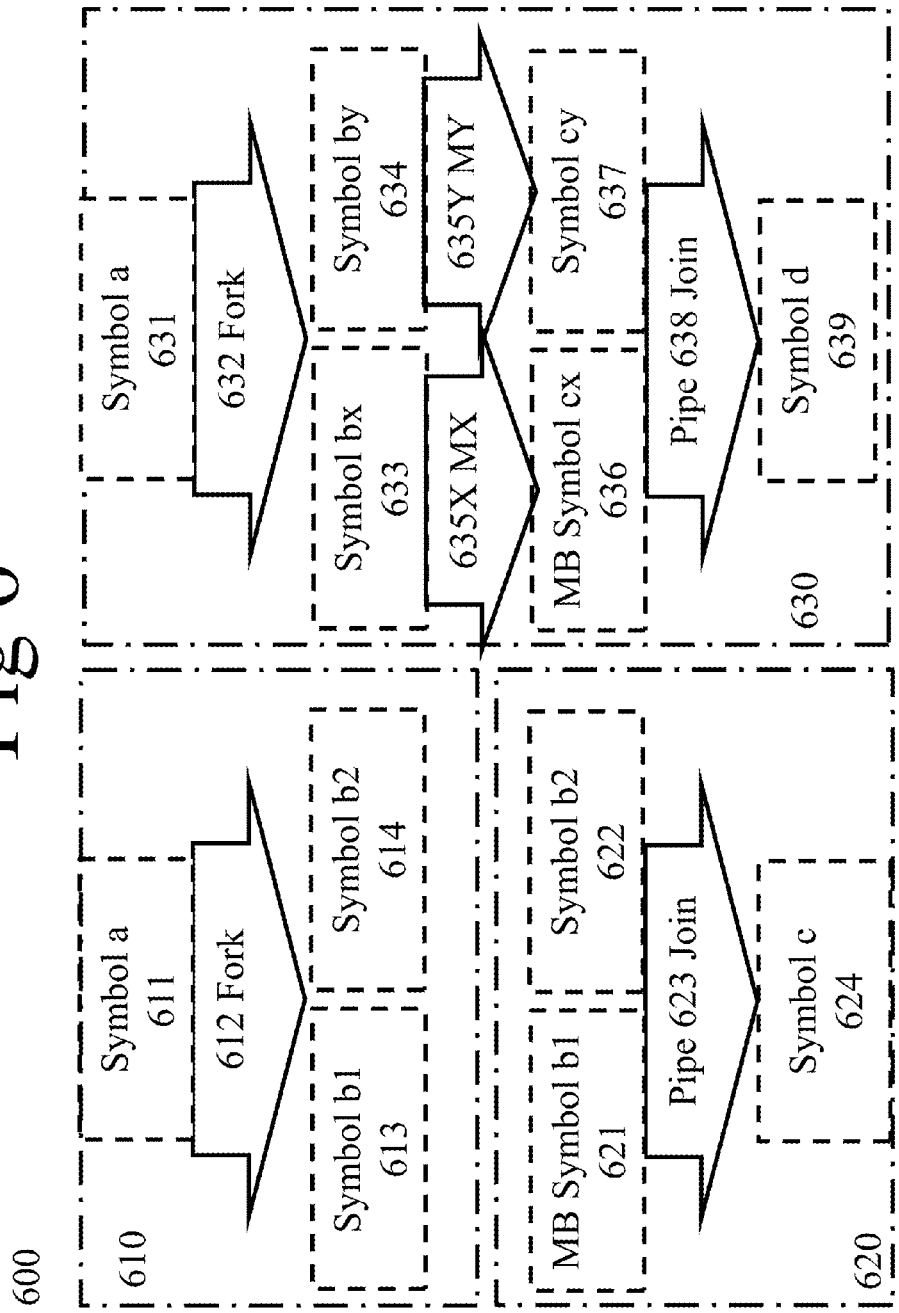

| | A | B | C | D | E | F |
|---|---|---|---|---|---|---|
| 1 | This is Joe's Excel Spreadsheet | | | | | |
| 2 | Joe uses it to balance his checkbook. | | | | | |
| 3 | Only Joe is allowed to know the checking account number | | | | | |
| 4 | | | | | | |
| 5 | Date | Check # | Purpose | Amount | Balance | |
| 6 | 10/20/2012 | Deposit | Open ac | 500.00 | 500.00 | |
| 7 | 10/21/2012 | 100 | Electric | 29.95 | 470.05 | |

1010. Users call this a Cell

1020. Cells are arranged in rows of cells A, B, C,...Z

1030. Each row of cells has a number 1,2,3,...99

Fig 11

|   | A | B | C | D | E | F |
|---|---|---|---|---|---|---|
| 1 | This is Joe's Excel Spreadsheet | | | | | |
| 2 | Joe uses it to balanc his checkbook. | | | | | |
| 3 | Only Joe is allowed to know the checking account number | | | | | |
| 4 | | | | | | |
| 5 | Date | Check # | Purpose | Amount | Balance | |
| 6 | 10/20/2012 | Deposit | Open ac | 500.00 | 500.00 | |
| 7 | 10/21/2012 | 100 | Electric | 29.95 | 470.05 | |

1110. Cells 1A, 2A, and 3A describe the spreadsheet

1120. Row 5 are constant labels of columns A, B, C, D, and E

1130 Column A Rows > 5 contain dates

1140 Subtract D7 from E6 to get E7

1100

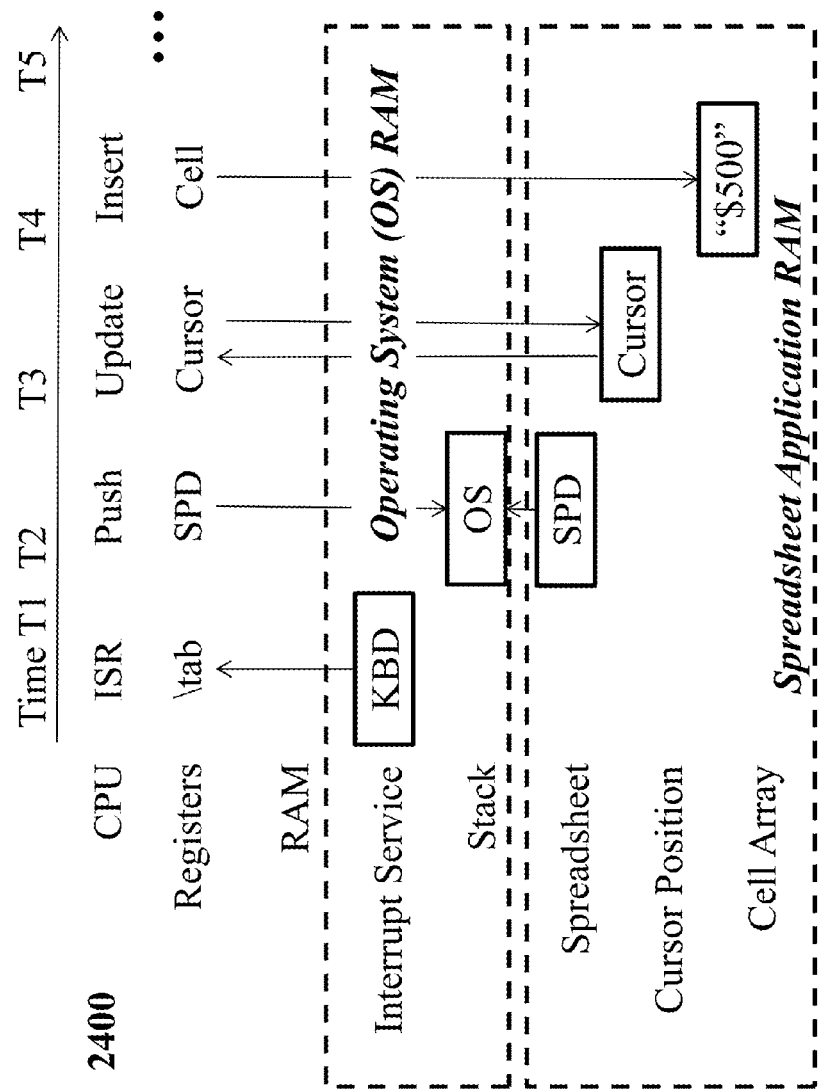

DOMAIN-SPECIFIC HARDWIRED SYMBOLIC MACHINE THAT VALIDATES AND MAPS A SYMBOL

CROSS REFERENCE TO RELATED APPLICATIONS

The present application is a non-provisional of and claims priority to U.S. provisional application Ser. No. 61/760,913, filed Feb. 5, 2013, entitled "A Domain-specific Hardwired Symbolic Learning Machine," herein incorporated by reference in its entirety.

COPYRIGHT AUTHORIZATION

A portion of the disclosure contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

General purpose computing, secure computing, and communications.

BACKGROUND

Current computing, control, and communications systems employ processor elements (PE) such as a central processor unit (CPU) with an associated memory hierarchy of cache, random access memory (RAM) and hard drive(s) or network storage. PE's may be organized into a system on chip (SoC) or network on chip (NoC) of many PEs and memories such as a graphics processing unit (GPU) and may incorporate one or more application-specific integrated circuit (ASIC) co-processors such as a floating point unit; or may incorporate a reconfigurable co-processor, e.g. of a field programmable gate array (FPGA). Computer programming languages such as assembly languages, C and C++ are known in the art for creating software packages offering basic capabilities e.g. in an operating system (OS) of such a computing device such as Windows or Linux, while higher level computer languages like Java and JavaScript are known in the art for programming higher level services such as databases and web services using OS services. Applications programmers may form still higher level applications for networked services such as cloud computing. Given the memory, processing, and input-output capabilities of modern digital information and signal processing devices, applications may be distributed across wired and wireless networks providing services via fixed and mobile devices like smart phones that may download applications via web services from such a database.

Because of the general numeric nature of the CPU registers, instruction set architecture (ISA), and memory, such machines are known to be Turing-equivalent (TE), able to compute anything that is possible to envision. The register sequences of CPUs, PEs, and GPUs are recognized in the art to be manipulated by malware to include subsequences that violate the authorized behavior of such computers and related networks resulting, for example in theft of wealth via data transfers over a compromised network, referred to in the art as cybercrime. Conventional cybersecurity measures including hardware roots of trust, sandboxes, virtual machines, anti-virus, firewalls, and monitors have been chronically incapable of providing a permanent solution to cybercrime. Cybercrime exploits the vast degrees of freedom, uncontrolled states of registers and memory, and sequences of instructions that may never terminate, termed by the theoretical computer science community Turing-equivalence. This Turing-equivalence of shared CPU hardware, the open ended nature of register sequences, the layering of software, and the re-programmability of the local and networked memory systems provide opportunities for malware to perform computing tasks that are not authorized and that may result in financial or physical damage to the users of such computing systems.

BRIEF SUMMARY

A domain-specific hardwired symbolic computing machine is disclosed that precludes the entry of malware into itself and that reduces the effects of networked malware, providing a more permanent solution to cybersecurity. Such a solution requires a computing machine in which open-ended register sequences and uncontrolled memory states of conventional computing and communications cannot occur: to wit, a machine with no CPU, no RAM, no instruction registers and no ISA. Such a machine may organize data into symbols. Such a machine may limit symbols to members of enumerated sets called domains. Domains may be application-specific. Such a machine may encapsulate fixed symbols into hardwired memory constants. Such a machine may incorporate hardwired constants forming a self-specification, briefly noted as (Self), that may describe the intended information processing behavior of the device. Such an embedded self-description may be written in a human language. Such a machine may encapsulate variable symbols into memory blocks that may be isolated from each other and that may not be randomly accessed. Such a machine may encapsulate an information processing operation into isolated hardwired combinatorial logic termed a pipe circuit. A pipe circuit may be interconnected between pairs of domain-specific encapsulated objects such as for example flip-flop, register, or memory block. Instead of a shared-CPU performing instructions stored in memory, such a machine may realize the information processing functions of an application-specific sequence of conventional CPU instructions in a pipeline that may be a sequence of pipe circuits that may map a domain-specific value of a symbol contained in an input variable object into an intermediate values, producing ultimately an intended domain-specific symbol of a resulting variable output object. Such maps of pipe circuits may be hardwired to be consistent with a (Self) description. There may be two or more pipe circuits, each of which may perform an identical map between two different pairs of encapsulated variable objects.

Such a machine may accept external stimuli, e.g. in the form of text and multimedia content represented in variable objects from one or more distinguished input ports, forming a variable composite symbol termed a token. Such a machine may realize information processing by moving such tokens systematically through special-purpose unidirectional hardwired parallel symbol processing pipelines called arrows to result in the delivery of tokens representing the results of information processing to one or more distinguished output ports. A pipe circuit may include a domain-enforcing circuit that may validate the conformance of a token to a domain hardwired into such a machine that may include a hardwired specification of such a domain in a (Self) description. A pipe circuit may include a fork connector that may transfer a token to a multiplicity of alternate pipe circuits. A forked connector circuit may cause a token to select one given output pipe from among many or may replicate an input token for simultaneous transfer down multiple output pipes. A pipe circuit may include a join connector that may combine a multiplicity of input tokens into zero or more tokens for an output pipe of such a join connector. Fork and join connectors may be hardwired with encapsulated variable objects to form parallel pipelines. Tokens and symbols entailed in token flow from input to output may be constrained via hardwired tests, e.g. of domain and for conformance to behaviors specified in a (Self) description. A particularly efficient configuration of pipes for flowing tokens rapidly from input to output may be termed a conveyor belt. Such a machine may incorporate one or more conveyor belts with a multiplicity of other serial and parallel pipe circuits forming a domain-specific application-specific parallel pipelined information processing apparatus.

Input stimuli forming tokens may be offered by one or more sensors or data communications interfaces such as a local area network or wireless link. Stimuli may include sensory sources such as microphones, video cameras, and anti-tamper devices. Stimuli may include data, descriptions of data known in the art as metadata, and requests for information processing, e.g. from a user or from a network. Output tokens may be converted to text, graphics, voice, video, or other media, e.g. for external usage. Output tokens may be converted to signals that may control external devices or to data and control signals suited for communications interfaces. The input ports, domains, maps, (Self) description, and output ports of such a machine may be immutable during operation, while allowing for extensibility via hardwired fault management circuits operating according to a hardwired (Self) description. Variable objects may enable tokens to flow through the immutable maps to provide information processing services such as email, database, spreadsheets, Internet (e.g. world wide web) and other valuable information processing services.

For flexibility, such a machine may learn directly from its users via interaction in human language within an application-specific domain of the (Self), requiring no computer programming. An authenticated, authorized user may instruct such a machine to perform an operation that may cause such a machine to alter its own structure within its defined domain(s) such as via the instantiation of a new input-output pair of a hardwired pipe, resulting in an alteration of future behavior. Such a machine may form and map symbols from one or more device-specific, user-specific, application-specific finite domains onto one or more other such domains. Learning may employ techniques such as learning by being told, as case based reasoning, and as associative learning. For additional flexibility and responsiveness, such a machine may observe stimuli including user interaction over time, may form correlations via hardwired correlation processes, and may apply hardwired machine learning techniques such as neural networks, support vector machines, reinforcement learning, fuzzy logic, inductive inference and abductive inference. Learning may employ variable objects forming variable maps derived from learning processes. Learning may be hardwired to conform to bounds and constraints of a (Self) description.

For improved performance, such a machine may reconfigure itself to embody learned experiences. Such experiences may be embodied in the personality of an original machine in a form, e.g. of variable maps acquired, e.g. via machine learning. Reconfiguration mapping circuits of such a machine may transform such variable objects into new constants and such variable maps into hardwired pipe-segment circuits. Such constant objects may be embodied into a new hardwired personality, e.g. of a Field Programmable Gate Array (FPGA), e.g. via VHDL language compilation, that may be a hardwired part of such an original machine.

Thus, such a domain-specific hardwired symbolic learning machine may be embodied as a Domain-specific User-defined Parallel Pipelined Learning (DUPPL) machine. Information processing functions of such a DUPPL machine may be hardwired into the pipes of ASICs, optical computing circuits, quantum computing devices, FPGAs, and other circuits that may comprise such a machine. A DUPPL machine may be simple, operating within a limited domain embodied as a domain-specific device such as an ASIC. A DUPPL machine may be flexible, operating within a specified set of domains and maps embodied in a flexible device such as a field programmable gate array (FPGA). Multiple simple and flexible DUPPL devices may be interconnected by sharing domains. A collection of simpler devices, proximate or networked, may form a larger, more complex composite DUPPL machine capable of complex information processing services. Nevertheless, the function of a given chip, network, or system and of a composite machine or network of such DUPPL machines may occur within the immutable boundaries of a given domain or set of domains that may be embodied into such a DUPPL machine via a (Self) description that the machine itself may not change but may employ to limit its own behavior to its application, user(s), authorized usage, organizations, legal constraints, and rules of business logic. Compared to a conventional Turing-equivalent computer, cybersecurity may be improved by a DUPPL machine through, for example, a DUPPL machines' hardwired immutability of information processing, inherent self-checking of domains, self-referential consistency of the (Self) description, hardwired constants, encapsulated variable objects, and hardwired parallel pipelines. These properties of a DUPPL machine may introduce a new category of information processing machine that may render obsolete a vast range of malware such as computer viruses and advanced persistent threats.

BRIEF DESCRIPTION OF THE DRAWINGS

FIG. 6 illustrates examples of parallel pipes that may be formed by objects of memory blocks and arrows of pipes in a DUPPL machine;

FIG. 10 illustrates an example spreadsheet application;

FIG. 11 illustrates additional details of an example spreadsheet application;

FIG. 24 illustrates how a conventional computer executes a spreadsheet application;

DETAILED DESCRIPTION

Introduction to Terminology

Figure 1:
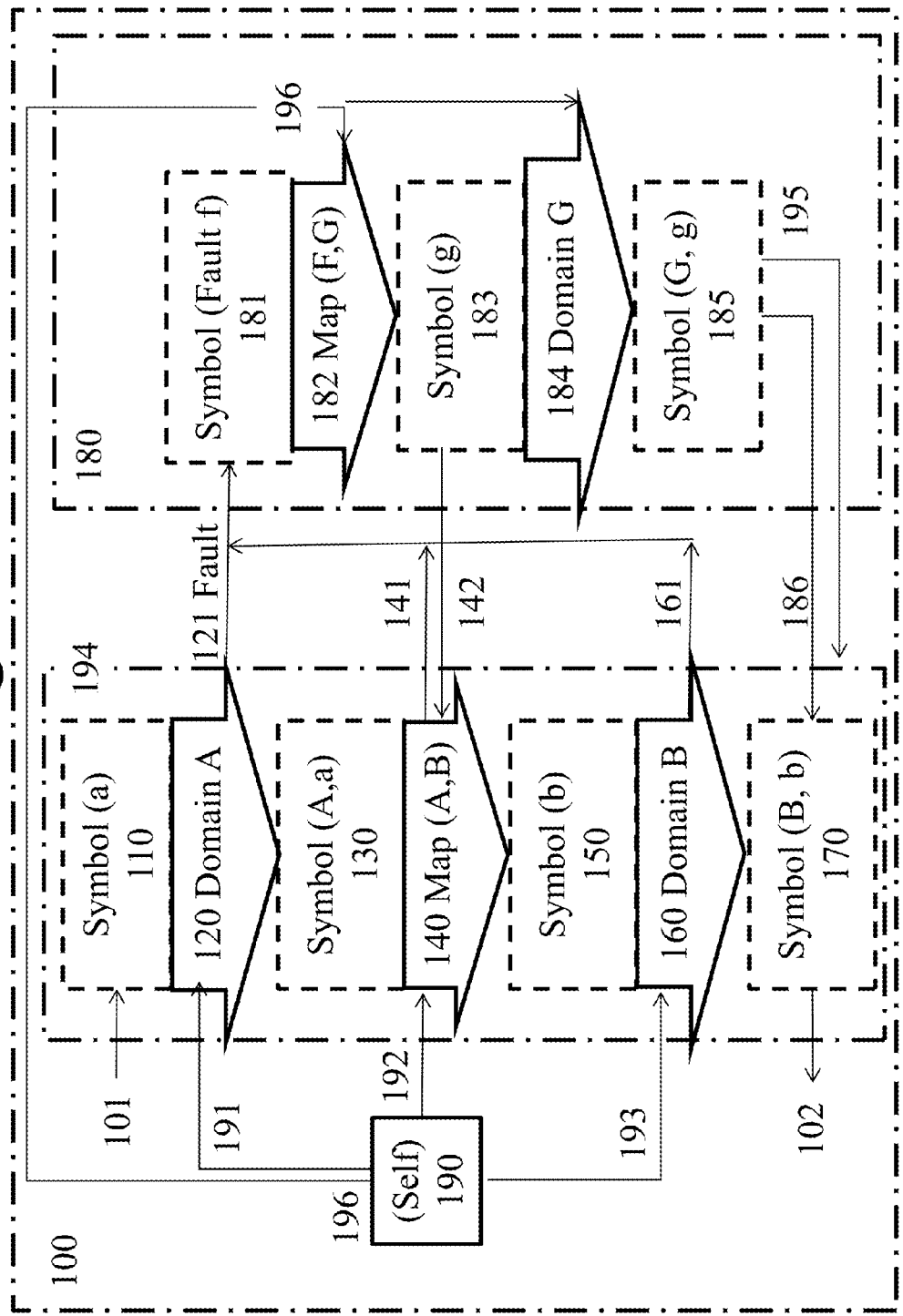
FIG. 1 illustrates an example domain-specific hardwired symbolic learning apparatus.

As discussed above in the brief summary, information processing functions of a DUPPL machine may be hardwired into the pipes of ASICs, optical computing circuits, quantum computing devices, FPGAs, and other circuits that may comprise such a machine. Information of a DUPPL machine is stored and processed through the circuitry of a DUPPL machine in various forms. Such information forms may include: symbols, objects, tokens, domains, and a self-description, which is referred herein as "(Self)".

A symbol is textual data, the basic unit of information representation that conforms to a defined logical structure and is expected to be a member of a domain. For example, a symbol could be text such as "Hello" and a symbol could be "Numbers [1+1=2]". A DUPPL machine may express a symbol as a value of an object. Values of objects may be fixed and constant, that of a single symbol hardwired into such a DUPPL machine; or objects may be variable, capable of representing alternative symbols of a domain. A DUPPL machine will know how to process a symbol to understand its meaning. A symbol can be used in various ways throughout a DUPPL machine. In some instances, a symbol may be able to "flow" through the circuitry of a DUPPL machine. When a symbol "flows" through the circuitry of a DUPPL machine, it is referred to as a token.

An object is the basic unit of information storage and retrieval. An object may contain exactly one symbol. An object may be variable, containing alternative different symbols, or an object may be fixed, containing exactly one symbol for the life of the DUPPL machine of which it is a part.

A domain is a listing of symbols. Each symbol that is listed is a member of that domain. For example, if a domain provides a listing of "Red", "Green" and "Yellow", the symbol "Red", the symbol "Green" and the symbol "Yellow" are all members of the domain. A DUPPL machine will know how to process a domain to, for example, test a symbol to determine whether the symbol is a member of the domain. For example, if the symbol to be tested is "Brown" it would not be a member of the above domain. However, if the symbol was "Green" it would be a member of the domain. A domain may be abstract such as a list of colors or may be concrete such as a list of the street intersections in a city. A domain may refer to things that are external to a DUPPL machine or to things that may be internal, such as a listing of circuit boards.

A (Self) is a description of what the DUPPL machine can and cannot perform. The (Self) includes all domains and, thus, provides all symbols that may validly occur within a DUPPL machine. A DUPPL machine will know how to process the (Self) to, for example, identify a particular domain in order for a symbol to be validated against the domain. In some arrangements, (Self) is hardwired into the DUPPL machine and cannot be changed throughout the life of the circuit.

A DUPPL machine is comprised of various circuits. Such circuits may include: memory blocks and pipes.

A memory block may be comprised of various circuitry components necessary for storing the symbols. For example, with respect to ASIC and FPGA designs, a memory block may be comprised of various flip-flops, registers, wires and the like. In general, a memory block stores a symbol. In some instances, the memory block may act as a constant (e.g., the stored symbol cannot be changed physically nor electronically for the life of the circuit); a variable object (e.g., have contents that can change throughout the life of the circuit, such as by storing different symbols at different points in time); and an address (e.g., store a symbol that refers to an address of another memory block). Thus, a memory block may be a circuit representing an information object whether fixed or variable that may have as its contents at a given time a symbol of a given domain.

Additionally, memory blocks may be associated with other memory blocks. For example, a constant (e.g., memory block acting as a constant) may be associated with a variable object (e.g., memory block acting as a variable object) such that the constant provides a label or name for the variable object. The constant may act as an address that defines where the variable object in located in the memory space of the DUPPL machine e.g., so that a third memory block containing a token may access the variable object with the constant as its address. These memory block associations may be defined in the (Self) via a one or more symbols and/or domains.

A pipe is circuitry that is located between at least two memory blocks. The circuitry of a pipe may be comprised of logic necessary to perform one or more designated functions, such as AND-gates, OR-gates, NAND-gates, inverters, and the like. The designated functions are generally related to the application being implemented by the DUPPL machine. Pipes may take the contents of one memory block as input, process the input according to, for example, a map between two symbols or arrow between two domains, to produce output that is stored in a memory block. For example, a pipe may include circuitry that validates that a symbol is a member of domain. A pipe may include circuitry that maps a symbol from one domain to a different domain.

The terms described above will be used throughout the disclosure when describing various embodiments of a DUPPL machine. Additional details of the circuitry used in a DUPPL machine will also be provided in connection with the various embodiments of a DUPPL machine. Additional details of the various forms information may take when stored or processed in a DUPPL machine will also be discussed in connection with the various embodiments.

With each circuit of a DUPPL machine may be associated an information processing purpose and function. The purpose and function of a memory block circuit may be to represent an information object that may contain a symbol as its value. The purpose of a pipe may be to map a symbol of an input memory block into a resulting symbol of an output memory block. Further, additional circuits or information forms, or variations on the above discussed circuits and information forms, may also be introduced in connection with the various embodiments of a DUPPL machine described herein.

FIG. 1, DUPPL Machine Apparatus

FIG. 1 illustrates an example domain-specific hardwired symbolic learning apparatus, also referred herein as a DUPPL machine or DUPPL apparatus. FIG. 1, in particular, illustrates DUPPL machine 100. Such machine may, for example, include a (Self) 190; circuitry 194 implementing a core application (e.g., core application circuitry 194); and circuitry 180 for fault recovery (e.g., fault recovery circuitry 180).

Input may enter DUPPL machine 100 at input port 101. Input may include text (e.g. from a keyboard), speech from a microphone, video, global positioning system (GPS) coordinates, local area network (LAN), or wireless data. Text may include text that describes data that may be known in the art as metadata. The input may be organized into hardware, for example, via logical channels and successive inputs; the input may be grouped or otherwise converted into a symbol, e.g. symbol (a). For ease of reading, the names/labels of some symbols discussed herein may be shown as including (,), ", or ' characters. A symbol's value, however, may also include such characters and may be interpreted by a DUPPL machine as a special character when symbols are processed. Details of these aspects will be discussed below.

Symbol (a) may be stored in a memory block 110. Memory block 110 may be isolated from other memory blocks of the DUPPL machine. For example, a token may not flow from a memory block 110 directly to any other memory block (e.g., to memory block 130, or 181). Instead, a token may flow only from a memory block to one or more pipe segments. For example, a token may flow from memory block 110 to memory block 130 via a pipe segment 120 that may transform such a symbol. In some arrangements, there may be only one way for tokens to flow from memory block 110 to memory block 130: through pipe segment 120.

In a DUPPL machine, the pipe segments may perform a domain membership test, as shown by pipe segments 120, 160 and 184 of FIG. 1. Pipe segments may also perform a mapping from one domain to a different domain, as shown by pipe segments 140 and 182 of FIG. 1. Pipe segments may be simple circuitry, such as a lookup table; or may be more complex circuitry, such as a circuit for converting text to a numeric form, adding ten to such a number and converting the resulting number back into text that is a symbol for such a number.

The DUPPL machine may be configured to expect that symbol (a) is a member of Domain A. A domain may be very specific but depend on the core application being implemented by the DUPPL machine. For example, Domain A may be a traffic light colors (TLC) domain for a traffic light application and may consist of the members "Red", "Green", and "Yellow". These three symbols, which enumerate all the members of Domain A, may be placed into memory blocks within (Self) 190 and/or pipe segment 120, such as by being placed into constants within (Self) or pipe segment 120. Domain A may be imparted into core application circuitry 194 via circuit 191 (which may be a number of signal lines providing Domain A from (Self) 190).

To ensure that symbol (a) is in fact a member of Domain A, various checks may be performed. For example, symbol (a) may be processed through pipe segment 120, which compares symbol (a) to Domain A to determine that the value of symbol (a) is found within Domain A. Pipe segment 120 may be realized as a fixed, unidirectional structure of combinatorial logic.

The determination performed by pipe segment 120 may produce a new symbol indicative of the domain that was checked and the original input symbol. In the above traffic light example, if symbol (a)="Red", pipe segment 120 may produce a resulting symbol (A,a) of the text "(TLC, Red)", which expresses both symbol (a) and Domain A. The text "(TLC, Red)" represents that "Red" has been validated as a member of the domain named "TLC". In other words, the resulting symbol of pipe segment 120 can be notated as the result of an information processing function dom(a) (e.g., what is the domain of symbol (a)).

In another example, if symbol (a)="Off", the text "Off" would fail to satisfy the domain membership test performed by pipe segment 120, because "Off" is not found in the domain TLC={"Red". "Green", "Yellow"}. Accordingly, pipe segment 120 may yield fault 121, which may be resolved by a fault management circuitry 180 of DUPPL machine.

Fault management circuitry 180 may perform a process for recovering from the generated fault. For example, fault management circuitry 180 may receive fault 121, store it in memory block 181, map symbol(Fault f) stored by memory block 181 to a response symbol via pipe segment 182, and store the response symbol (symbol (g)) in memory block 183. Pipe segment 182 may map the symbol(Fault f) the fault domain (e.g., Domain F) to a recovery domain (e.g., Domain G). The fault domain may list the types of faults that can be generated. The recovery domain may include a listing of resources, states, and allowed responses (i.e., map (F,G)).

Symbol (g) may include indications for performing various responses to fault 121, such as ignoring a faulty symbol, or logging a faulty symbol for subsequent analysis. Symbol (g) may be validated as a member of Domain G by pipe segment 184, and the determination performed by pipe segment 184 may result in an annotated fault recovery symbol (symbol (G,g)), which is stored at memory block 185. Symbol (G,g) may be output from the DUPPL machine at port 102 (e.g., via signal lines 186 and memory block 170).

Symbols being output at port 102 may be further converted by circuitry in the DUPPL machine. For example, the DUPPL machine may convert any symbol received at output port 102 to human-readable text, images, audio, etc. Users of the DUPPL machine or other devices attached to the DUPPL machine may then be provided with the data.

In some arrangements, a fault recovery may include machine learning at 182, 183, and 184 that may change states of G according to (Self) specifications 190 that may be embodied into the hardware and pipe segments 182 and 184.

In some arrangements, fault recovery may change the hardware configuration of a core application machine 194. Further details of the machine learning and reconfiguration involved in fault recovery processes are provided in connection with FIGS. 19, 20, 21, 22, and 23.

For ease of understanding the hardware of a DUPPL machine, various examples herein will utilize a spreadsheet application or traffic light application. Usage of these two example applications does not constrain the applicability of this disclosure to any other applications or from enumerating any other domain that may be required for a DUPPL machine implementing the other application. For example, the basic hardware model of DUPPL machine may be used for a spreadsheet tracking the status of traffic lights. In such an example, Domain A={Red, Green, Yellow}, and the intersections of the streets of a city may be listed as members of Domain B. Pipe segment 140 may update the state of a traffic light b from, e.g. Yellow, to e.g. Red, yielding a symbol (b) with text of "(Main Avenue, $3^{rd}$ Street, Red)" at memory block 150.

The contents of memory block 150 may be set only by pipe 140, which performs a Map(A,B). Since Map(A,B) is shown to map domain A onto domain B, such a map may be referred to as an arrow if the mathematical structure of Domain A and Domain B, and the mapping performed by pipe segment 140 may satisfy the definition of a category, as known in mathematics.

Put briefly, a category may refer generally to a collection of objects and arrows having particular algebraic structure (e.g., an identity map exists for each object of each arrow of such a category). Each pipe circuit of a DUPPL machine may represent an arrow of category theory (also referred to as a morphism in other branches of mathematics). The pipe segments along with the memory blocks (e.g., those blocks acting as variable objects) together may realize the mathematical structure of categories with finite limits. By realizing the mathematical structure of such finite limit categories, a DUPPL machine may provide increased information security.

In order for pipe segment 140 to satisfy the conditions of being an arrow of category theory, the symbol (b), which results from Map(A,B), must be a member of Domain B. Therefore pipe segment 160 may validate symbol (b) as a member of Domain B. As with pipe segment 120, Map(A,B) that is performed by pipe segment 140 may be subject to faults, such as the failure of a circuit. Therefore, pipe segment 160 may detect faults, such as fault 161. For example, fault 161 may indicate a hardware fault to fault management circuitry 180. Such fault management circuitry 180 may perform its process of fault recovery according to the fault and fault response domains that are defined in (Self) 190.

If symbol (b) is validated by pipe segment 160, the result may be annotated symbol (B,b), which is stored in memory block 170. Continuing the traffic light example introduced above, symbol (B,b) may have the text of "(Traffic Light Status [Main Avenue, $3^{rd}$ Street, Red])". Similar to memory block 110, memory block 170 may be isolated from all of the other memory blocks. Additionally, memory block 170 may not be accessed randomly. Preventing random access to a memory block may limit a DUPPL machine to only the domains as described in (Self) 190, such as Domain A and Domain B. In other words, a DUPPL machine may be considered domain-specific.

Memory block 170 may connect to output port 102 that may further be connected to a circuit that may deliver content based on a symbol provided via port 102. For convenience of reference, input port 101 and output port 102 may be associated into an input-output circuit such as keyboard-monitor display; a microphone-speaker; a video camera with graphics display; an Ethernet LAN; or universal serial bus (USB) connection.

Accordingly, a DUPPL machine performs information processing through an arrangement that processes symbols that are stored in various memory blocks through various pipe segments. To contrast the differences between a DUPPL machine and a conventional computer, in a conventional computer, such data would be generated in registers of a CPU and subsequently stored in memory. However, within a DUPPL machine, there may be a rigorous flow of valid information via tokens from a specific input port to a specific output port through a sequence of isolated memory blocks. The pipe segments of a DUPPL machine (e.g., pipe segments 120, 140, and 160 of FIG. 1) may together form a unidirectional portion of circuitry (e.g., tokens only flow one way through the circuitry) that may be referred to as a pipeline. In various arrangements, pipelines may include various numbers of pipe segments, but may not form loops. Looping behavior may be achieved by the regular transformation of inputs to outputs via a flow of tokens through the parallel pipelines of core circuits 194 and via fault recovery circuits 180. Such flow of tokens may update state of memory blocks of such a machine. A circuit representing (Time) may provide an input to a DUPPL machine at a regular time interval. A (Self) 190 may specify such a time interval. DUPPL machines may be paired so that one DUPPL machine provides inputs to another DUPPL machine, input ports attached to output ports establishing a flow of tokens in a looping arrangement between such machines that may be constrained to domains and maps of each machine with respect to the other.

Pipelines may not interact with other pipe segments that are not aligned in the pipelines' specific flow. Two or more pipes in a DUPPL machine may form parallel pipelines. For example, a variation of DUPPL machine with parallel pipes may include a first pipe as illustrated in FIG. 1 at 101 through 102 (to include an input and output port for the pipeline), and at least one other pipe section in parallel with the pipe at 101 through 102. Parallel pipes are further discussed below in connection with FIG. 6.

Further, due to the formulation and construction of a DUPPL machine, in at least some embodiments, a DUPPL machine contains no shared registers, no random access memory (RAM), no shared central processing unit (CPU) or other processing elements (PEs) of a Turing computer, and no stored program memories of any sort (e.g., no operating system, no applications programming). Despite not containing these components of a conventional computing device, a DUPPL machine may perform information processing via symbols, hardwired circuitry that map the symbols according to the domains of the (Self) description, and memory blocks storing the symbols that operate as the input, intermediate values, stored values, and output for the hardwired connections. Accordingly, a DUPPL machine, for example, may control an electric power grid or other external hardware without fear of a malicious software agent entering the control system to change the software in such a way as to destroy the hardware, e.g. as was the widely reported intent of the StuxNet malware.

A DUPPL machine may be embodied in an ASIC and/or FPGA, and the examples throughout this disclosure are described in connection with an ASIC and/or FPGA. However, embodiments of a DUPPL machine could be implemented using different computing devices, including optical computing, optical storage devices, optical switching; quantum computing devices, analog or digital charge coupled devices, and the like.

FIG. 2, Symbols

Figure 2:
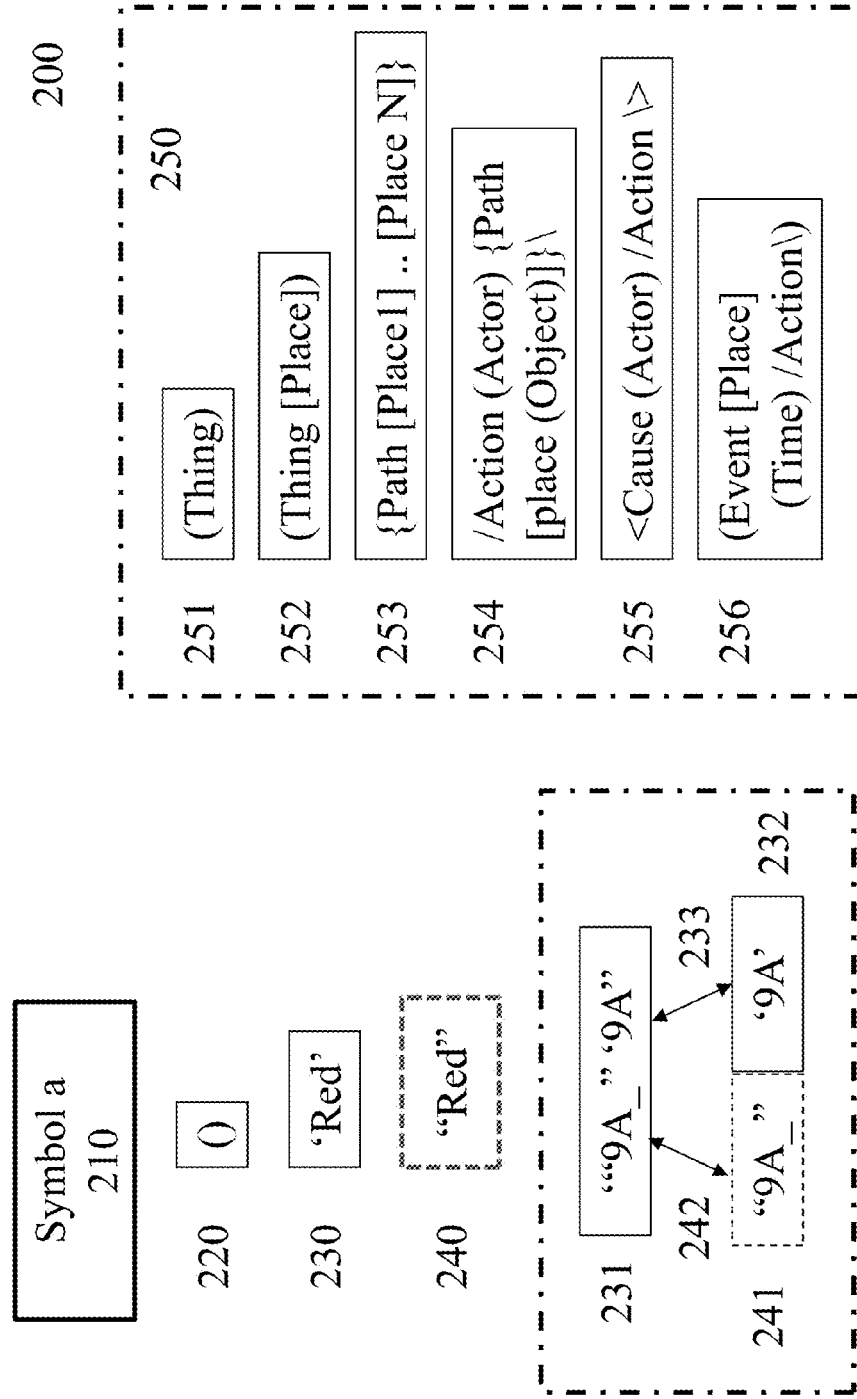
FIG. 2 illustrates an example symbol, showing empty, fixed, and variable symbols with semantic notation.

FIG. 2 illustrates an example symbol, showing empty, fixed and variable symbols with behavioral notation. In particular, FIG. 2 provides additional details on symbols 110, 130, 150, 170, 181, 183, 185, and 190 of FIG. 1. Example symbol notation 200 provides a baseline notation that may be expanded upon for applications being implemented in a DUPPL machine. A symbol 210 may embody a multiplicity of forms of symbol, such as an empty symbol 220, a fixed symbol 230, or a variable symbol 240. Such symbols may be used by the pipes 120, 140, 160, 182, 184 for information processing. Text may provide a convenient form for such symbols. Some symbolic notation embodiments may employ human readable text (i.e., text in a human language).

Since human language may be ambiguous, additional notation may reduce ambiguity to facilitate computation via symbols in a DUPPL machine. Symbols 250 provide example symbols with human readable text and additional notation. The text and additional notation of symbols 250 may, for example, make human intent explicit so that the symbols may be represented in memory blocks and processed by hardwired pipes of a DUPPL machine. Symbols may be used by a DUPPL machine to explain, interpret, and enforce its own specification; and to constrain the information processing behavior of the DUPPL machine to that specified in a (Self) description 190. In these descriptions of annotations, there may be alternate expressions of a given DUPPL symbol: a verbose expression; a compact expression; and a referent to which a symbol may refer. A referent may include a circuit internal to a DUPPL machine, or an external entity.

A verbose expression of a symbol may express a symbol in human language text to convey the meaning of a symbol, e.g. for an untrained user. An expression 'I am a spreadsheet machine' may be a verbose form of a symbol. A verbose form may facilitate learning via interaction with one or more users. An expression 'Sally is not the name of an employee so I cannot write a paycheck to Sally,' may be a verbose form facilitating learning that the user meant to enter "Sammy" who is an employee and not "Sally;" or learning alternatively that Sally is a new employee to be added to a list of employees.

A compact expression of a symbol may be constrained according to criteria for (Self)-description and self-control of a DUPPL machine. A compact symbol '(Self spreadsheet)' may represent in (Self) 190 the verbose form 'I am a spreadsheet machine.' Other compact forms may employ characters of text as behavioral descriptors 250 requiring additional explanation.

A circuit referent of a symbol may be a phrase of a language convenient for compiling a symbol into a circuit realizing the information processing of such a symbol, e.g. as a VHDL expression that may configure the circuits of an FPGA. For example, a symbol '(Self spreadsheet)' may have a VHDL expression as a referent. In this disclosure, to avoid confusion in the use of single and double quotation marks between VHDL usage and DUPPL usage, VHDL expressions are in bold face. Thus, a DUPPL symbol '(Self spreadsheet)' may have a VHDL referent such as constant self_description: literal:="spreadsheet"; circuits of a (Self) 190 may be embodied, e.g. as a VHDL controller entity declared with respect to FIG. 1 in a DUPPL VHDL symbol: entity Self is port(101: IN character; 102: OUT character) end entity Self; such a VHDL entity clause may comprise a single fixed DUPPL symbol. Thus, there may be fixed circuit referents coding the VHDL string 'spreadsheet' in circuits of a (Self) 190 per VHDL referent: constant self_description: literal:="spreadsheet". A circuit referent of a symbol may perform information processing specified in such a symbol. Thus a symbol occurring in a (Self) 190 may have a circuit referent of the machine itself in core circuits 194 and in fault recovery circuits 180.

An external referent of a symbol may include a person, place, or thing external to a DUPPL machine and may describe a behavior of such things in the space-time continuum. A person may be referred to by a unique given name such as by a fixed symbol 'Nick N. Nicholson.' Such a person may be referred to by a more generic name such as a role in a company like "Employee" that may be a variable symbol. Thus, "Employee" may be a symbol referring to a memory block (e.g. the 'name' of a memory block 110), while a fixed symbol 'Nick N. Nicholson' may be a value of such a memory block. A specific external place referent may correspond to a fixed symbol such as '4985 Atlantic View, St. Augustine, Fla. 32080 USA'. A variable symbol may refer to a collection of external referents. For example a variable symbol "Address" may refer to a multiplicity of external places any one of which may be the value of such a symbol. An external referent of a symbol may be used by a DUPPL machine in user interaction and dialog, e.g. a via circuit for translating verbose expression of a user at input port 101 to a symbol (A, a) of a DUPPL domain A of a memory block 130; and via a circuit for translating a compact symbol of a memory block 150 to a verbose form for human interaction via output port 102.

For sufficient understanding of the symbolic notation to build a DUPPL machine, clarity is needed regarding self-referentially consistent and mutually grounded usage of symbols between a human being and a DUPPL machine. In some embodiments using a human language symbol notation, a DUPPL symbol may include any common words, phrases, and punctuation convenient to a given application for a given usage provided that certain criteria are met.

The first symbol criterion (e.g., symbol criterion 1: application consistency) is that there is a consistent mapping between expressions of a User applications domain and symbols of a (Self) 190 domain. A (User) domain may be inherently inconsistent. However, a majority of specified users may enumerate inconsistent usage and may agree to mapping an inconsistent diversity of expressions to a (Self) 190 domain in a consistent manner. Such a (Self) 190 domain may embrace all relevant expressions of a User domain. For example a "spreadsheet" is a well-known application. A set of users may refer to places in a spreadsheet variously and inconsistently as boxes, cells, or slots. A map of a domain-enforcing pipe 120 of FIG. 1 may resolve such human language inconsistency via a map from a user domain mapping each symbol 'box,' 'cell,' and 'slot' to a consistent (Self) 190 domain symbol 'cell'. The second symbol criterion (e.g., symbol criterion 2: application-specific machine consistency) is that each symbol of a (Self)-description 190 has a circuit referent in that specific DUPPL machine. In the positive sense, a symbol noted in (Self) may be embodied as a corresponding circuit referent or as a configuration of circuits or other components such as optical masks, optical pipes, or spatial light modulators for optical-digital computing. In the negative sense, a symbol of (Self) may constrain DUPPL circuit referents. For example an application-specific symbol 'checks<1000' may limit circuits expressing the values of checks of a checkbook spreadsheet machine to a value less than $1,000.00. There may be a VHDL referent that may include constant: upperLimit: integer:=1000; checks<upperLimit; and a resulting circuit referent limiting the value of such a cell. Thus, the criterion of application-specific machine consistency may yield a one to one (1:1) relationship between a (Self)-description 190 and circuits 194 and 180 to positively describe and to constrain such circuits. The third symbol criterion (e.g., symbol criterion 3: symbol completeness) is that each circuit and physical component of a DUPPL machine has a corresponding symbol in the (Self) 190. Such a degree of comprehensiveness may be termed an ONTO mapping between a DUPPL machine and its own self-description (Self). According to this criterion, for each circuit of a memory block 110, 130, 150, 170, 181, 183, 185 and of a pipe 120, 140, 160, 182, and 184, there may be a symbol of (Self) at 190 that may be interconnected via circuits 191, 192, 193, and 196. According to the symbol completeness criterion, there would not be a circuit without a corresponding symbol or without corresponding interconnecting circuits between the (Self) 190 and the corresponding circuits of the DUPPL machine itself.

Symbol criteria may not stand alone but may be applied together to a DUPPL machine and its symbols.

In mathematical terms, there may be mappings among a (User) application domain, a (Self) description 190 and circuits of a corresponding DUPPL core machine 194 and corresponding DUPPL fault management circuits 180. Such mappings may be 1:1 and ONTO; self-referentially consistent; and may have inverse mappings among domains representing the user, the machine itself, and its own Self-description. Symbols 251-256 exemplify a method for realizing such a user-defined self-referentially consistent self-description. Hence, such a machine may be termed "domain-specific" and "user-defined."

What follows is a description of various annotations that may be used by a symbol notation, such as symbol notation 200, to reduce the ambiguity of the human language text that is included in a symbol.

A fixed symbol 230 is specified in a (Self) 190 by enclosing text in 'single quotes.' A fixed symbol may be indicated graphically with solid lines around a graphical form. A fixed symbol 230 of FIG. 2, for example, 'Red' may stand for itself. Such a fixed symbol may correspond to a constant circuit of a (Self) 190. Such a circuit may be represented in a language for the specification of such circuits such as VHDL. The VHDL phrase: constant symbol_230: string:="Red"; that may result in a constant of an ASIC, or FPGA. DUPPL notation employs single quotes to define a constant string, while VHDL employs reserved word constant, character type string the string "Red" in a phrase defining constant symbol 230 to realize DUPPL constant symbol 'Red'. Such a constant circuit corresponds to a bit pattern of ones and zeros with circuit lines to voltage (VCC) or ground (GND) according to the coding of the characters. Such a constant symbol 'Red' and its corresponding circuits may not be changed for an ASIC and may not be changed in an FPGA without reload of part or all of an FPGA image. A fixed symbol 'Red' may correspond to an optical mask of an optical computer. There may be a verbose form of a fixed symbol. For example a (Self) symbol '(Checkbook (print #balance))' may have a verbose form 'Print the balance of the checkbook' that also may be a fixed symbol.

A variable symbol 240 may be specified by enclosing text in "double quotes," Dotted lines around a corresponding graphical shape may signify a variable symbol. A variable symbol may be named or unnamed. If named, then a variable symbol may be termed a variable object. Such a variable object may be stored in a memory block. More specifically, a variable symbol corresponds to a circuit having state, capable of representing a multiplicity of alternative values of information. Examples of variable circuits implementing variable symbols may include a flip-flop, a register, and a memory block. A variable symbol "x" may indicate that a fixed symbol 'x' may serve as a name for a memory block symbolically named "x" that may be said to contain a variable object x having a symbolic name 'x'. Such a variable symbol "x" may correspond to a portion of circuits of a larger variable symbol of a larger memory block circuit, e.g. memory block 110 of FIG. 1, expressing a composite symbol (a), of which "x" may be a part.

A constant symbol may incorporate a reference to a variable symbol. For example, symbol 231 of FIG. 2 has a fixed value "'9A_' '9A'" that includes a reference to a three-character variable symbol "9A_" along with a fixed two-character symbol '9A' that may function in a preferred embodiment as a fixed label for variable object "9A_". In a DUPPL machine of FIG. 1, such a descriptive symbol 231 may be embodied in a fixed circuit of (Self) 190 with a VHDL name symbol_231 having a VHDL definition constant symbol_231: string:="'9A_' '9A'"; according to VHDL usage. Such a fixed symbol of the (Self) 190 may be self-descriptive of a pair of circuits 241 and 232 of FIG. 2 that may occur, for example, in a DUPPL machine of FIG. 1 within a memory block 130 providing input to a Map (A,B) of a pipe 140. A variable circuit 241 may comprise a memory block 241 within a larger memory block 140. Such a circuit 241 may represent three characters, initially the characters "9A_" as shown in FIG. 2. Such a variable three character circuit 241 may contain a symbol '9A_' initially; subsequently it may contain a symbol 'Red' or some other three character symbol. Such a circuit 241 may have a fixed two-character label '9A' in circuits 232 proximate thereto, realized in a constant circuit that may be formed via a corresponding VHDL expression: constant symbol_232: string:="9A"; according to VHDL usage. A circuit 242 of FIG. 2 may realize the referent function of an aggregate circuit 192 to link a self-descriptive circuit of fixed symbol 231 of the (Self) 190 to a referent memory block 241 realizing variable symbol "9A_" in the DUPPL machine itself, e.g. in a larger memory block 130. A circuit 233 may link the single quotation marks of a self-description 231 to the constant circuit 232 realizing the label "9A". Circuits 232 and 242 may include combinatorial logic such as AND gates that may compare self-description 231 with the components of the DUPPL machine itself at 241 and 232, e.g. circuits to test these circuits for symbol criteria of machine completeness and consistency. Inconsistency detected by specific circuits 232 and 242 of an aggregate circuit 192 may initiate a fault 141 to fault management circuits 180. Thus, an arrangement of circuits having a fixed self-description symbol 231 realized in part in a variable circuit of a memory block 241 and in part as having a label 232 with referent assurance circuits 242 and 233 may embody circuits for self-referentially complete and consistent symbols.

As a specific example of the use of variable symbols, a symbol of a memory block 130 may be composite, including for example a variable symbol "x" e.g., in its least significant bits, and a variable symbol "y" e.g., in its most significant bits. A variable symbol "x" may have a current text value 'Hello, World'. A variable object "y" may have as a value the symbol "print #x". An application-specific text character '#' of such a symbol may indicate that there is a circuit connecting the variable object following the pound-sign #, i.e. variable object "x" to the variable in which '#' may occur, i.e. the variable object "y." Such an application-specific pound circuit may transfer a replica of the current value of a variable symbol at "x" that may be 'Hello, World' to a variable object "y". Consequently a variable object "y" of a memory circuit 110 may have an initial value "print #x" that may become a subsequent value "print 'Hello, World'" upon the operation of a pound-circuit connecting variable symbols "y" and "x" within the larger symbol (a) of memory circuit 110.

A null symbol, '( )' 220, may specify an unused or unusable item. For example, a symbol "9D ( )" may specify that there is no value associated with a cell "9D" of a spreadsheet of a DUPPL machine, so a memory block having a label "9D" may currently embody a value ( ) indicating that it is not in use.

Cognitive linguistics is study of human language in which it is observed that common, everyday things provide the fundamental intellectual constructs for human language. Some in cognitive linguistics assert that a reference thing (such as a table) may define a place (such as under that table). Others in cognitive linguistics assert that a path may be formed by a sequence of places. For example, a path from a bedroom to a kitchen may consist of the places in sequence: bedroom, hallway, living room, and finally kitchen. There may be physical paths and abstract paths, e.g. as metaphors such as "from cradle to grave". Others in cognitive linguistics assert that an action is a thing moving down a path. Others in cognitive linguistics assert that a cause is a thing that initiates or constrains an action. One may draw upon the intuitive appeal of cognitive linguistics regarding thing, place, path, action and cause to inform compact behavioral symbols 250 of FIG. 2 for a (Self) description 190.

A symbol 251 may employ parenthesis around a human language term or phrase for a common, everyday thing, indicating a "thing" (e.g. an English noun), which is also referred herein as a (DUPPL thing). A (DUPPL thing) may be an (information thing). Such a (thing) may be represented permanently in a DUPPL machine as a fixed symbol, e.g. via circuits coding text of a VHDL constant expression, e.g. constant thing: string:="thing";. Alternatively, such a (thing) may be represented in a transient form, e.g. as contents of a memory block, such as of a memory block 110 containing a symbol (a) noted as an information-thing (a). As is the case with fixed, variable, and null symbols disclosed above, a symbol (thing) of a (Self) 190 may refer to the machine itself as a self-descriptive notation of (Self) 190. A (thing) may have a verbose form; there may be external referents, e.g. as a (User) or there may be internal referents, e.g. of a (circuit). As an example, a memory block 110 of FIG. 1 may be a (thing) referred to compactly in (Self) 190 as (Self (110)), i.e. a (thing number 110) that may be a part of the (DUPPL machine itself). A (DUPPL thing) notation may refer to an abstraction such as (Time); or to an external (thing), such as to a (User) named "Joe," e.g. as (Joe).

A (thing) may be composite. Therefore a symbol notation 251 for (thing) also may be composite. A (mouse), for example, may be a composite thing external to a DUPPL machine that may be represented in a (Self) 190 as inclusive of related things such as (mouse (left button)) and (mouse (right button)). A single thing symbol (left button) may employ multiple words of text set off by parenthesis to refer to a single thing. Thus, the parentheses of a notation 251 may represent a given thing as a fixed symbol such as 'left button'. Alternatively a (thing) symbol may refer to a variable object such as a variable object (9A) of a (cell) at (row 9) and at (column A) of a (DUPPL spreadsheet machine). A (thing) symbol may refer to an external object verbosely, e.g. as "the left button of the mouse" or compactly such as (mouse (L)), provided according to a symbol criterion such a symbol is used consistently.

A (thing) notation 251 may refer to a group. A (User) named "Joe" may be expressed in a composite notation 251 as (User (Joe)). A larger group of users may be expressed in a (Self) 190 as a symbol U1=(Users (Joe) (Sally) (Nick)). A symbol U2=('My users are:' (Joe) (Sally) (Nick)) may be a symbol of the (Self) 190 having a form different from U1 and having an alternative group name (Users' vs. 'My users are:'), but having identical members and having identical circuits representing such members. An alternate symbol of a (composite thing) may be a symbol U3=(Users (Workers (Joe) (Sally)) (Manager (Nick))), where symbol U3 may express a hierarchical grouping and where according to a criterion of consistency, grouping is ordered from left to right from least-specific (Users) to most-specific (Sally) and (Nick). Mutually consistent forms U1, U2 and U3 may occur within a (Self) 190.

The text enclosed in parenthesis of symbols in 251 may stand for itself, such as text forms in human language. For example, in symbols U1 and U3, an English noun 'User' is an example of a symbol that means what it says, referring to a human being as in the common vernacular. Thus symbols U1, U2 and U3 may comprise lists of (human beings) that may be known to the (Self) 190 according to such symbols of (things) 251. A thing '(Red)' may be embodied in a fixed symbol of five text characters, each having 8 ASCII-encoded bits, 40 bits total, in circuits of an ASIC having as text a fixed symbol '(Red)' to represent the color red as a (thing). Another symbol '[Red]' may express red as a place, such as a point on a color wheel, according to a larger symbol '(Color[Red])'. Alternatively (Red) may express Red as a name of a person, such as a symbol '(Person(Red))'. Circuits surrounding a variable thing (Red) may embody (Red), e.g. in a (Color domain), which may be an aggregate domain consisting of many colors, or, e.g. into a (People domain). A variable object "(Red)" may incur meaning via circuits for its usage in a specific domain, e.g. of FIG. 3.

A map may be a (composite thing) according to FIG. 2 notation 251 pairing ((an input thing) with (an output thing)). A simple map may comprise a pairing of two fixed things, such as ((today) (Monday)). A thing (today Monday) may be a single thing described in two words having a circuit referent of a VHDL constant: string:="today Monday", while a map may comprise two things: ('today' 'Monday') having a circuit referent of a VHDL Lookup Table ("today"=>"Monday"). Such a simple map may have no name.

A named map may be a composite thing pairing a map name with a collection of simple input-output maps. For example, there may be a binary color code 01 for the color red. A simple map ('01' 'Red') may map a fixed input symbol '01' to a fixed output symbol 'Red'. A collection of additional simple maps may comprise a (binary color code) map. Specifically, a composite symbol (BCC)='(Binary Color Code (01 Red) (10 Green) (11 Yellow))' may comprise a map having the name 'Binary Color Code'. The exterior single quotes establish that BCC is a fixed symbol. According to the criterion of machine consistency, there may be a (Binary Color Code circuit) corresponding to a symbol (BCC) of (Self) 190. Such a circuit referent, e.g. of a Domain B map of a pipe 160 of FIG. 1 may comprise a lookup table, e.g. via referent VHDL expression: type bit- _color_table is array of bit; constant bit_color: bit_color_table:=('01'=>'Red', '10'=>'Green', '11'=>'Yellow'); that may form lookup table (LUT) circuits of a core applications machine 194 of FIG. 1 such as of an output Domain map 160. A LUT is a pairing of memory blocks in rows such that a match of a (first symbol) of a row may result in the transfer of a (second symbol) of such a row to an output port of such a LUT. Thus, a map as a (pairing of an (input thing) with an (output thing)) organizes referent memory circuits of a corresponding LUT.

A (thing) may be variable in order to achieve a "most commonly understood" meaning. For example, an English language DUPPL machine may employ a thing (Red) as a verbose expression with an abbreviation (R) as a compact symbol of (Self) 190. A German language DUPPL machine may map (R) in a (Self) 190 to a thing (Rot) as a verbose form understood by speakers of German. A map (German ((R) (Rot)) ((G) (Gruen)) ((Y) (Gelben))) of a (Self) description 190, then, may transform a single thing (R) of core circuits 194 to a thing (Rot) according to an alternative human language of a (map) of a (Self)-description 190 according to referent circuits comprising, e.g. a lookup table (German) of a domain map 160.

Via notation 251 (things) commonly known to users of an application of a DUPPL machine may comprise common information concepts and data objects of a (Self) description 190 with referents as corresponding circuits of a DUPPL machine itself. As an example, a spreadsheet application of FIG. 10 may comprise (cells), (columns), (rows), (values), (formulas), (formats), and (functions) as (things). There may be simple (things) of which aggregate things may be composed. For example, a (cell) may be a simple thing upon which a (row) may be based, noted as a composite thing (row)='(row (cell-1) (cell-2) . . . (cell-26))'. An ellipsis symbol " . . . " of a symbol (row) is a well-known English language symbol for the information processing concept of things missing from a list that are implied by the things given in the list. Thus, thing notation '(row (cell-1) (cell-2) . . . (cell-26))' may specify that there are 26 cells in a row. A circuit for a (row) may comprise 26 memory blocks.

A (thing) symbol 251 may define or constrain the circuits and information processing of a DUPPL machine. For example, a DUPPL machine for an application of strings of text characters may have a (String domain) of the (Self) 190 realized via referent circuits. A (String domain) self-description may include a domain-specific finite state language having (String things) such as regular expressions, RegEx, typical of string processing languages Snobol, PERL, and Ruby. A (RegEx) thing, for example, may comprise a fixed symbol '/^([0-9]+)$/' having the commonly understood specification of a string consisting entirely of text characters '0', '1', . . . '9', and thus comprising (things) comprising a commonly understood mathematical domain (Integers). A map (Integers '/^([0-9]+)$/') may expresses a map between a mathematics domain and a finite state machine that may be realized in circuits, e.g. of a VHDL referent '/^([0-9]+)$/' to ascertain whether (text) may consist of integers.

A symbol 251 may be ambiguous in isolation. In a (traffic light control application), for example, a fixed symbol 'Red' may be one of three possible colors of a traffic light, expressed in a (Self) 190 as a traffic light color (TLC) of a TLC domain. A (User) may employ such a DUPPL machine, e.g. as a traffic light control apparatus. In such a domain-specific apparatus, a symbol (a)='Red' as a value of memory block 110 may mean the color red, noted as a TLC-specific thing (Red). In alternate human usage 'red' may refer to becoming being 'red' with embarrassment. There may be a nesting of (things) 251 expressing a domain as a composite thing with an object of that domain as an embedded thing, for example (TLC (Red)) that may conform to a symbol criterion for application consistency. A list of related (things) may form a domain. As an example, a Beliefs domain may include verbose expressions null, true, false, unknown, inconsistent, and unauthorized. Beliefs of circuits of a DUPPL machine may code beliefs as corresponding things (N), (T), (F), (U), (I), and (X). A map '(Beliefs (null N) (true T) (false F) (unknown U) (inconsistent I) (unauthorized X))' may map verbose expressions for human-interaction with corresponding compact expressions. Such a map may refer to a (Beliefs) domain.

Things may map symbols 251 to circuits. Self-reprogramming of a DUPPL machine by the machine itself, e.g. via fault management circuits 180 may entail a pairing of a compact expression of a symbol of (Self) 190 with a circuit referent, such as a corresponding VHDL paragraph realizing such a circuit. A composite (thing) may form a template for VHDL language and compiler application: (thing1 (VHDL-compiler (VHDL paragraph1) (FPGA circuit1))). For a given thing such as a notation '(Self spreadsheet)' there may be a VHDL paragraph given above, which when compiled and loaded into hardware, e.g. of an FPGA of the DUPPL machine itself via a circuit 195 becomes a corresponding (circuit thing).

In summary, the external world and a DUPPL machine may be a collection of (things) with a variety of containment relationships some of which are explained above. A DUPPL (thing) referring to an (information thing) may have a referent circuit of a memory block of a DUPPL machine. A DUPPL (thing) referring to a (map) from one information thing to another may have a referent circuit of a lookup table organizing blocks of memory for associated retrieval of an output domain with respect to an associated (thing) of an input domain. A DUPPL (thing) referring to an external person, place, or thing may have circuits of a DUPPL machine facilitating, for example, the sensing of an external thing, dialog with a user, control of an external thing, or data communications, e.g. with another DUPPL machine.

A symbol 252 may denote the concept of a [place]. In common English language usage, a place may be a subspace of physical space external to a DUPPL machine. For example, [under the desk] may be a [place] where one might put one's feet. In such an example, (the desk) is a reference (thing) while (one's feet) are mobile things that may be located temporarily in [a space delimited by the underside of (the desk) and (the floor)]. A place notation may refer to a location of a circuit within a DUPPL machine.

A circuit referent of a place symbol 252 having an external referent [right button] regarding an external (reference thing) such as (the mouse) may comprise a VHDL constant RM: string:="under the desk"; of a (Self) 190. Such a constant symbol RM may be useful for interaction with a user, e.g. in machine learning via a dialog of fault management circuits 180. According to symbol criteria, there may be a VHDL constant string RM, e.g. in a fault recovery Map (F, G) of a pipe 182 by which fault recovery may refer to such a place. Circuits employing RM may attain mutual grounding regarding the ([right button] of the mouse) via a symbol: "To see the instructions click on the right button of the mouse."

A place notation 252 may refer to a part of a DUPPL machine itself. For example, a (video sensor) may comprise a circuit of a DUPPL machine compactly expressed as (Self (video sensor)). A data thing (video) may comprise a circuit of a memory block in which (Self (video sensor)) may place a symbol in a format common to video such as (a jpeg image). A place (Self [video]) may name a circuit of a memory block symbolically as 'video' serving such a function. A (Self) 190 may have a symbol '(Self [video (jpeg image)])' indicating that the DUPPL machine itself may have a place called 'video' that may contain a jpeg image. According to symbol criteria, there may be a circuit referent, i.e. core circuits 194 of a video sensor providing a jpeg image, e.g. to a memory block containing a variable object (jpeg image) and having associated with it a fixed symbol 'video' as its symbolic label designating its place within the DUPPL machine itself. Such a (jpeg image) memory block may provide 'video' as a series of jpeg images as a block of a larger composite input memory block 110. Thus as an internal referent, a place symbol 252 may have as referent fixed circuits forming a label such as VHDL constant video_port_name: string:="video" of a symbolic address of an (information thing) such as a video input within a DUPPL machine.

A symbol 252 for a [place] may refer to a place in a network of machines such as a fixed Internet Protocol (IP) address, e.g. local IP address [IP 0.0.0.0]. A symbol 252, [place], may refer to any abstract place of computational utility for a DUPPL machine, such as memory blocks 181 and 183 noted as symbol MB having an example value '(Self ('Memory blocks' [181] [183]))'. According to the symbol criteria of machine completeness and consistency, a DUPPL machine having a symbol MB in (Self) 190 may have circuits of memory blocks [181] and [183], e.g. in core circuits 180.

As another example, a DUPPL machine having a physical configuration as a smart phone may embody a symbol of (Self) 190 as '(Self ['What am I?' (smart phone)] [IO (Input [keyboard, mouse, USB port]), (Output [display, USB port])])', e.g. via convenient English-language notation embedded into the hardware describing itself as a device with input and output (JO) that is supposed to include keyboard, mouse, and USB port input with display and USB port output. According to symbol criteria, there may be circuits of a DUPPL machine itself realizing such IO ports, e.g. as components of aggregate input port 101 and output port 102.

In notations 251 and 252, there is no inconsistency between notation for thing and place. A (display) may be both a thing and [display] place, i.e. in which to put (output things). In general notations 252-256 denote behaviors of (things) 251 if known. Thus, a (new report) may become known to a DUPPL machine, e.g. via user interaction for machine learning only as a phrase 'new report' as in a phrase 'I need a new report' from a user at 101, e.g. causing a domain fault 121. A learning dialog of fault recovery circuits 180 for such a fault may establish that a (new report) may be a (list) of (employee name) with (employee address), which may be a user-specified configuration of information things known to a DUPPL machine: (report), (list), (employee (name)) and (employee (address)). Fault recovery dialog may establish a symbol '(Employee Report ['Title' 'NewCo Employee Report'] ['Date' (Date)] [(List of Employees) [(Employee [Name (Name)] [Address (Address)])]])' that such a DUPPL machine may follow to generate such a report. Such a report may include fields of the report that are named places on a piece of paper such as 'Title' and 'Date'. The information thing 'Name' has a role as both a data thing (Employee (Name)) found in memory blocks of an employee domain and as a place on a page of a (printed report) referring to employee names as (Employee [Name (Name)]) where a name is a place in such an Employee database and is a thing that occurs in that place.

In a further usage there may be a symbol 253 for a {path}. Usage of symbols for [places] may include a sequence of [places] forming a {path}. Such a {path} may have a [starting place], a sequence of [intermediate places], and an [ending place], briefly noted as {generic path [starting place] [intermediate place 1] [intermediate place 2] [ending place]}. A path external to a DUPPL machine may have a physical referent, e.g. {path in the park} or conceptual referent, e.g. {breaking the law can put you on a difficult path path}. A path internal to a DUPPL machine may refer to a collection of circuits (as places within such a machine) that may perform their operations in an order specified in such a path. Such a symbol may have as referent circuits, e.g. declared in a VHDL process statement. A path may specify an organization of adjacency of places with the possibility of action, but may not require the related action of moving a thing down such a path.

A path symbol 253 '{[home] [driving to work] [workplace]}' may have external physical referents: a user may take such a path to work externally to a DUPPL machine. Such a path is anonymous since there is no name following the initial left parenthesis. In a traffic light application, there may be an abstract path {'Traffic light sequence' [Red], [Green], [Yellow], [Red]} of traffic light colors external to a DUPPL machine. A color (Red) may have an information-processing role as a place on such an abstract path traversed by signals of traffic lights on city streets over time, i.e. from [Red] to [Green] to [Yellow] and then back to [Red]. A role for (Red) as a color-thing and for [Red] as a place in a 'Traffic light sequence' may not be mutually exclusive.

A path symbol 253 of a (Self) 190 identified briefly as Core and having a symbol '(Self {Core Application 194 [101] [110] [120] [130] [140] [150] [160] [170] [102]})' may have internal circuit referents. The first symbol of Core expresses the (reference thing) 'Self' for places forming such a path. The next symbols of Core name the path {Core Application 194}. A symbol {Core Application 194} may express a fixed symbol '{'Core Application 194'}' without the need to include all of the single quotation marks. A symbol Core may express a path of interconnected circuits that a token might follow from input port 101 to output port 102 of a DUPPL machine. According to symbol criteria, for each such {path} of a (Self) description, there may be a circuit that embodies such a path. For each possible path of circuits, there may be an expression of the (Self) that expresses or implies such a path of circuits. For example, a path {[110] [120]} may be implied by a symbol Core as may many other such paths.

A symbol combination 251-253 with internal referents may specify the structure of a DUPPL machine: circuits and information things, places with respect to such things, and paths establishing connectivity of places, e.g. via adjacency of circuits. Paths expressed in symbols of a (Self) 190 may not include loops since unconstrained loops are not allowed in a DUPPL machine.

A symbol 254 may express an /action\, e.g. as a symbol 'Action (Actor) {Path [place1 (Object)] [place2 (Object)] . . . [placeN (Object)]}\. Such an action may include a (thing) as an (Actor) performing an /action\ on another (thing) as an (Object) such that such an (Object) may move along a {Path} consisting of a sequence of [places]. An Object may be a mobile (thing) capable of occupying places specified in such a path of such an action. Actions of symbols 254 may be internal or external. An action symbol of a (Self) 190 may have an internal circuit referent of an (information thing)

moving down parallel pipelines of a DUPPL machine itself, e.g. performing pre-defined applications via core circuits 194 and performing fault recovery, machine learning, and self-reconfiguration actions via fault recovery circuits 180. An action symbol of a (Self) 190 may have an external referent of an actor external to such a machine that may be causing an external object to move down an external path that may be entirely external to such a DUPPL machine. An external action may result in the presentation of an input to a DUPPL machine via a port 101. An internal action may result in the generation of an output from a DUPPL machine via a port 102 realizing an externalized action, such as controlling an external entity such as traffic lights of a city, an electric power grid, or any of a multiplicity of controllable machines; and such as requesting an external action of a human being. Thus an action may occur along an external path that may include a DUPPL machine itself.

An internal /action\ 254 may have (Self) 190 as (Actor); or may have a specific circuit such as a map or arrow of a (pipe 140) of the (DUPPL machine itself) as (Actor). An internal action may move (symbols) called tokens configured for movement through pipes.

As an example of an internal action 254, a 'tab' character may occur as a symbol of a memory block 110. Circuits of a pipe 120 may validate such a character via the movement of a replica of 'tab' from memory block 110 to memory block 130. A (Self) 190 may include a path symbol (V) having a value '{Validate [110] [120] [130]}' according to symbol criteria describing proximity and interconnections of circuits 110, 120, and 130 of core circuits 194. A (tab) character (information thing) thus may move along such a Validate path V according to pipe circuit (120 Domain A) as an actor. A 'tab' character may comprise a member of a Controls subdomain of a Domain A. An action symbol for horizontal tab, HT, may include VHT comprising a fixed symbol '/Validate (120) {[110 (Symbol a [value (HT)])] [120 (Domain Controls [members (HT)])] [130 (Symbol b [value '(Controls HT)']\' of a (Self) 190, e.g. as a VHDL constant phrase. A VHT symbol may have circuit referents of comprising circuits 110 finding a symbol (HT) within a symbol (a), of circuits 120 finding a symbol (HT as a member of a Controls domain, and of circuits 130 expressing a validated symbol '(Controls HT)' as a new value of a memory block 130, the sequence of which may realize such an action. In such an action, a pipe circuit 120 may have a role as (Actor) upon an (information thing HT). Thus, pipe circuit 120 may find HT, match it to a Controls domain, and generate a validated symbol '(Controls HT)'. In such an /Action\ the text 'HT' itself need not move from memory block 110. Text 'HT' may trigger a pre-defined action VHT generating a resulting symbol '(Controls HT)' that may be comprised of the symbol output of a lookup table. Hence, it may not be physically possible for malware to transit such a DUPPL machine as a configuration of text.

An /action\ symbol 254 of a (Self) 190 may refer to a circuit of a DUPPL machine itself having circuits behaving according to a VHDL process block, e.g. begin (process name): process (sensitivity): begin: (process body) end process; end block. Process (sensitivity) may specify changes of state initiating behavior of an /action\ specified in a VHDL (process body). Further examples of such symbols are in the discussion of FIG. 12 through FIG. 16.

A symbol for an /action\ 254 having an external referent may facilitate user interaction. For example, a Dialog symbol may include '/conduct a dialog (Self(180)) {question-answer {[180 /ask (Self) {[184 (question)] [185 (question)] [186 (question)] [170 (question)] [102 (question)] [User (question)] [User (answer)] [Display-keyboard (answer)] [101 (answer)] [110 (answer)] [120 (Fault (answer))] [121 (Fault (answer))] [181 (Fault (answer))] [182 /analyze (180) {dialog (Fault (answer))}\]}\'. Although long, the path of such an action shows that the fault management circuits 180 may transform a question generated in fault management domain G through a path to a [User] which is a place where a (question) thing may become an (answer) which may progress back to fault management circuits for analysis. According to symbol criteria, such a symbol for Dialog may be realized in circuits moving copies of the (question) to the [User] and of the (answer) back to the fault management circuits 180 for further analysis. In such a Dialog symbol, an external thing (User) has a behavior of a place transforming a (question) into an (answer). Dialog for interactive machine learning is disclosed in conjunction with FIG. 19.

A symbol 255 may express a <cause>. Such a <cause> may comprise a (thing) initiating or constraining /action\. A symbol of a <cause> may refer to things and action in the physical world such as an automobile accident causing an injury. Circuits for such an external <cause> may comprise a VHDL clause constant automobile_accident: string:="<automobile accident (possible) /causes (accident) {[healthy (person)] [injured (person)]}\"; A symbol of a <cause> may refer to things and action in a DUPPL machine itself, such as a choice of pipes down which a token may progress from an input symbol (Token T) of a memory block 110 to output 102. A <cause> may depend on a domain of Beliefs. For example, common human beliefs may include true, false, possible, impossible, inconsistent, unknown, and unauthorized. Within a DUPPL machine, it may be convenient to include a null belief corresponding to a null symbol ( ). It may be convenient to refer to beliefs as (information things) of a Beliefs domain: (Beliefs (T) (F) (P) (IMP) (INC) (U) (X) (N)). According to symbol criteria, for each (Belief (thing)) there may correspond a circuit referent such as a VHDL clause constant true: string:="(T)"; forming a fixed symbol of a constant circuit, e.g. of an ASIC or of an FPGA. Referents of circuits for a <cause> may comprise circuits testing an (Actor) for membership in a Beliefs domain. For example, a symbol 255 expressing <Cause (Actor) /Action\> may enumerate an alternative action for each alternative Belief of an actor, such as <cause (condition) [T /actionT\] [F /actionF\] [I /actionI\] [U /actionU\] [X /actionX\] [N /actionN\]>. A Map(A,B) of a pipe 140 may incorporate circuits of a memory block for a variable object (condition) in associated circuits of pipes therefrom realizing a multiplicity of actions.

More generally, a <cause (condition) /action\> may have a circuit referent that may be specified, for example, in a VHDL process expression that may include an 'if' statement. Such a VHDL statement may specify sensitivity to a state of circuits via VHDL process (sensitivity) expression that may specify an action sensitive to the state of a circuit, e.g. of a circuit memory block V. A change of state (i.e. a change of value) of V may initiate an action, e.g. /actionX\ upon change of the state of memory block V to a value X according to a VHDL statement, e.g. process sensitivity (V); begin if X then block /actionX\; end block; end if; end process;. A symbol <cause (condition) [T /actionT\]> may refer to a circuit having a VHDL behavior model process sensitivity (V); begin if T then block /actionT\; end block; end if; end process;.

A condition may result in a null action A whereby the hardware would not perform a further action, and flow of symbols may simply end. Circuit referents for <causes> may include fork pipes disclosed more fully in FIG. 6.

An event symbol 256 may express a composite (DUPPL information thing) comprising (Event [Place] (Time) /Action\). Such a symbol may signify that a specific /Action\ was observed at a given (time) and in a given [Place]. Event notation 256 offers one illustration of the multiplicity of combinations of DUPPL notation 251-255 according to which symbols for thing, place, path, action, and cause may be combined to form application-specific symbols. According to symbol criteria, an (Event) of a (Self) 190 may refer to an action, place, and time of the external space-time continuum, or to an event in a virtual or hypothetical world. Such an (Event) may facilitate user interaction via machine learning circuits of fault recovery circuits 180. According to symbol criteria, an (Event) of a (Self 190 referring to circuits of a DUPPL machine itself may refer to circuits of a pipe segment in a fixed [Place], for example within core circuits 194, performing a specified /action\ at a given (time) by circuits forming a symbol '(Event '[place]' "(time)" '/action\')' where double quotes may refer to the contents of a memory block containing a value of time, and single quotes refer to the place or action of such an event.

A symbol 251-256 may be empty signifying null (thing) [place], {path}, /action\, or <cause>, i.e. ( ), [ ], { }, ∧, < >.

A DUPPL machine and each of its parts such as wires, cables, power supplies, ASICs, optical switches, optical memories, optical pattern matching circuits, quantum components, FPGA chips, etc., may contain a (Self) description 190 of, e.g. its constituent things that may include (collections of (things)) as (domains) along with (abstract and concrete [places], {paths} /actions\ and <causes>) of symbols 251-255. A (Self) 190 may include a multiplicity of symbols expressing definitions, specifications, and examples of one or more applications relevant to a DUPPL machine. Domain symbols of a (Self) 190 may include definitions, specifications, and example members of a domain. Map symbols of a (Self) 190 may include a multiplicity of symbols expressing one or more applications with limitations and constraints of a DUPPL machine itself with respect to such an application. Symbols of a (Self) 190 expressing limitations may express capacities, response times, and information processing included and not included in a given DUPPL Machine itself. Symbols of a (Self) 190 expressing constraints may exhibit identities of authorized users; time and location of authorized usage; and rules of business logic such as a Beliefs domain with <causes> of /actions\ expressed and embodied in circuits of a DUPPL machine itself, e.g. expressing legal uses of such a DUPPL machine.

FIG. 3, Domains

Figure 3:
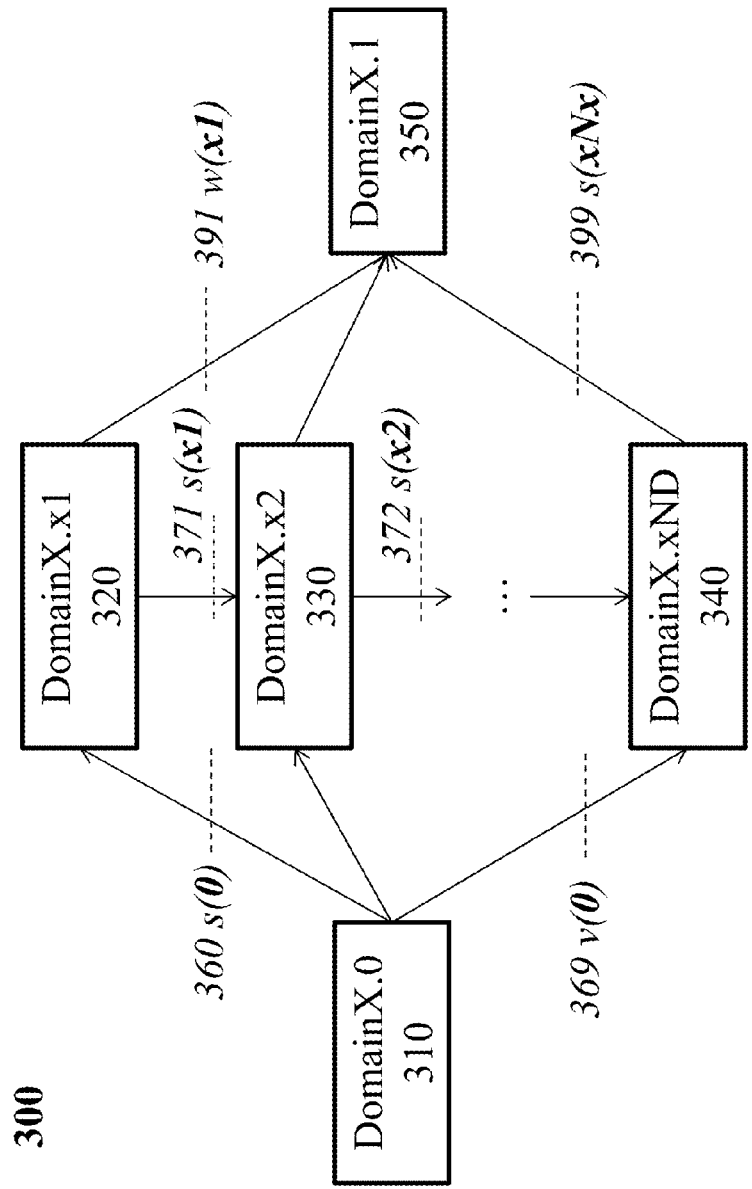
FIG. 3 illustrates an example domain, showing fixed objects and relationships thereof.

FIG. 3 illustrates an example domain, showing (things) of a domain called objects, with relationships thereof. In particular, FIG. 3 provides additional details on the domains introduced in connection with FIG. 1 and explained further in connection with FIG. 2. A domain 300 may include objects 320-340 and relationships thereof expressed as domain-specific maps 360-399. Domain objects may refer to (things) external to a DUPPL machine such as (users); or to (things) within a DUPPL machine such as (circuits) or (information). A domain referring to things external to a DUPPL machine may comprise circuits of a (Self) 190, e.g. as VHDL constants. According to symbol criteria, there may be circuits of a DUPPL machine using (things) of such an external domain, e.g. in a user dialog for fault recovery 180. Alternatively, a domain of a (Self) 190 may refer to (circuits) or (information things) of a DUPPL machine itself such as symbols of (variable objects) or (maps). Such domain-defining objects 320-340 and maps 360-399 may comprise circuits of a pipe 120 that may incorporate such Domain circuits in realizing a Domain map of pipe 120, e.g. to restrict a variable object of a memory block 110 to conform to a Domain A via circuits included in pipe 120 corresponding to a symbol of a (Self) 190. A specific example of such a domain is disclosed in conjunction with FIG. 12.

More generally, FIG. 3 explains domain realization using a generic DomainX as an example, whether having internal or external referents. DomainX may include an initial object DomainX.0 at 310; a collection of objects DomainX.x1 at 320 through DomainX.xND at 340; and a terminal object DomainX.1 at 350. Such a DomainX may include a successor map s( ) mapping a given object to its successor. Objects of a DomainX may be reachable in a fixed number of steps from an initial object, DomainX.0. A DomainX may have a size, ND corresponding to an integer index of a "last" object DomainX.xND whose successor s( ) maps (xND) to DomainX.1, i.e. s(DomainX.xND)='DomainX.1'. A text symbol 'DomainX.ND' may express the fact that a DomainX contains exactly ND objects.

A successor map s( ) may be widely understood and intuitive. As a specific example of successor map s( ) an alphabet has an alphabetical-order( ) mapping a given letter to its successor. Since there is no letter for which the letter 'A' is a successor, an initial object Alphabet.0 may have the letter 'A' as its immediate successor, s(Alphabet.0) may be the letter 'A'. Each object of an Alphabet domain may be reachable via maps s( ) from a fixed symbol Alphabet.0 signifying an initial object according to alphabetical order, s('A')='B', s('B')='C' and so forth until s('Y')='Z'. In English there is no successor to Z, s(Z). However in a mathematical category termed a finite limit sketch that a DUPPL machine may emulate, a successor map may reach a terminal object, i.e. DomainX.1. In the Alphabet, s(Z) may be Alphabet.1.

A terminal object may comprise a [DUPPL information place] that is "outside of" a domain but that is reached from inside that domain. Reaching DomainX.1 may comprise a domain fault condition, e.g. fault 121 for Domain A and fault 161 for Domain B. For example, a time cards spreadsheet may employ a numeric Domain 'Weekly Hours Worked' that may not exceed 40. A symbol notation 250 for 'Weekly Hours Worked' may include symbol (WHW) having a value '(Weekly Hours Worked {[(WHW.0)] [WHW (0)] [WHW (1)] [WHW (2)] [WHW (3)] . . . [WHW (40)] [(WHW.1)]}). Such a symbol may be a fixed symbol of (Self) 190 having a referent a VHDL constant text string for symbol (WHW). In this example, WHW.0 is an initial object and WHW.1 is a terminal object. The domain itself is noted as a path since there is a successor function s(WHW(x))=WHW(x+1) according to which the objects, WHW of Weekly Hours Worked, may be ordered. Although appearing similar, the place [WHW (0)] that follows initial object (WHW.0) contains a singleton object (0), the literal text string '0' representing the number zero. An example domain-specific numeric map 140 for Weekly Hours Worked may map 8 hours worked per day*5 days to 40 hours, an object (40) at a place [WHW(40)] of the domain. Such a map may map 8 hours per day*6 days not to '48' as with a general purpose computer, but to WHW.1, the terminal object for this example domain. Since the text string '48' is not reachable from a fixed object '(WHW.0)', a symbol '(WHW.1)' may occur in pipe 140 of a Map(A,B) from an attempt to map 8 hours per day*6 days to a Weekly Hours Worked domain. Circuits of pipe 140 may match a symbol '(WHW.1)' to a domain fault condition via circuits of a pipe 140 that may embody the objects and maps of a Weekly Hours Worked domain. Consequently, a there may be no resulting symbolic value b='(WHW.1)' in memory block 150, but instead there may be may be a '(Fault '(WHW.1)')' at 141. According to symbol criteria, circuits of a domain Weekly Hours Worked of pipe 140 indicating such a fault may be hardwired according to a (Self) 190 symbol '(Weekly Hours Worked {[(WHW.0)] [WHW (0)] [WHW (1)] . . . [WHW (40)] [(WHW.1)]})'.

Other maps v(0) at 369 of a Domain X may map an initial object to a (thing) in the domain. In a traffic lights example, the map busiest-intersection( ) may map Intersections.0 to an object 'Broadway and Main Street' of a City Street Lights domain. Within a traffic lights domain, a successor function may map one light to another via a next-street( ) and next-avenue( ) map. Other maps (e.g., maps included in pipe segments 120, 140, 160, 182, and 184 of FIG. 1) may connect to such a domain 300 via circuits (e.g., circuits 191-193 of FIG. 1) or via connectors (A) or (B) of FIG. 1.

A pipe 140 may form an arrow for a Map(A,B) if for each object (a) of a source Domain A, circuits of pipe 140 map (a) to a resulting symbol (b) of an output Domain B. Such an arrow for Map(A,B) may be known as "ONTO" if all of Domain A maps to all of Domain B. If an object (a) of domain A is mapped to one and only one object (b) of domain B, then arrow 140 for Map(A,B) may be known as "one-to-one" (1:1). An arrow circuit 140 for a Map(A,B) may be 1:1 and ONTO.

Large domains such as large numbers may be expressed as a first object, DomainX.x1 320, a second object, DomainX.x2 330, and a last object, DomainX.xND 340 without listing each member if map 370 s(x1)=(x2), if map 371 is identical to map 370, and if exactly ND applications of map 370 to (DomainX.0) express a symbol of an object (DomainX.xND). An efficient method for expressing such text domains is known as a regular expression, RegEx. For example, text representing only integer numbers may be represented in a RegEx as a string '/^([0-9]+)$/'. An integer having exactly 4 digits would result in a value $1.length=4. Therefore, a Domain of Integers of Length 4, briefly DINT4 may comprise objects and a path from object to object of '{[(DINT4.0)], [DINT4(0000)], ["DINT.match('/^([0-9]+)$') $=4"], [DINT4(9999)]}', double quotes around the RegEx signifying a variable object. Such a symbol may occur in (Self) 190 with a RegEx referent circuit, e.g. in a pipe 120 of a Domain A. RegEx and associated constraint $=4 may be realized in fixed combinatorial logic of a DUPPL pipe enforcing a Domain, e.g. by pipe 120 for Domain A.

In conventional computing, domains and domain-specific limits such as ND are expressed in software or in documentation if at all. Malware employs stack overflows and similar methods for violating such constraints in order to defeat conventional computer security. In a DUPPL machine, each domain may be explicit, represented in a list of a constant symbol '{[320] [330] . . . [340]}, in a RegEx circuit, or in other efficient hardware forms. A domain may be embodied in a (Self)-description, e.g. as a fixed symbol according to a VHDL constant expression in a (Self) 190. According to symbol criteria, for such a domain symbol of a (Self) 190, there may be domain circuits in pipes realizing arrows from one domain to another. The domains of core circuits 194 may be hardwired. Therefore, no variable object of core circuits 194 may express a symbol not in a domain 300 without causing a fault.

Figure 4:
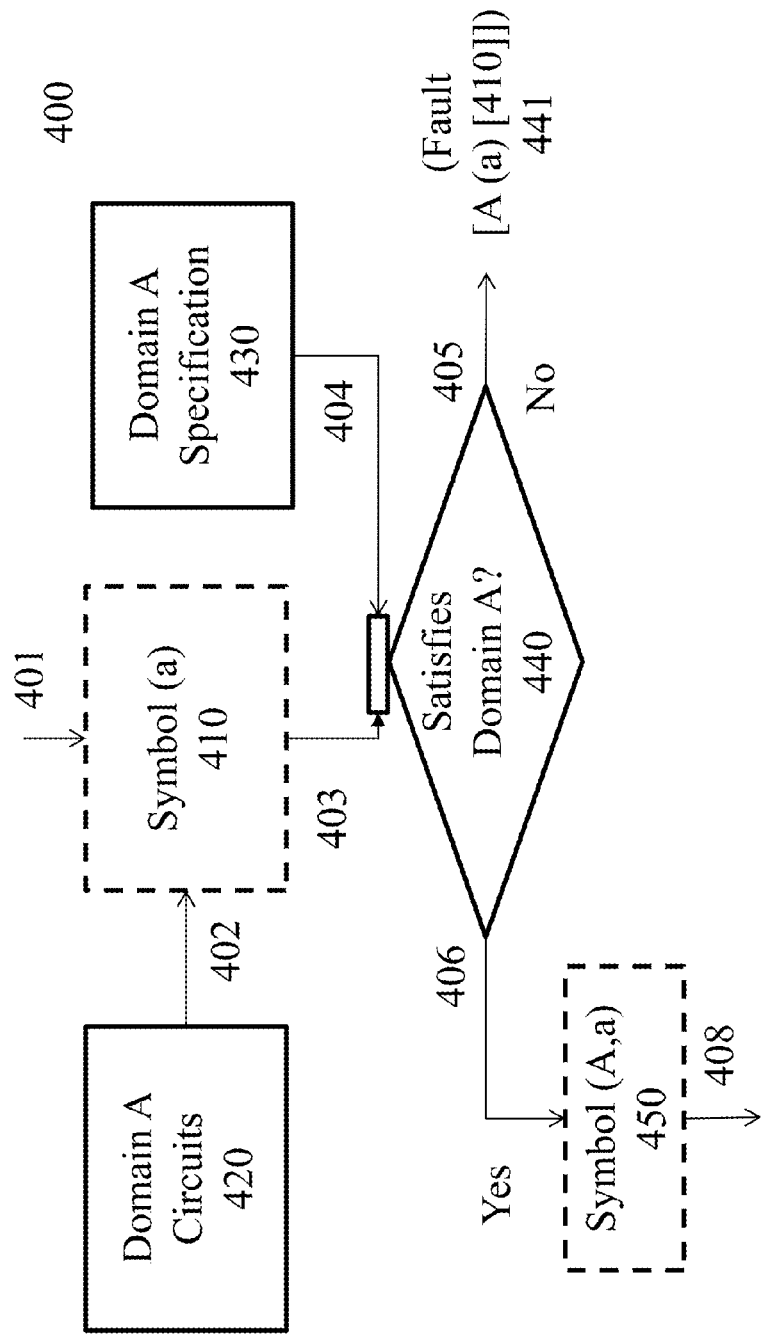
FIG. 4 illustrates an example block diagram for a domain validation arrow.

FIG. 4, Domain Arrows

FIG. 4 illustrates a block diagram for a domain validation arrow. FIG. 4 provides additional details on arrows introduced above in connection with FIG. 1. A pipe segment 120 may provide an information processing function of a domain validation arrow. Circuits of such an arrow may embody the logical flow of FIG. 4. A symbol (a) may enter a domain validation arrow at circuits 401 to comprise the contents of memory block 410. Such a symbol, (a), may refer to circuits of a Domain A at 420 in a pattern of circuits according to FIG. 3 with initial and terminal objects, members and maps.

A domain specification at 430 may specify a domain, e.g. via notation 250. Combinatorial logic realizing the test 440, "Satisfies Domain A?" may determine whether the symbol, a, at 410 satisfies the specification at 430, e.g. by comparing the symbol, a, at 410 against specification 430. Failure to match may result in a fault condition at 405 that may be conveyed via fault symbol, e.g. '(Fault [A (a) [410]])' 441, where a DUPPL (Fault) thing may indicate that a symbol (a) violates domain A at [memory block 410], noted as the place where the fault occurred. Such a (Fault) will be explained in conjunction with FIG. 19. A symbol, (a), at memory block 410 may satisfy Domain A, resulting in a validated symbol (A,a) as the value of memory block 450, i.e. resulting in a symbol (A,a) at memory block 130 of FIG. 1.

To more fully understand the logic of a domain arrow, consider an example domain of traffic light colors, TLC consisting of colors red, green, and yellow. A traffic light color symbol (a) of memory block 410 may retrieve a constant 'Red' from Domain TLC at 420, e.g. according to a variable symbol (a)="TLC[01]". A domain specification for TLC at 430, for example, may include a constant symbol '(TLC {[Red] [Green] [Yellow]})' that may be ordered according to a successor function s(Red)=Green, s(Green)=Yellow; and s(Yellow)=Red. Domain circuits 420 may contain logic mapping a symbol TLC[01] at 410 to a text value of a given color code, e.g. 'Red' for code 01 for a value 'Red' in memory block 410.

FIG. 5, Maps

Figure 5:
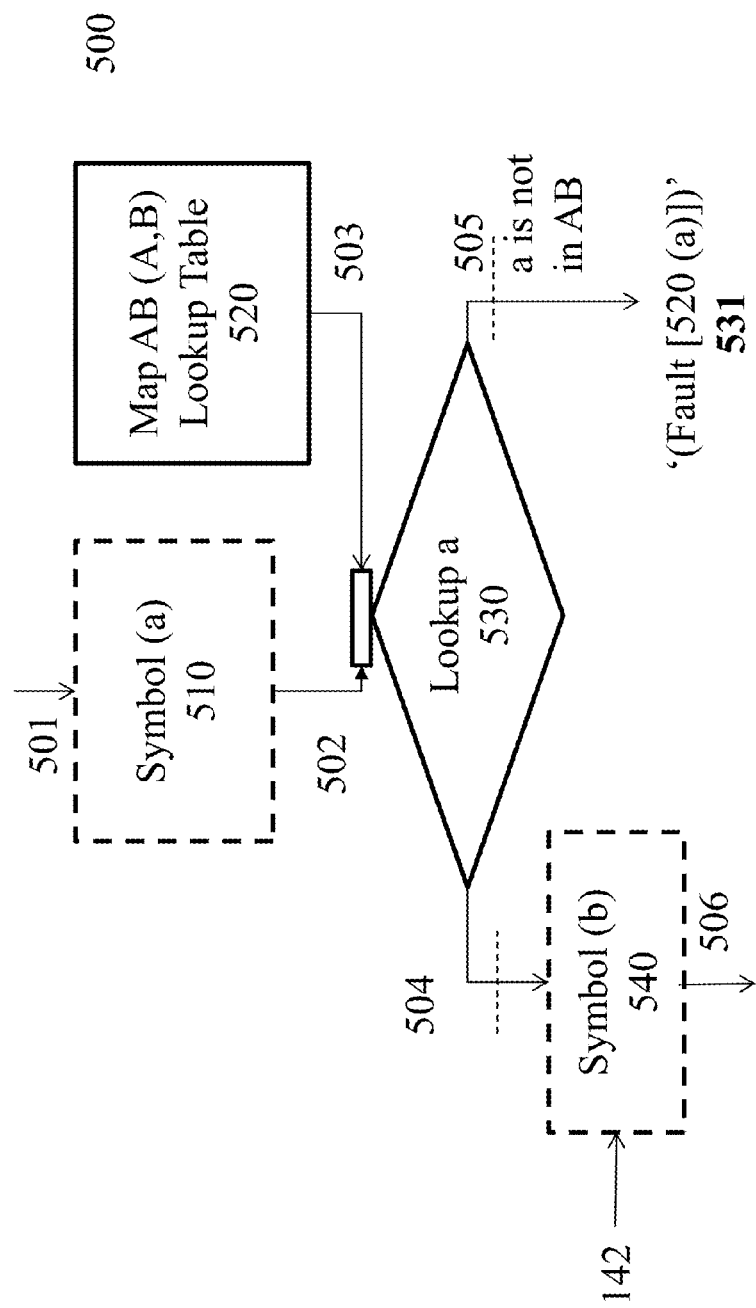
FIG. 5 illustrates an example block diagram for a map arrow.

FIG. 5 illustrates a logic flow diagram for a map arrow (e.g., a pipe that maps from an initial domain to another domain of the DUPPL machine). FIG. 5 provides additional details on the pipe introduced above in connection with FIG. 1 (e.g., pipe segment 140 of FIG. 1). This type of an arrow may employ the type of logic explained in conjunction with FIG. 5 for realizing a map, Map(A,B), between an input domain A and an output domain B. A symbol, (a), of memory block 510 has been validated previously by a domain arrow for Domain A, resulting in its entry into the circuits of an arrow Map(A,B) at 501. A Map(A,B) may be implemented in a lookup table 520. A lookup circuit at 530 may present the value, a, of memory block 510 to lookup table 520. In case the symbol (a) occurs in the lookup table in a row (a, b), then a resulting symbol (b) may be retrieved from lookup table 520 for presentation via line 504 in a memory block 540 as a symbol (b). A replica of such a symbol (b) may be transferred via circuits 506 to a memory block 150 of FIG. 1 as a resulting symbolic value (b) of a memory block 150. In case a symbol (a) of memory block 510 does not occur in lookup table 520, a fault may be signaled at 505 that may generate a symbol 531 that may indicate the cause of the fault, e.g. a symbol '(Fault [520 (a)]).' Signal and symbol 531 may be transferred to fault management circuitry 180.

A lookup table 520 may consist of fixed constants of an ASIC and may not be modifiable once manufactured. In an alternative preferred embodiment, lookup table 520 may be realized in constants of a field programmable gate array (FPGA) such that the contents of the table may not be altered without a power-down or reconfiguration cycle to alter the image of such an FPGA. In an alternative preferred embodiment, a lookup table 520 may be realized via a pattern of light waves, a, transiting an optical medium imparting an output light wave, b, as a function of a fixed pattern (a, b) previously imprinted on such a medium. In an alternative preferred embodiment, a lookup table 520 may be realized as a pattern of charge deposited in a network of capacitors, a specific charge pattern, b, of which may be retrieved via a specific stimulus pattern, a.

FIGS. 1-5 provide a top level description of DUPPL machine. There may be several types of circuits, such as pipes and memory blocks, needed to realize information processing in a DUPPL machine, each of which may be described using the notation, domains, maps, and logic of an apparatus explained in FIGS. 1-5.

FIG. 6, Parallel Pipelines

An arrow realizing an information processing function Map(A,B) may be implemented, for example in pipe 140 of FIG. 1. Such a pipe may embody parallel pipelines via pipe circuits of FIG. 6. Parallel pipes may be formed by memory blocks and pipes of a fork pipe circuit 610 and of a join pipe circuit 620, with parallel pipes 635X and 635Y of parallel pipeline 630 FIG. 6. A symbol of a (Self) 190 may express a parallel pipeline, e.g. as a pair of paths having a common ancestor, such as symbol P1 '{[631] /632\ [633] /635X\ [636] /638\ [639]} and a related symbol P2 '{[631] /632\ [634] /635Y\ [637] /638\ [639]}. According to symbol criteria, a symbol '[631] /632\ [633]' of P1 may specify a memory circuit [631] with a pipe circuit /632\ forming a resulting value of at least one memory block circuit [633]. A related symbol '[631] /632\ [634]' of P2 may specify a memory circuit [631] with a pipe circuit /632\ forming a resulting value of a second memory block circuit [634]. Such statements may specify parallelism of sub-paths {[633] /635X\ [636]} and [634] /635Y\ [637]. According to symbol criteria there may be circuits of a DUPPL machine itself realizing memory block and pipe referents of such symbols.

A fork-pipe 610 may split a symbol, (b), of a domain B represented in a memory block 611 into a diversity of symbols, e.g. into a symbol (a1) of a domain A1 stored in a memory block 613 and into a symbol (a2) of a domain A2 stored in a memory block 614.

A join-pipe 620 may join a diversity of symbols, e.g. of a symbol (a1) of domain A1 stored in a memory block 621 with a symbol (a2) of a domain A2 stored in a memory block 622 into a single symbol (b) of a domain B stored in a variable object of a memory block 624.

Consequently, an arrow (A,D) of a pipe 630 may be formed via a parallel pipeline of a circuit 635X realizing an arrow MX and a circuit 635Y, realizing an arrow MY, with an associated fork-pipe 632, a join-pipe 638, and circuits memory blocks of associated variable objects. Variable objects may include a memory block 633 containing an intermediate symbol (bx), a memory block 634 containing an intermediate symbol "by", a memory block 636 containing an intermediate symbol cx, and a memory block 637 containing an intermediate symbol cy.

As an illustrative example of the use of parallel pipelines 600, a database may include separate data for employee home address and for employee paychecks, both indexed via employee name. A map (A,D) may map employee names to printed paychecks using both paycheck amounts and home address. A symbol (a) of memory block 631 may be an employee name. Such a name (a) may be split by fork 632 with identical copies of (a) provided as a variable symbol (bx) of memory block 633 and as a variable symbol by of memory block 634. An employee address arrow of circuits pipe 635X may yield an address cx of a memory block 636 employee (a) from arrow MX of pipe 635X. An employee paycheck arrow of circuits 635Y may retrieve yield an employee paycheck amount cy of a memory block 637 for employee (a) from arrow MY of pipe 635Y. A join pipe 638 may combine an address of variable object cx of memory block 636 with a paycheck amount of variable object cy from memory block 637 to form a symbol (d) for (employee name, employee address, paycheck amount) in a memory block 639.

More generally, alternating of symbols of [places] and /actions\ may form a composite symbol P '{[place1] /action pipe\ [place2]}' of a (Self) 190. Circuit referents of P in a DUPPL machine itself may result in an action performed by circuits of /action pipe\ on fixed and variable objects of a [place1]. Other circuits of such an /action pipe\ may direct resulting data to a [place2] consisting of variable circuits of memory blocks of [place2]. A symbol PP '{FJX {[place1] /fork pipe\ [place2] /action pipe1\ [place3] /join pipe\ [place6]} {[place1] /fork pipe\ [place4] /action pipe2\ [place5] /join pipe\ [place6]}}' may express a fork join example circuit. Referents of FJX may include a single [place1] such as circuits of a memory block named 'place1'. A circuit referent /fork pipe\ may transfer a replica of the contents of a memory block circuit place1 to a memory block of place2 and place4. Other referents of FJX may include parallel action pipes /action pipe1\ and an /action pipe2\ of circuits performing maps in parallel to result in values of memory block circuits place3 and place5. Finally circuits of a /join pipe\ may join variable values of memory blocks place 3 and place 5 to a final resulting value of memory blocks [place6]. Circuit referent symbols indicative of a parallel pipeline may correspond to circuits of a VHDL entity and architecture expressions for memory blocks and pipe circuits.

Figure 6A:
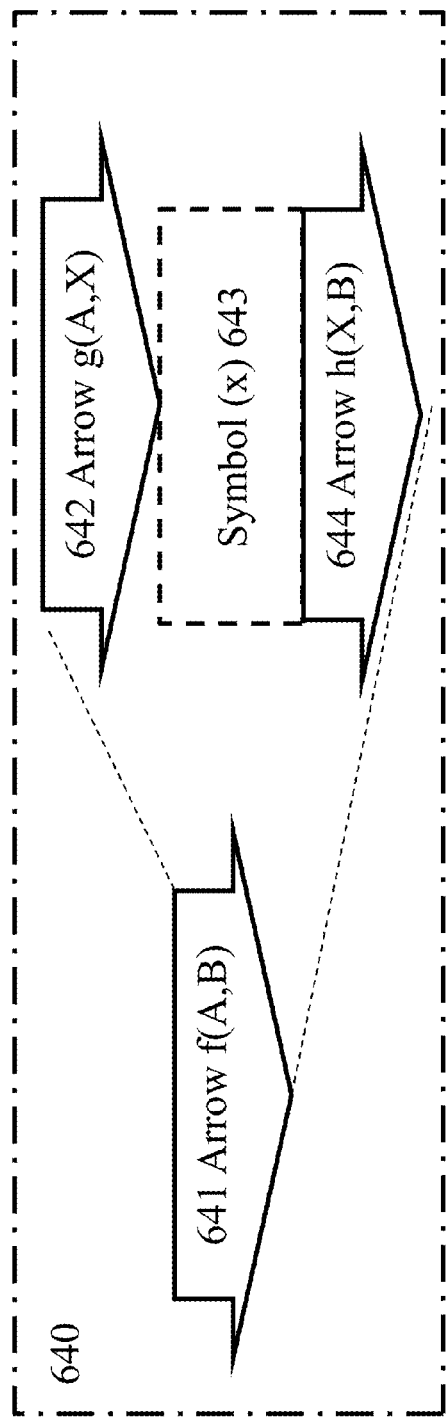
FIG. 6A illustrates an example of a hierarchical pipeline that may be formed by objects of memory blocks and arrows of pipes in a DUPPL machine

FIG. 6A, Hierarchical Pipelines

There may be a hierarchical arrangement of pipe circuits 640 of FIG. 6A. An arrow realizing an information processing function Map(A,B) may be implemented, for example, in pipe 140 of FIG. 1. Such a pipe may embody a hierarchical pipeline via pipe circuits of FIG. 6A. An arrow f(A,B) of a pipe 641 comprise pipe circuit 642 implementing arrow g, memory block 642, and pipe circuit 644 implementing arrow h arranged in sequence. Pipe circuits 642 and 644 may share a common hidden domain X containing a hidden variable object (x) stored in a memory block 643. Circuits of arrow 641, memory block 642, and arrow 643 may comprise arrow f(A,B) of a hierarchical pipeline 641. An arrow f(A,B) may comprise a sequence of arrows g(A,X) and h(X,B). A complete, consistent arrow f(A,B) may be realized if the input domain of arrow h(X,B) is the output domain of arrow g(A,X). In such a case, domain X may be termed a "hidden domain" of g and h as "hidden arrows" having a "shared domain X." Symbols of a (Self) 190 may specify circuits of pipes realizing a Map(A,B). A symbol M1 '(Map(A,B) (b ({/f(a)\})))' may specify an (arrow thing) named Map(A,B) having an (information thing) named (b). Such a (thing b) may have a value deriving from a {path} consisting of an action /f\ that may have as its object a thing (a) of a memory block named (a). A path {/f(a)\} of M1 may refer to a symbol M2 that may express an action f as a sequence of actions g followed by h. One such symbol M2 may express action f as a path from a to b via a hidden memory block x: {/f(a)\ {[a] [/g(a,x)\] [x] [/h(x,b)\] [b]}}. A VHDL process expression for M2 may define referent circuits begin process f; x=g(a); b=h(x); end process; according to VHDL syntax.

Hidden domains X and hidden arrows g and h may be repeated to form additional hidden arrows and hidden domains. Fork and join pipes with arrows MX and MY may be combined with hidden domains X and arrows g and h to form a multiplicity arrangements of parallel pipelines. Simple arrows may be composed with other arrows and intermediate objects, forming increasingly complex arrows of domains building up practical applications such as, for example, spreadsheets, databases, web services, and embedded controllers.

Figure 7:
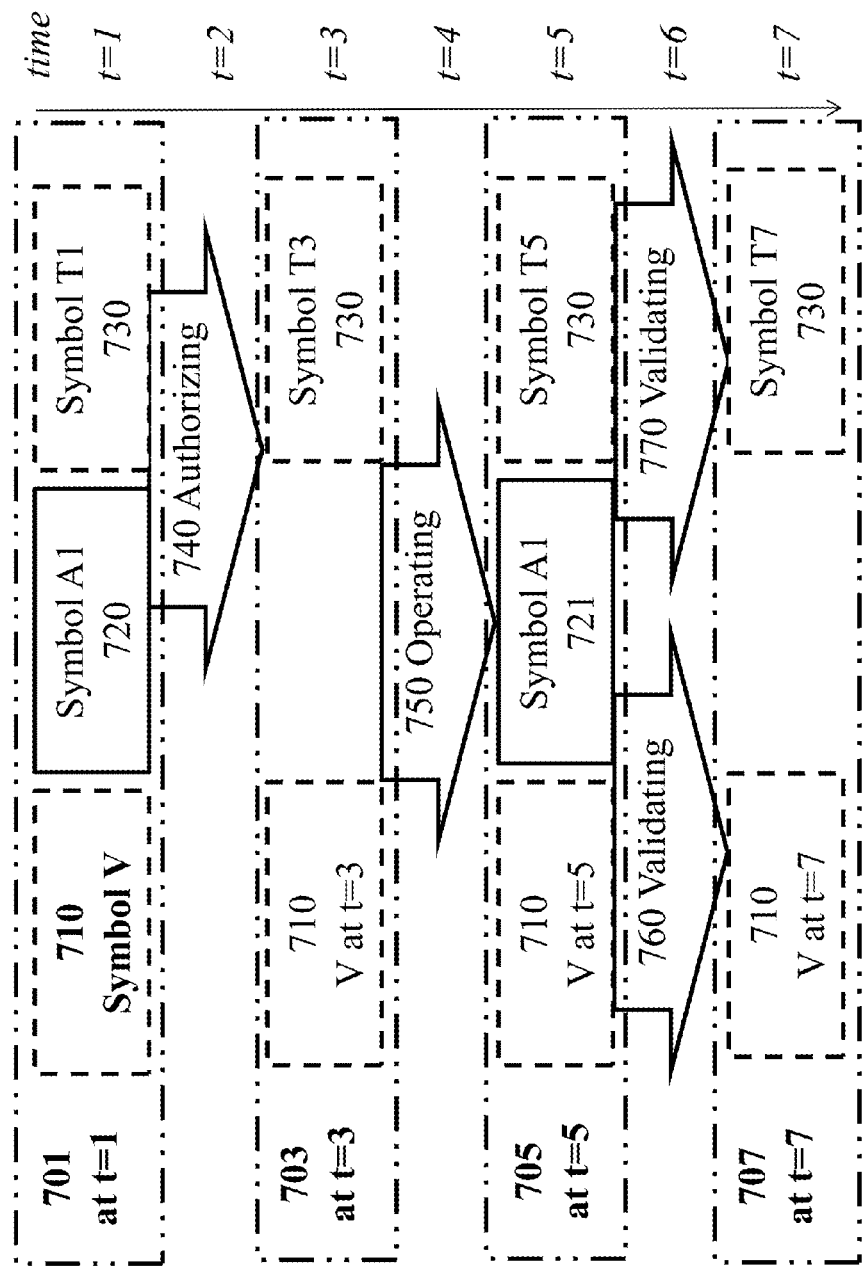
FIG. 7 illustrates examples of token processing that may occur in a DUPPL machine.

FIG. 7 Token Processing

FIG. 7 illustrates an example timing diagram of circuitry for the interaction of a token with a variable object. FIG. 7 illustrates how circuits 700 associated with a pipe segment (e.g., Map(A,B) of pipe 140 of FIG. 1) may map a token symbol T1 at a memory block 730 at a time t=1 to a new token symbol T7 still at a memory block 730 via interaction with a variable object V of a memory block 710. Such a variable object V may be associated with a fixed object A 720 as a symbolic address A for variable V. Variable symbol V of memory block 710 may be physically, electrically, and logically isolated from all other memory blocks including a memory block 730 containing token T having a value T1 at time t=1, that may be mapped to a valued T3 at time t=3, mapped to T5 at t=5, and finally mapped to T7 at t=7.

An arrow 740 authorizing interaction at time t=2 may map a fixed symbolic address A1 720 and a token T1 at 730 to a new token T3 of memory block 730 in authorizing such interaction. At time t=4 an arrow 750 may realize interaction between variable V at 710 and token T3, mapping a token symbol T3 to a derived symbol T5 at memory block 730 at time t=5. At time t=6, an arrow 760 may validate a resulting symbol of a variable V of a memory block 710; an arrow 770 may validate token T5 resulting in a final token T7 at memory block 730 at time t=7. Resulting token T7, resulting from Map(A,B) of, e.g. pipe 140 in FIG. 1 may replicate T7 from memory block 730 to memory block 150 in FIG. 1.

A processing interaction of FIG. 7 may be realized via operations of circuits of pipes 740, 750, 760, and 770. Such pipes may be proximate to memory blocks 710 720, and 730. Each such pipe may be an instance of circuits of FIG. 5, transforming an input symbol to an output symbol via a lookup table.

In an illustrative spreadsheet application, an input token T1='/Get Balance\ ' at 730 may query a 'Balance' cell 710 having a value $500.00. Token T1 may be mapped successively according to authorization 740 to an output token T7, e.g. =(Checkbook [Balance $500.00]). In such a spreadsheet example, a resulting token T7 may have the information processing function and symbol returning a value, e.g. T7='(Checkbook [Balance $500.00])' returned to a user ultimately via output port 102.

Unlike conventional general purpose shared CPU shared memory computing apparatus, a symbolic label A of a constant memory block 720 and the associated circuits of pipes 740, 750, 760, and 770 may be hardwired, may not be altered by software, hence not by malware, and thus may reduce the opportunity for malware to violate the authorized usage of memory block 710.

Figure 8:
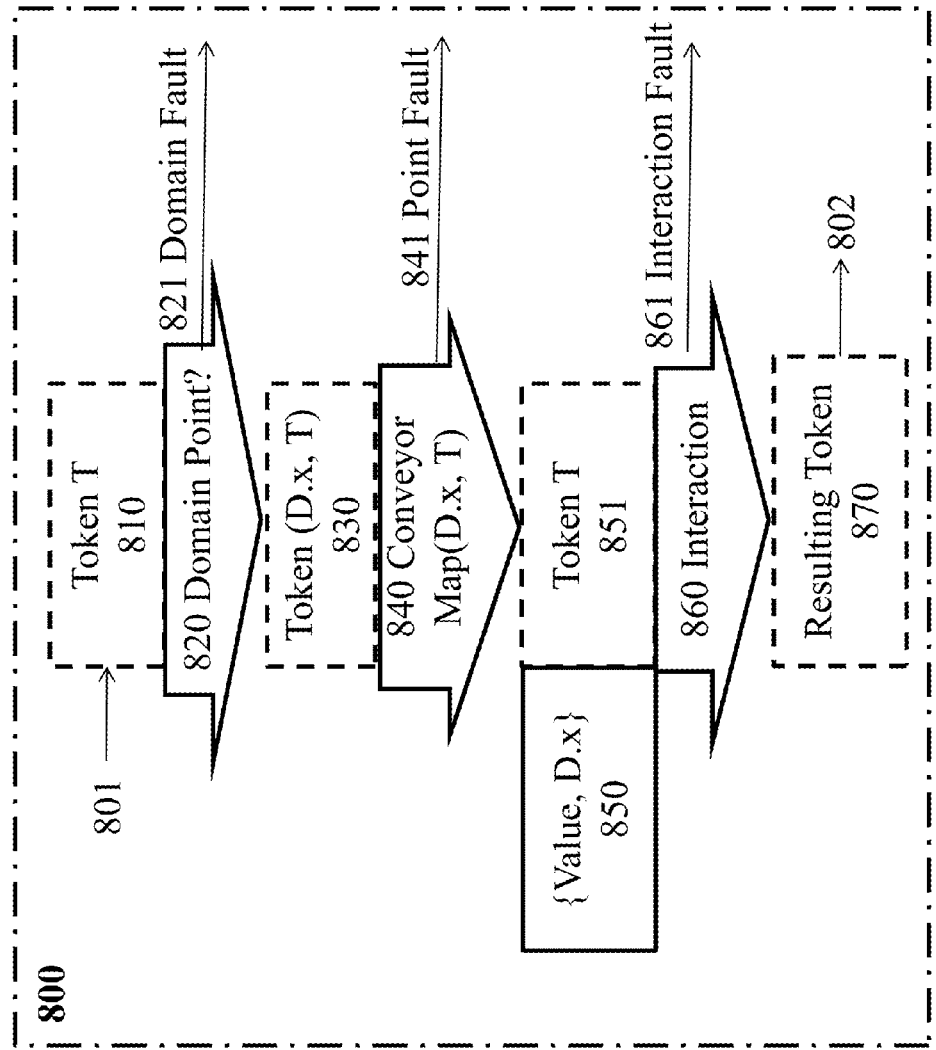
FIG. 8 illustrates an example conveyor belt for processing tokens through a sequential arrangement of arrows.

FIG. 8, Conveyor Belt Circuits

FIG. 8 illustrates an example conveyor belt for processing tokens through a sequential arrangement of arrows. A multiplicity of circuits of pipes and memory blocks 710, 720, and 730 may appear repeatedly throughout a DUPPL machine. Parallel pipelines may be realized according to circuits 610-640. Thus efficient circuits may be needed for moving tokens through parallel pipelines for interactions 701-707. Such circuits may be called a conveyor belt. FIG. 8 further illustrates an input conveyor belt for efficiently moving tokens, clarifying the circuits of a Map(A,B) of pipe 140 in moving tokens from validated input symbols of memory block 130 to a specific place specified by a token (A,a) to a point of interaction 701 within a Map(A,B) of pipe 140 for information processing via tokens. An output conveyor belt may transfer resulting tokens efficiently from such an interaction point within a Map(A,B) of pipe 140 to a memory block 150 as a resulting symbol (b) of Map(A,B).

A conveyor belt 800 may comprise circuits forming a sequence of maps 820 and 840 that move a token symbol T at memory block 810 to an intended interaction point of memory blocks at 850 and 851 for interaction arrow circuits 860 yielding a resulting token in memory block 870. Interaction arrow circuits 860 may be realized via circuits and interaction timing arrangement of FIG. 7. Memory blocks 850 may be realized according to memory blocks 710 and 720. Token memory block 851 may be realized as memory block 730. A conveyor belt 800 therefore may provide efficient circuits for moving token symbols to points of interaction.

A token symbol T at 810 may enter a conveyor belt 800 in the form of a validated symbol (A, a) via circuits 801. A symbol form (A, a) at 810 may indicate via notation 250 a symbolic address of an access a point x of some domain D having a symbolic form 'D.x' that may be a symbolic label for an associated value of a symbolically labeled memory block 850. In a database application, for example, a point x may be a record number x of a domain D that may be a database. Token T may refer to an item x of a domain D. A Domain Point? map of pipe 820 may extract from T the symbolic address 'x' with respect to a domain 'D'. Thus map "Domain Point?" of pipe 820 may form a derived token (D.x, T) at memory block 830. A symbolic address 'D.x' of token symbol T at memory block 830 may indicate a labeled variable object 850 that exists within the DUPPL machine. In case domain D of labeled variable object 850 does not exist, a "Domain Point?" map of pipe 820 may signal a domain fault to fault recovery circuits 180. Otherwise, an annotated token T having a valid domain D of a symbolic form (D.x, T) may be the symbol located in memory block 830.

A conveyor map 840 may comprise circuitry connected to each member D.1, D.2, . . . D.ND of a domain D. In case conveyor map of pipe 840 detects no such symbolic address 'x' within its domain D for a labeled variable object 850 such a conveyor map may of pipe 840 may signal a point fault to fault recovery circuitry 180 of a DUPPL machine. Otherwise, conveyor map of pipe 840 may initiate circuits of a bus B of pipe 840 that may move annotated token T from a source point at memory block 830 to a destination point at memory block 851 proximate to a symbolically addressed memory block 850 having symbolic address 'x' of domain D.

A Conveyor Map(Dx,T) of pipe 840 thus may transport a token T of a symbol (Dx,T) at memory block 830 to an access point 851 of a labeled variable {Value,Dx} at memory block 850. In an example, a token T having symbol T=/Set 7D=$29.95\, a destination D.x of a spreadsheet domain D and of a cell '7D' at 830 may result in the transport of symbol T to an access point 851 proximate to a variable object at 850 of domain D, a spreadsheet domain, labeled with value x, in this example, cell designator '7D'.

An Interaction map may be realized in circuits 860 mechanizing interaction, e.g. according to an interaction pattern of FIG. 7. Interaction according to circuits 860 may alter token T so that a resulting token T at memory block 870 may reflect results of interaction. A resulting token T stored in memory block 870 may continue down parallel pipelines via circuits 802. Alternatively, an output conveyor belt may map a resulting token T at 870 directly to a memory block 150 of DUPPL machine in a manner analogous to conveyor map 840, having circuits for each member D.x of domain X that may be connected directly to a memory block 150 for the efficient movement of resulting tokens at memory block 870 to memory block 150 as a symbol (b), resulting from a Map(A,B) of which conveyor belt circuits 800 may be a part.

Figure 9:
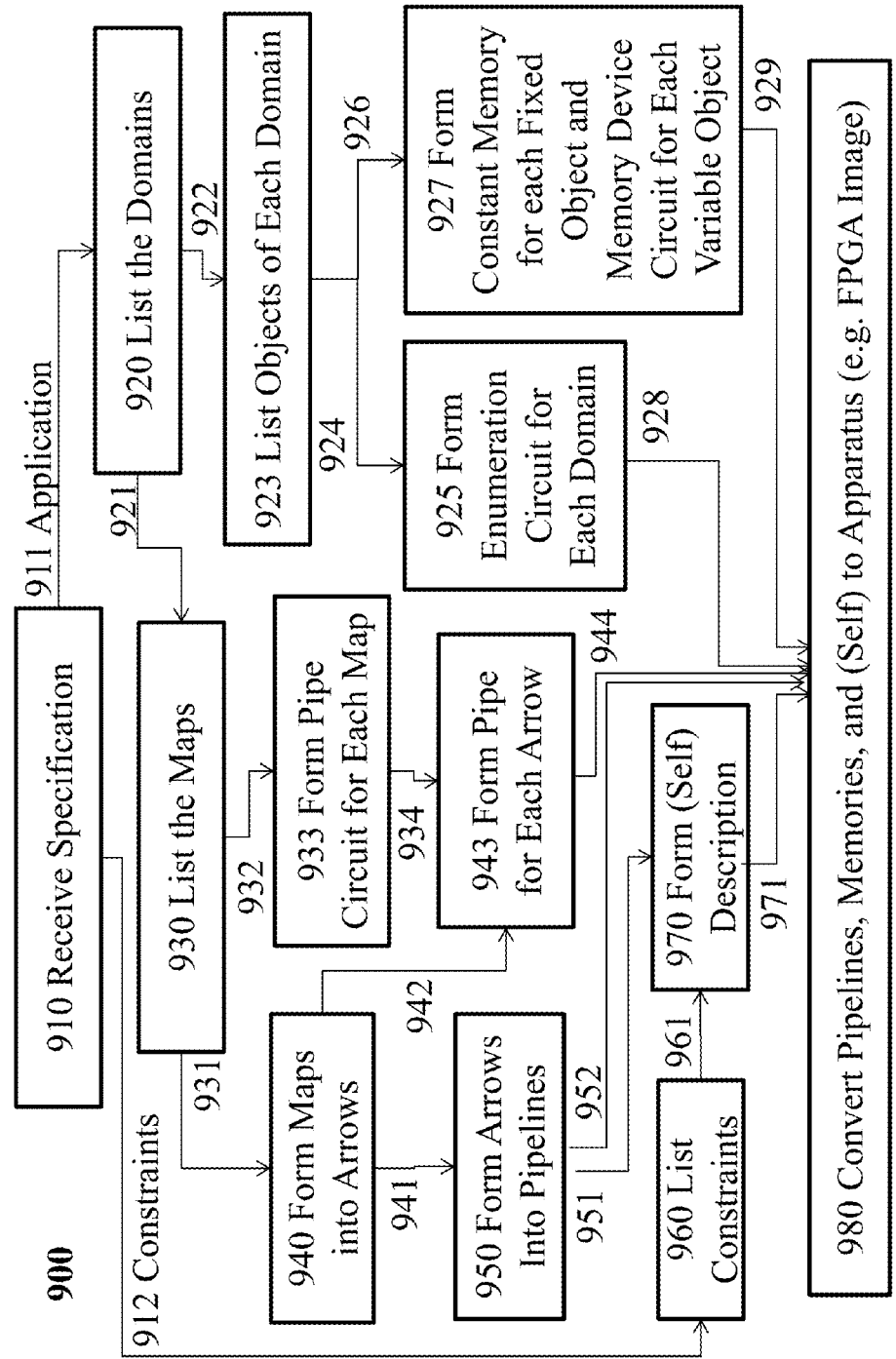
FIG. 9 illustrates an example flow chart that depicts a method for transforming a specification into a DUPPL machine.

FIG. 9, Transforming a Specification to a DUPPL Machine

FIG. 9 illustrates an example flow chart depicting a method for transforming a specification into a DUPPL machine. In FIG. 9, an application that is expressed in a human language specification may be mapped to a specification that is in the notation of DUPPL domains (e.g., notation of FIG. 2), and the specification may in turn be mapped to fixed constants, immutable pipe circuits and memory circuits for variable objects of a DUPPL machine. Flow chart 900 shows the steps of a DUPPL machine instantiation method, while drawings of FIG. 10 through FIG. 23 explain a specific example application from concept through realization. Based on such an explanation and example, circuits 300-800 may realize a DUPPL machine. Such circuits may embody notation 250 for a (Self) description 190 embedded into such a DUPPL machine and according to which such a machine may process information. Method 900 thus transforms an application 901 from a specification 910 into, e.g. a compiled VHDL image 980 that may form circuits of one or more ASICs or FPGAs and other circuits of a DUPPL machine.

An application for a DUPPL machine may have a written specification 910. Such a specification may include graphics and a use-case. Further details of a specification are provided in connection with the example specification for a spreadsheet machine that is illustrated in FIGS. 10 and 11. Specification 910 provides a starting point and reference for the listing of domains of step 920 and for the listing of maps of step 930 for an application of specification 910.

A domain identification step 920 lists any "thing" referred to in specification 910 as if it were a concrete or abstract thing as a possible member of a DUPPL domain. A domain is a collection of abstract things such as the letters of the alphabet or of concrete things such as traffic lights on a street corner. Having listed all such things evident in a specification 910, each thing may be examined further to determine whether it may be a unique thing (e.g. a singleton member of a domain containing only that thing), a member of an application-specific collection to be incorporated as a domain; or a member of a more general collection that may need to be dealt with in some way, including possibly listing such a collection for a (Self) description 970 as specifically excluded from such a DUPPL machine.

A singleton member of a singleton domain listed at 920 may be a single application, for example, a spreadsheet application. Another singleton domain may comprise a specific person for whom such a DUPPL machine may be intended, i.e. as a user-specific machine. Such a singleton user domain may be expressed in notation 250, e.g. as (User[named (joe)]), where a User is regarded as a thing and a name as a place for a person ('joe') to be named. Thus, the concept of naming in this self-description may have a role of a place with respect to a reference thing (User) that is a part of the (Self) and a mobile thing (joe) that is conceived as occupying a role of being named as such a User. A serial number of a machine also may be a singleton (Self [Serial Number (00001)]). In this last example, serial number may be a place within the (Self) description in which to insert a sequence number, e.g. derived when a DUPPL machine is manufactured.

A multiplicity of specific users, on the other hand, may be listed at step 920 and described in notation 250 as an application-specific domain, such as (Users [named (joe) (Nick) (Sally)]). Other such enumerated domains may include a listing of the departments of NewCo, such as (NewCo [Departments (Traffic Services) (Executive Offices)(Human Resources)(Payroll)]). Such a listing need not be complete, but any items not included in the listing of objects in a Domain Departments may not be accepted by a DUPPL machine as legitimate (NewCo [Departments]). A small company such as a NewCo sole proprietorship might not have a (Human Resources) department. Employees of HR, then might be null, noted according to notation 250 as (Human Resources [Employees 0]) via null object notation 220. Thus, listing a domain D at step 920 with possible members d1, d2, etc. may enter into a (Self) description so that a (Self) may be aware of the possibilities, but may not force a (Self) to embody further information that may not be applicable.

Many domains listed at step 920 may be so large that it may be impractical to enumerate all of the possible members of such a domain. A number entered into a spreadsheet, for example, at first may appear to be arbitrary. A DUPPL spreadsheet machine, however, enumerates or otherwise constrains and describes each of its domains. Without a domain, there may be a lack of criteria for validating symbols of variable objects intended to represent objects of such a domain. Thus, for example, a domain of Numbers may be restricted to numbers having fewer than, for example, 100 textual digits, which may not be a practical limitation on a user, but that may form a viable domain. A RegEx string may be listed at step 920 as Domain-of-Numbers='/^([0-9]+)$/' with a constraint $1.length<100 to define such a domain without explicitly listing all of its members.

Thus constraints 912 may be included in a listing of constraints at step 960. A constraint may place limits on a symbol (e.g. of a variable object). A list of domains of step 920 may be incomplete. A minimum number of domains comprising an application may realize the Domains listing of step 920 to enumerate constraints for step 960.

Domains of step 920 may include a list of the most common (things) with which a DUPPL machine may interact in order to perform valuable information processing services including data storage, retrieval, and communications. Common (things) may include (Users), (Services), (Managers), (Locations) and (Time) epochs such as time periods of intended machine operation, time for user-aided learning and time for self-reconfiguration. Users may need such things embedded into a resulting DUPPL machine in order to receive services intended.

Each domain enumerated or described, e.g. via RegEx may require associated maps listed at step 930. Such maps may include a successor function for a given Domain, Domain.s( ). An alphabet is an example of a domain for which s( ) alphabetical order, may be widely known. The successor of the letter A in the English alphabet is B, so s(A)=B. Since A does not have a precursor, drawing on a mathematics discipline called category theory, there may be an initial object of an alphabet domain that serves as a generic starting point for the domain and from which all items of the domain may be reached via a map. Thus, Alphabet.0 may provide an initial object of an Alphabet. The successor of Alphabet.0 is A, so s(Alphabet.0)=A. The remaining successors may be evident with s(A)=B, s(B)=C and so forth until s(Y)=Z. What is s(Z)? Again drawing on category theory, there may be a terminal object Domain.1 that is reachable from all members of the domain via a map. Hence, s(Z)=Alphabet. 1. Such initial and terminal objects may be defined in step 923.

Domains listed at step 920 for which successor maps are not clear at step 930 may be clarified. Consider, for example, employees. What is the successor function "next employee" for a domain of employees? Next hire date? Corporate rank from highest to lowest? In the listing of maps at 930, it does not matter. Any or all of these maps may apply to an Employees domain. A map that is not ambiguous may define a successor, e.g. of a given employee.

Notation (such as that shown in FIG. 2) may provide a convenient method of describing maps. For example, an Alphabet domain may have a path {[A] [B] . . . [Z]} listing the letters of the alphabet in alphabetical order. A symbol (Alphabet {[A] [B] . . . [Z]}) provides self-descriptive notation (e.g., notation 200 of FIG. 2) that may be read as "A thing called Alphabet is a reference thing for a path beginning at a place of the Alphabet named A and continuing with B and so forth to a last place named Z. An Executive Office may have a role termed President, so (Executive Office [President (Nick)]), may express the fact that Nick is president, e.g. of NewCo. Such a relationship also may be noted as (NewCo [Executive Office [President (Nick)]]), which formulates the executive office as a place within NewCo as well as a thing in its own right.

A set of maps resulting from step 930 may be organized into information processing arrows in step 940 as follows. An arrow f is a mapping from one domain A to another domain B such that each object (a) in domain A has some map f(a) in arrow f such that f(a)=b. An arrow also must have an inverse so that given (b) in B, there is a map (some algorithm for example or audit trail listing) that will indicate which (a) in A created (b) in B. Thus, an example spreadsheet application for a payroll may include a mapping from employee name to employee address. Since two employees may live at the same address, a map from address to name may not have a unique inverse. Thus, at step 930, one may establish methods for addressing practical issues, such as forming an employee identification number and such as allowing employees to share an address under constraints that may be listed in step 960.

A complete arrow may be designated as f(A,B). Thus, a list of maps generated at step 930 may result in a list of arrows such as employee((name, hiring date) number) that may be complete, consistent, and that may always have an inverse so that given an output of such an arrow, it is always possible to determine which input caused the output.

Next, at step 950, a collection of domains and arrows should be configured into pipelines. Step 950 may be application-specific. In a spreadsheet example, circuits of a DUPPL machine may be organized around the concept of a (cell) as a most-common thing, each of which may have a symbolic address, e.g. text indicating the row and column of such a cell. Cells, then, may be a domain. Mouse entries and tab keys may provide motion of a point of focus among cells. Therefore, a pipeline may be expressed at step 950 for mapping a 'tab' key symbol into a reference Cell symbolic address. Given a reference Cell, another pipeline may be expressed at 950 for retrieving the contents of a referenced cell of a Cell domain. Other pipes may provide for text entry at a reference Cell. Other pipes may provide for domain-specific arithmetic operations (=, +, −, *, %, etc.), e.g. of a payroll domain. A pipeline constraint of step 950 may include a constraint that a payroll application does not need an exponent function associated with a symbol '^'. Pipelines may be determined as parallel processes, such as retrieving name, address, social security number in parallel from an employee data base given employee number as an input domain. In a DUPPL machine, parallel information processes may result in physically parallel pipelines via circuits 610, 620, and 630. Pipelines at step 950 may be determined at a top level with details to be provided later, such as via hierarchical pipelines of circuits 640. Step 950 lists such parallel pipelines as may be sufficient to specify a DUPPL machine.

After forming a list of pipelines at step 950, method 900 has generated lists of domains, maps, arrows, and pipelines. Step 960 then reviews all of these lists with specification 910 to generate a list of constraints with special emphasis on a list of things that the system will not do.

A (Self) description step 970 then may combine domains, maps, arrows, pipelines, and constraints to form a DUPPL machine self-description, e.g. using a symbolic notation of FIG. 2. Steps 920 to 970 comprise a top-down description of a DUPPL machine for specification 910. A further level of refinement may be performed at this point.

Specifically at step 923, a list of domains may be refined into a complete, consistent listing of all of the objects of each domain. This listing may include the generation of compact text forms such as RegEx expressions that may describe quantities of objects that may be too large or otherwise inappropriate to be listed individually such as possible names of employees for which there may be a RegEx and not a listing. At step 925, a circuit may be designed according to circuit 300 as a design pattern to enumerate each object of each domain. A result of step 925 may be circuits at 928 for each domain of an intended DUPPL machine.

At step 927, circuits may be designed to embody symbolic labels of variable objects in fixed objects and to associate variable objects with fixed symbolic labels such that there is a circuit at 929 as a result of step 927 corresponding to every variable object of an intended DUPPL machine.

More specifically at step 933, a pipe circuit may be formed to realize each map listed in step 930, constrained in step 960 and described as a (Self) at step 970. Such a pipe circuit generation step 933 may result in a collection of pipe circuit designs at 934. Such pipe circuits may be assessed for completeness and consistency and melded into arrows at step 943, resulting in circuits for pipes realizing complete, consistent arrows at 944.

Finally, a compilation step at 980 may employ an industry-standard software suite to integrate pipes forming arrows at 944, circuits forming domains at 928, circuits forming symbolically labeled variable objects at 929 and a (Self) descriptive text at 971 into an apparatus. A more detailed textual expression of such circuits e.g. in an industry standard language such as VHDL may be compiled into ASIC or FPGA images 980. Domain-specific application-specific hardware thus may result.

FIG. 10, a Spreadsheet Application

FIG. 10 illustrates process 900 with an example spreadsheet application. The most common (thing) in a spreadsheet may be a (cell) 1010. Cells may be arranged in rows 1020 and columns 1030. Domains of this spreadsheet may include a Columns domain of 26 columns, one for each letter of the alphabet and a Rows domain of 100 rows, such as one heading row of labels A, B, . . . , Z and 99 rows 1030 for a total of 2600 cells in a Cells domain. In this example, row and column domains may be joined, e.g. for (row, column) labeling with the first cell having label '1A'.

A (Self) 190 may include a symbol '(Self Spreadsheet)' describing the DUPPL machine itself as a spreadsheet. Further symbols of (Self) 190 may define cells as '(Spreadsheet [Row 1 [Column A(Cell '1A')]] [Row 1 [Column B(Cell '1B')]] . . . [Row 99[Column Z(Cell '99Z')]]), where a thing (Cell) may be a variable object of a memory block and label '1A' may be a constant symbol. The following example specification illustrates spreadsheet application 1000.

"A DUPPL Machine, DM1, should be a spreadsheet ASIC with specific applications of its buyer, NewCo of Saint Augustine, Fla. for a contracted time frame of 1 Jan. 2011-31 Dec. 2013. The designated user of DM1 will be Joe J. Jones known as Joe or JJJ. The DM1 ASIC may be manufactured for NewCo for use by JJJ for keeping a checkbook, entering time cards for payroll and observing the status of traffic lights, which is a service of NewCo. The DM1 ASIC may have user, owner, location, time frame, and usage information embedded into its (Self) description via notation 250 as constant symbols of the DM1 ASIC hardware, along with product serial number. DM1 may embody JJJ's biometrics for authentication. DM1 may allow JJJ to perform only data entry, unless given permission an authorized person, Nick N Nobody (NNN), President of NewCo. The identities and biometrics of JJJ, NNN, and anyone else in NewCo authorized to interact with DM1 may be hard wired into DM1 at the factory forming a self-awareness, user-awareness, usage awareness self-description via notation 250. DM1 may express, "I am the NewCo Payroll Spreadsheet Machine of Joe J Jones (JJJ) of NewCo, 1111 Atlantic Avenue, St. Augustine, Fla. and I am valid until 31 Dec. 2013 after which time or if moved from that location or if tampered with, I will self-destruct." DM1's embedded self-awareness might not be changed, not even by the user, NewCo, or hardware maintenance technician without destroying DM1, e.g. by self-nulling of all of its own memory blocks. Since DM1 is application specific and domain-specific, hardwired at the factory, no systems administrator or computer programmer may be needed by user JJJ and manager NNN. According to DM1's hardwired (Self) description, DM1 will accept updates to checkbook 1000 from JJJ. DM1 may learn from JJJ that a value "?" in a Cell for HoursWorked maps to a category "Unknown" of a Beliefs domain of DM1. When NewCo hires a new person, Sally S Smith (SSS), to assist JJJ with payroll, a new DUPPL ASIC, DM2 may be manufactured for Sally's exclusive use and JJJ may receive a new ASIC DM1A that knows Sally. When the IRS changes withholding requirements, JJJ, Sally, and other NewCo employees may receive new DUPPL ASICs that may transfer data from the prior ASICs and then may destroy all of the data of the old ASIC electronically. JJJ and NewCo may employ multiple DUPPL ASICs, such as a DUPPL Spreadsheet ASIC DM1, a printer-specific DUPPL Printer ASIC, a display-specific DUPPL Display ASIC, a keyboard-specific DUPPL Keyboard ASIC, and a NewCo specific database-specific DUPPL Database ASIC, all of which ASICs may embedded a self-description 250 as part of NewCo, valid through 31 Dec. 2013."

FIG. 11, NewCo Spreadsheet Application Domains

FIG. 11 illustrates additional details of example spreadsheet application of FIG. 10. Example domains for spreadsheet 1100 are illustrated at FIG. 11 at 1110, 1120, and 1130. A domain 1110 may be noted by users in human language that "Cells 1A, 2A, and 3A describe the spreadsheet." From such a human language description, a Descriptions domain may be formed as fixed constants of a cell 1A having a constant value 'This is Joe's Spreadsheet.' Values of a cell 2A and of a cell 3A may be fixed as the text values of spreadsheet 1100. Such constants 1110 expressing a Description domain may be permanent constants of JJJ's spreadsheet. An annotation 1120, e.g. of JJJ may specify in human language that Row 5 contains the constant labels of columns A, B, C, D, and E below row 5. An annotation 1130 may specify further that Column A after row 5 should contain dates. Accordingly, a DUPPL machine DM1 may contain a Date domain. According to annotation 1120, a Column B after row 5 may contain items of a NewCo-specific Check# domain. According to annotation 1120, a Column C after row 5 may contain items of a NewCo-specific Purpose domain. According to annotation 1120, a Column D after row 5 may contain items of a NewCo-specific Amount domain. According to annotation 1120, a Column E after row 5 may contain items of a NewCo-specific Balance domain. Thus, in DM1, the column headers each may correspond to a NewCo user-defined application-specific domain for a DUPPL machine DM1.

A specification concerning cell E7 may be expressed in human language at 1140 as a sentence 'Subtract D7 from E6 to get E7.' There may be a (Self) description of such a sentence as a notation 250 expressed in a symbol '(Self(Cell [(/E6-D7\)E7])' pairing a variable object with a fixed label 'E7' of a Cell array with a result of a pipe that may perform an action to subtract /(E6)–(D7)\ on variable objects E6 and D7. Accordingly, a DM pipe circuit of pattern 610 may join 'D7' in the role of a symbol (a1) at 611 with E6 in the role of a symbol (a2) at 612 to obtain E7 in the role of a symbol (b) at 614 via a map for subtraction of two numbers at 613. According to a pattern expressed at 1130 that columns below row 5 may contain values according to the headings, there may be pipes of a pattern 610 between successive items of column E, Balance. Such pipes may include a pipe /(E7)–(D8)\ establishing E8 and a pipe /(E98)–(D99)\ for E99. An attempt to move a cursor lower than E99 may cause a domain fault for a Rows domain that may result in a fault that may alert JJJ of the need for a larger spreadsheet machine.

Figure 12:
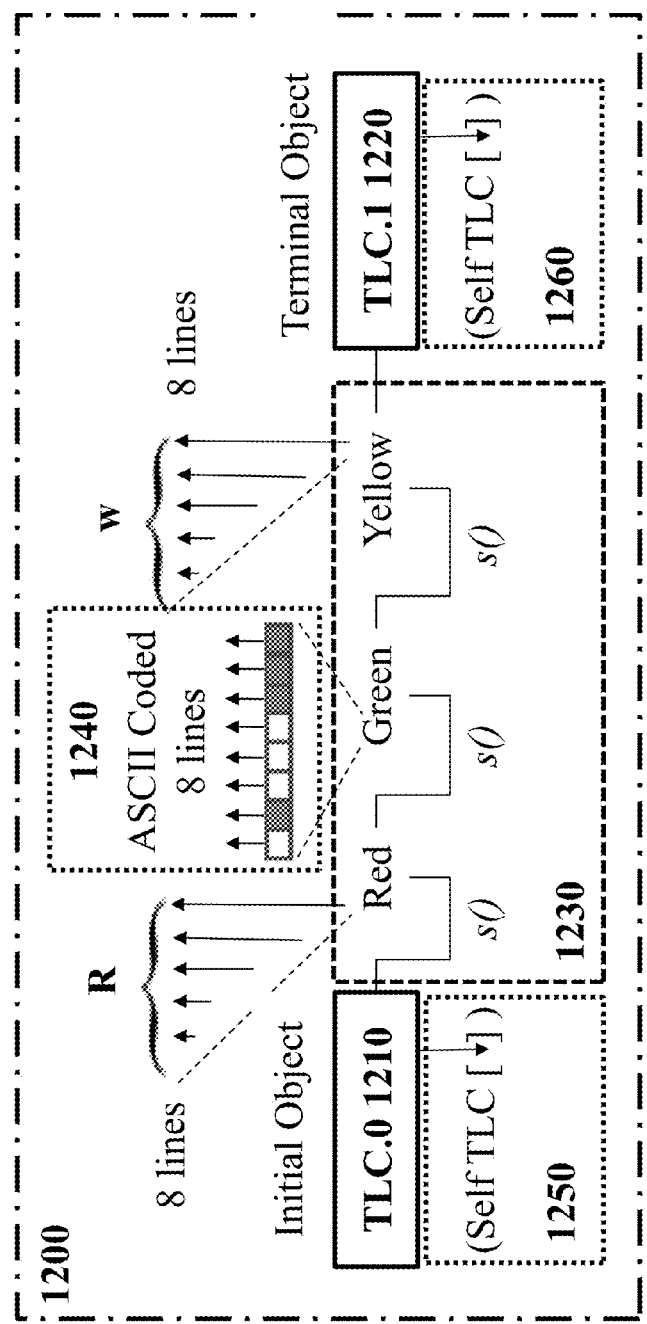
FIG. 12 illustrates example DUPPL machine circuitry having constants for a domain of traffic light colors (TLC)

FIG. 12, a Traffic Light Color (TLC) Domain

FIG. 12 illustrates example DUPPL machine circuitry having constants for a domain of traffic light colors (TLC). These circuits 1200 explain Domain circuits 300 in greater detail for a TLC domain of an illustrative spreadsheet application. Continuing with the NewCo use case discussed above, there may be a traffic light color domain, TLC. Such a domain may represent the colors of traffic lights of a NewCo traffic lights monitoring service for which JJJ may view a Traffic Lights Spreadsheet of JJJ's DUPPL Machine DM1. Following the circuitry of FIG. 3, a TLC domain 1200 may be realized in the circuits for an initial object, TLC.0 1210, a terminal object TLC.1 1220, and three objects of Domain TLC, one for each color 'Red' 'Green' and 'Yellow' 1230. Each such constant object may be coded in ASCII text 1240 of an 8 bit fixed constant '01000111' corresponding to ground (GND) and voltage (VCC) of a letter 'G' of an object 'Green'. Each such letter of the words of such a domain may be coded in Domain TLC 1230. There may be a circuits s( ) of domain 1230 between an initial object TLC.0 and a domain object 'Red' of combinatorial logic that may map an initial object TLC.0 of a TLC domain with a unique successor, 'Red'. An initial object TLC.0 may be mapped at 1250 to a self-description (Self) at a place '[ ]' containing an image 'TLC' of such an initial object forming a constant (Self TLC [0]) of the (Self) indicating that domain TLC may be available as an active domain of the (Self) having a point of access that may be hardwired between a TLC domain at 1250 and a (Self) description 190. A terminal object TLC.1 may be mapped at 1260 to (Self TLC [1]) to access the state of TLC.1 by arrows of a (Self) 190.

Figure 13:
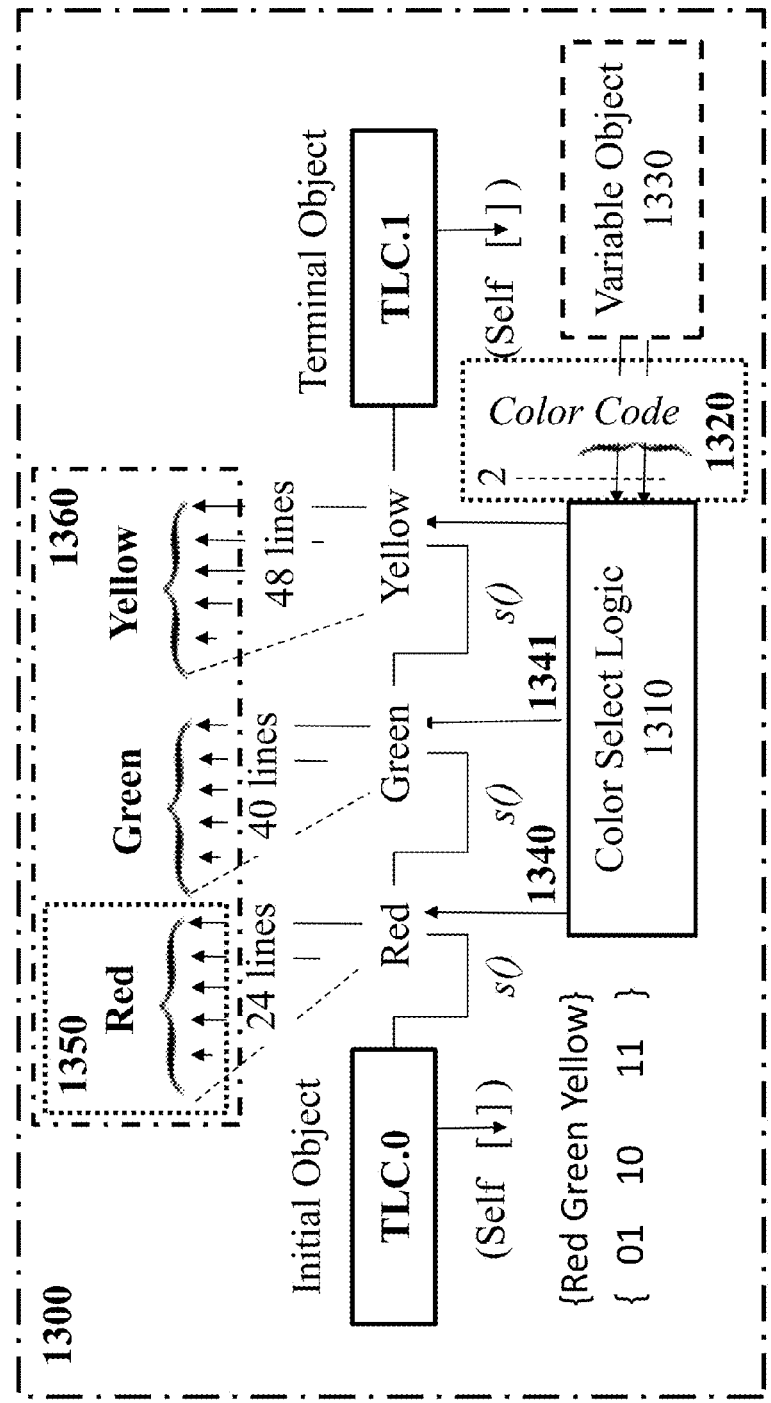
FIG. 13 illustrates example DUPPL machine circuitry for using a color code to select one of the three colors of a TLC domain.

FIG. 13, Circuits of a Color Code Selection Arrow

FIG. 13 illustrates example DUPPL machine circuitry for using a color code to select one of the three colors of a TLC domain. In particular, FIG. 13 provides example circuitry for a color code selection arrow that includes color code selection logic 1310, and may select exactly one of the three colors of a TLC domain, such as the TLC domain used above in connection with FIG. 12. A color code 1320 may be a compact form of traffic light color that may efficiently represent color by a binary code {00, 01, 10, 11} requiring two only two signal lines 1320. Color select logic 1310 may map a color code value "01" of a variable object 1330 to a color-select line 1340 to select a color 'Red' 1350 of a domain TLC 1200 also shown in 1300 for clarity. Other codes may employ other lines such as line 1341 to select other colors such as 'Green'. Such a color selection arrow 1300 may map from a coded form of color representation requiring only two signal lines 1320 to a verbose form at 1360 suited, e.g. to express color in human language. Maps of DM1 forming an inverse of map 1300, may map a verbose form 1360 to a coded form 1320. Circuits of such a map may be derived from circuits of an arrow 1300. Thus, information processing within DM1 may be compactly coded for hardware efficiency and may express information verbosely in human language for ease of interaction with human users like JJJ.

Figure 14:
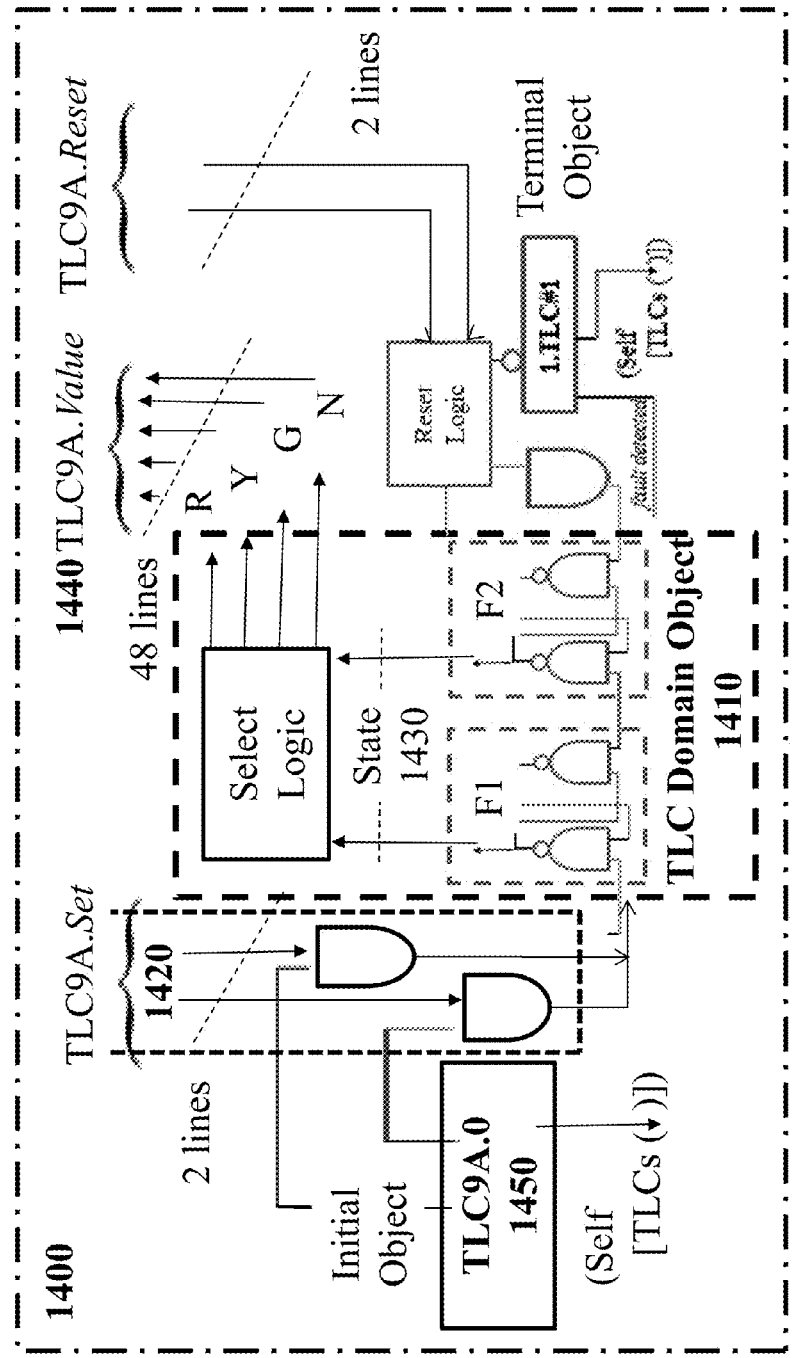
FIG. 14 illustrates example DUPPL machine circuitry for realizing a variable object of a TLC domain via flip-flops and combinatorial logic.

FIG. 14, Circuits of a Variable Object for TLC

FIG. 14 illustrates example DUPPL machine circuitry for realizing a variable object of a TLC domain via flip-flops and combinatorial logic. As illustrated, variable object circuitry 1400 may include a variable object of circuits 1410 comprising a memory block of two bits in length. Circuits 1410 may comprise a cell of a Cells domain {1A . . . 99Z} of a traffic light control spreadsheet via a domain initial object constant TLC9A.0 1450. Such a constant 1450 may designate memory block 1410 as a variable object of a traffic light color variable object '9A' of a TLC Cell '9A'. Such a cell '9A' may be one of 2600 cells of a Cells domain, each with memory blocks, some comparable to circuit 1410. A positive state of initial object TLC9A.0 1450 may enable circuits to set the state of variable object 1410 according to a binary value of two signaling wires 1420. A pair of wires 1430 may express a state of memory block 1410 corresponding to a color code of FIG. 13. A color code 1430 and color-select logic may generate a human readable color symbol as a text value 1440. Thus, variable objects may be comprised of a pair of flip-flops F1 and F2 of circuits 1410 when used in conjunction with domain-specific circuits 1420, 1430, 1440, and 1450 realizing symbolic information processing.

The 48 lines 1440 may comprise a pipe realizing a map TLC9A. Value that may express a color 'Red' or a color 'Green' or a color 'Yellow' as a value map of a Cell 9A of circuits TLC9A 1410. The color 'Yellow' may require 48 lines in a map circuit 1430 i.e. mapping ('11' 'Yellow) resulting in 'Yellow' at 1440. The color 'Red,' abbreviated 'R' in FIG. 14 for clarity, may require 24 lines with eight lines for each of its three characters. Therefore, in order to specify all 48 lines 1440, a map ('01' 'Red') may specify a value, such as an ASCII blank, ' ' for the otherwise unused lines. The color 'Green' may require 40 lines, while a complete, consistent map for green may be a revised map ('10' 'Green') having a blank character. Circuits 1410-1430-1440 may map each code {01, 10, 11} onto a corresponding color via maps ('01' 'Red_'), ('10' 'Green_') and ('11' 'Yellow) embodied therein. Such a set of maps may be referred to as a pipe, but not an arrow because of incompleteness.

Specifically, a domain TLC may have only three domain-specific objects, abbreviated R, Y, G, corresponding to codes of states {01, 10, 11} of a memory block 11410, while a pair of flip-flops F1 and F2 at of variable object TLC9A at memory block 1410 may have four possible states {00, 01, 10, 11}. According to symbol criteria, an arrow of method 950 in FIG. 9, must map all objects of a source domain A to some object of a target domain B. In this example, a collection of circuits 1410-1430-1440 produces TLC9A.value 1440 that maps only three states {01, 10, 11} of the four possible states of memory block 1410, leaving state {00} unmapped. Circuit 1410 by the structure of its flip flops F1 F2 defines an input domain A of the possible states of memory block 1410: {00, 01, 10, 11}. In order to form an arrow, circuits 1410-1430-1440 must map each state including state {00} of a variable object to an object of the TLC domain. To accomplish this, there may be a map from a state {00} onto a text expression 'TLC9A.1' at 1440 that may express that the state of variable object 1410 is not a member of TLC domain 1200, which may be a fault state. Alternatively, a string 'Null', having 48 lines, abbreviated N at 1440, may extend the example TLC domain to complete the collection of maps with a map ('00' 'Null') so that circuits 1410-1430-1440 may form a complete arrow consistent with the 48 lines 1440.

Figure 15:
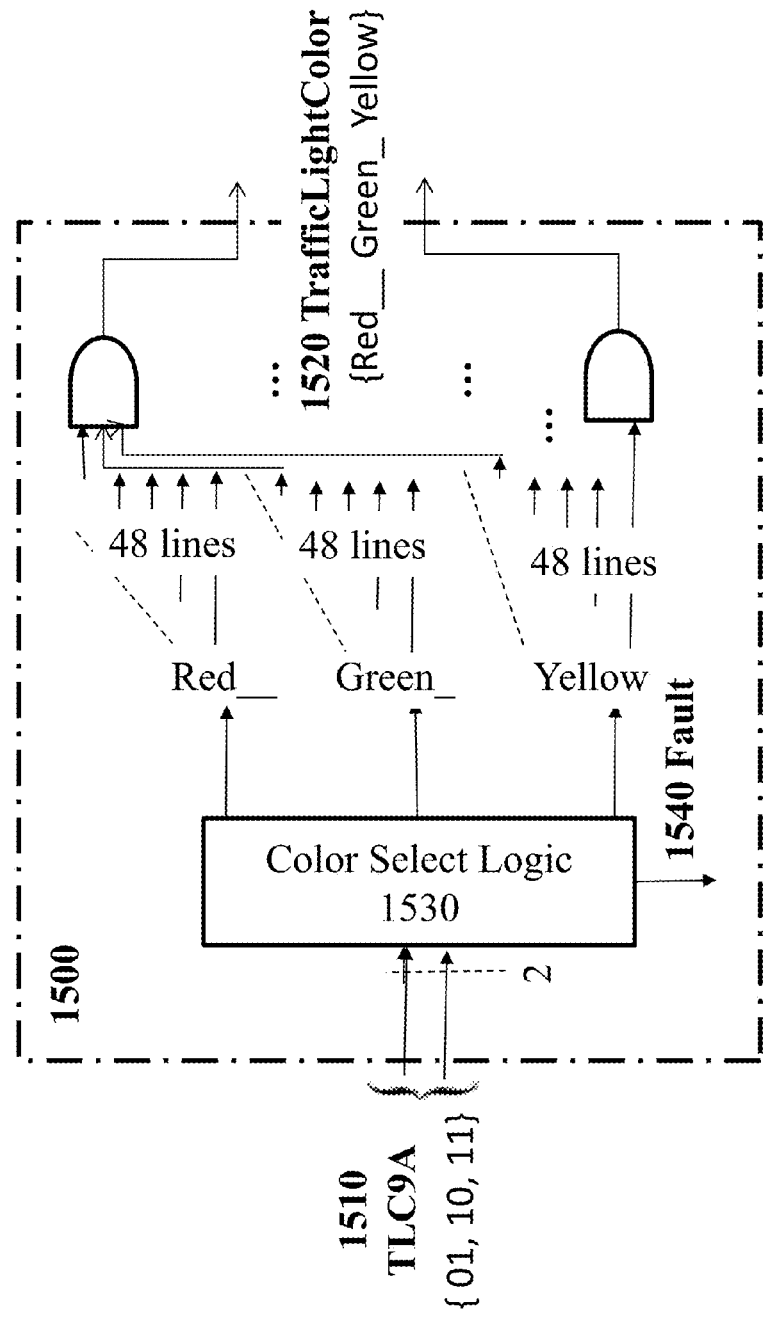
FIG. 15 illustrates example DUPPL machine circuitry for realizing a light color arrow that maps a compact TLC symbol to a verbose TLC symbol.

FIG. 15, Circuits of a Light Color Arrow

FIG. 15 illustrates example DUPPL machine circuitry for realizing a light color arrow that maps a compact TLC symbol to a verbose TLC symbol. An alternative to augmenting domain TLC 1410 with a value 'Null' at 1440 is illustrated in FIG. 15. A light color transformation arrow 1500 may map a compactly coded TLC symbol at 1510 to one of exactly three verbose TLC symbols at 1520. The occurrence of a symbol '00' at 1510 may cause combinatorial circuits of Color Select Logic at 1530 to energize a fault line 1540 of circuits that may transfer a fixed symbol '(Fault TLC9A)' to a fault management circuitry 180.

Figure 16:
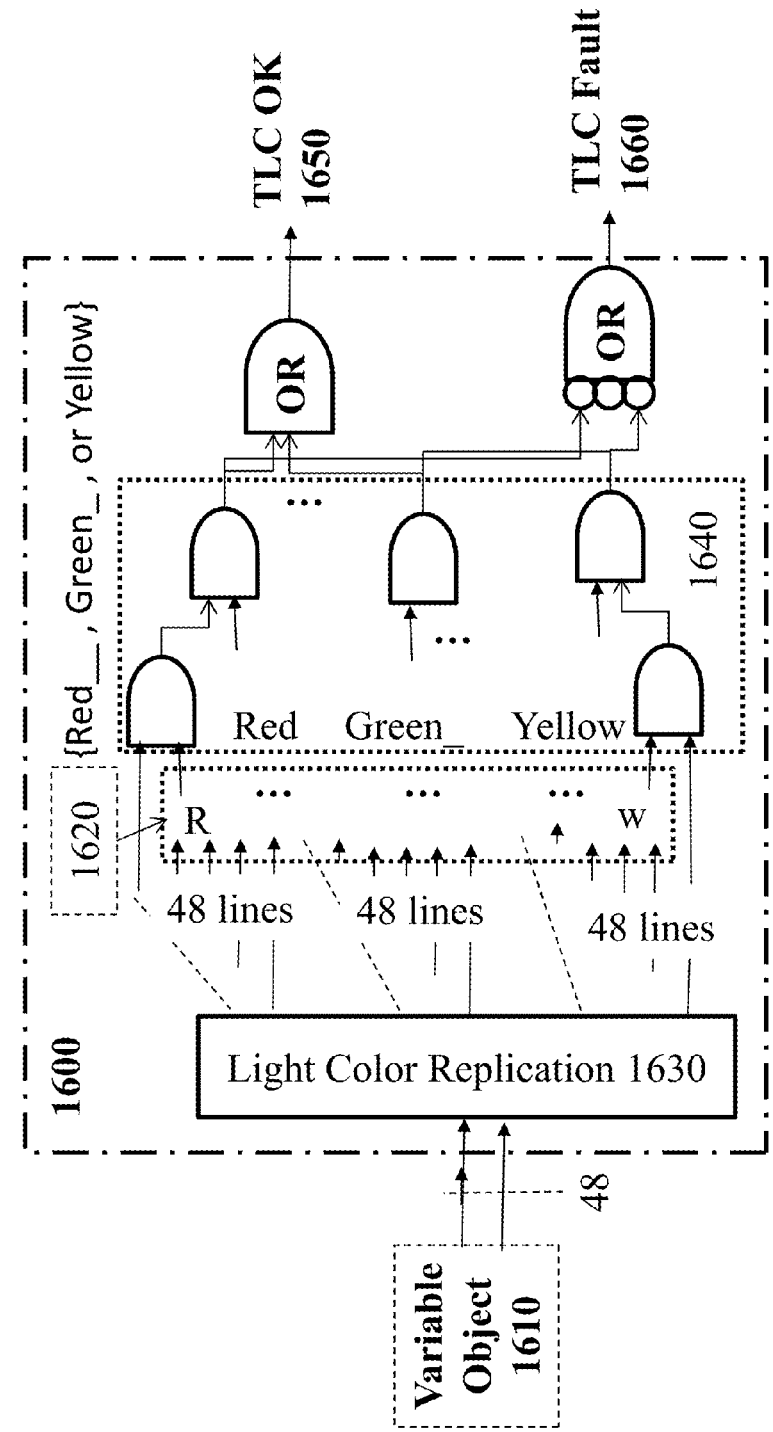
FIG. 16 illustrates example DUPPL machine circuitry for realizing a TLC Domain arrow that tests a 48 bit symbol for traffic light colors.

FIG. 16, Circuits of a TLC Domain Arrow

FIG. 16 illustrates example DUPPL machine circuitry for realizing a TLC domain arrow that tests a 48 bit symbol for traffic light colors. A TLC map 1440 or a TLC arrow 1500 may transfer 48 bits of light color to a variable object of a memory block 1610. FIG. 16, shows a TLC Domain validation arrow that may test a 48 bit symbol for membership in a TLC Domain. Domain validation arrow 1600 may embed within itself at 1620 a complete textual form of a TLC Domain, in the example of the figure, comprising each of the letters of a TLC Domain, 'Red_', 'Green_', and 'Yellow'. A set of 48 lines from a variable object of a memory block 1610 may be replicated by a combinatorial circuit for light color replication 1630. Three sets of 48 lines may impinge on constants 'Red_', 'Green_' and 'Yellow' 1620. Lines from replicator 1630 may impinge on comparator gates 1640 to form decisions at 1650 or 1660. Complete agreement of all lines with a color 1620 may result in a signal 1650 indicating that variable object 1610 conforms to the TLC domain. Disagreement may result in a signal 1660 that may transfer a Fault symbol to fault management circuitry 180 of FIG. 1. A variable object 1610 may be validated as containing a valid symbol of a TLC domain 1620. Alternatively, a failure to exactly match a color of a TLC domain may cause a TLC fault signal 1660 for a variable object of memory block 1610.

Figure 17:
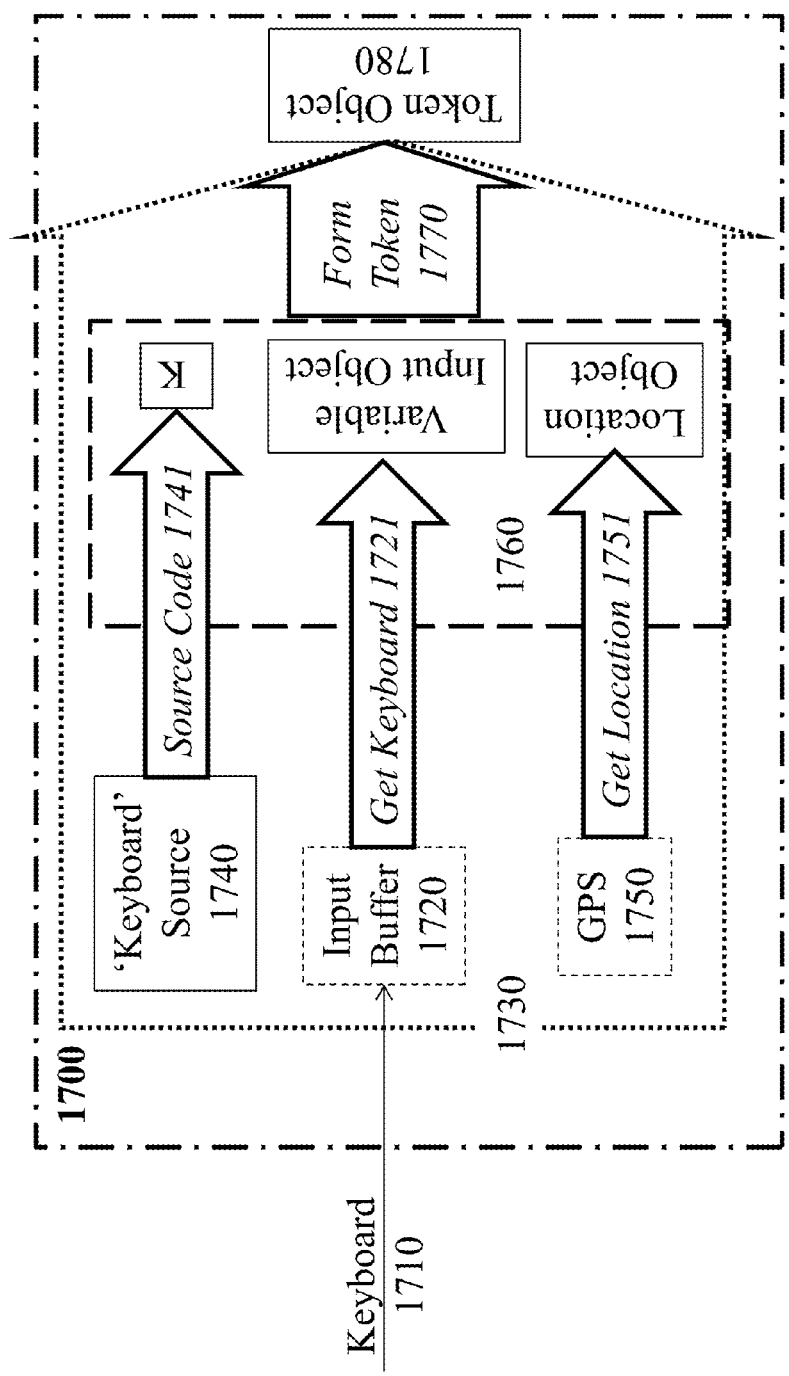
FIG. 17 illustrates example DUPPL machine circuitry for forming tokens from received keyboard input that may be used, for example, by a DUPPL machine implementing a spreadsheet application.

FIG. 17, a Token Formation Circuit

FIG. 17 illustrates example DUPPL machine circuitry for forming tokens from received keyboard input that may be used, for example, by a DUPPL machine that implements a spreadsheet application. A source input keyboard 1710 may provide keystroke signals to a variable object termed an input buffer of a memory block 1720 of a keyboard token arrow circuit 1730. A fixed source designator 'Keyboard' 1740 may be embodied into fixed circuits of a keyboard token arrow 1730. A textual designator 'Keyboard' 1740 may be mapped via a source code arrow of a pipe circuit 1741 to a compact source code symbol 'K' of circuits 1760 suited for inclusion of compact text in a domain-specific token.

In parallel with pipe circuit 1741, a Get Keyboard arrow realized in a pipe circuit 1721 may map an Input Buffer object of a memory block 1720 to a Variable Input Object of memory block circuits 1760. A Get Location arrow realized in a pipe circuit 1751 may map data from a global positioning system (GPS) satellite receiver of a memory block 1750 to a Location Object of memory circuits 1760. A collection of fixed and variable objects 1760 may form a Keyboard Domain K={['K.0'] ['K'] [(Input Object)] [(Location Object)]['K.1']}. A token formation arrow of a pipe circuit 1770 may map objects of a Keyboard Domain K of memory circuits 1760 to a token symbol of a variable Token Object of memory block 1780. A complete, consistent set of arrows realized in pipes 1721, 1741, and 1751 may comprise an input arrow of a parallel pipeline 1730 for token formation.

For a source or input arrow 1700, there may be a destination, e.g. memory block 110. There may be parallel pipelines performing information processing leading to an output arrow, ingesting resulting tokens from an output memory block 170 of FIG. 1 for destination media via circuits 102. There may be an output arrow for a multimedia destination, such as a speaker arrow for speech; a camera arrow for video; a mouse pointer arrow for position of a pointer; actuator arrows for control of computer-controlled hardware; and other output arrows for a given application.

Figure 18:
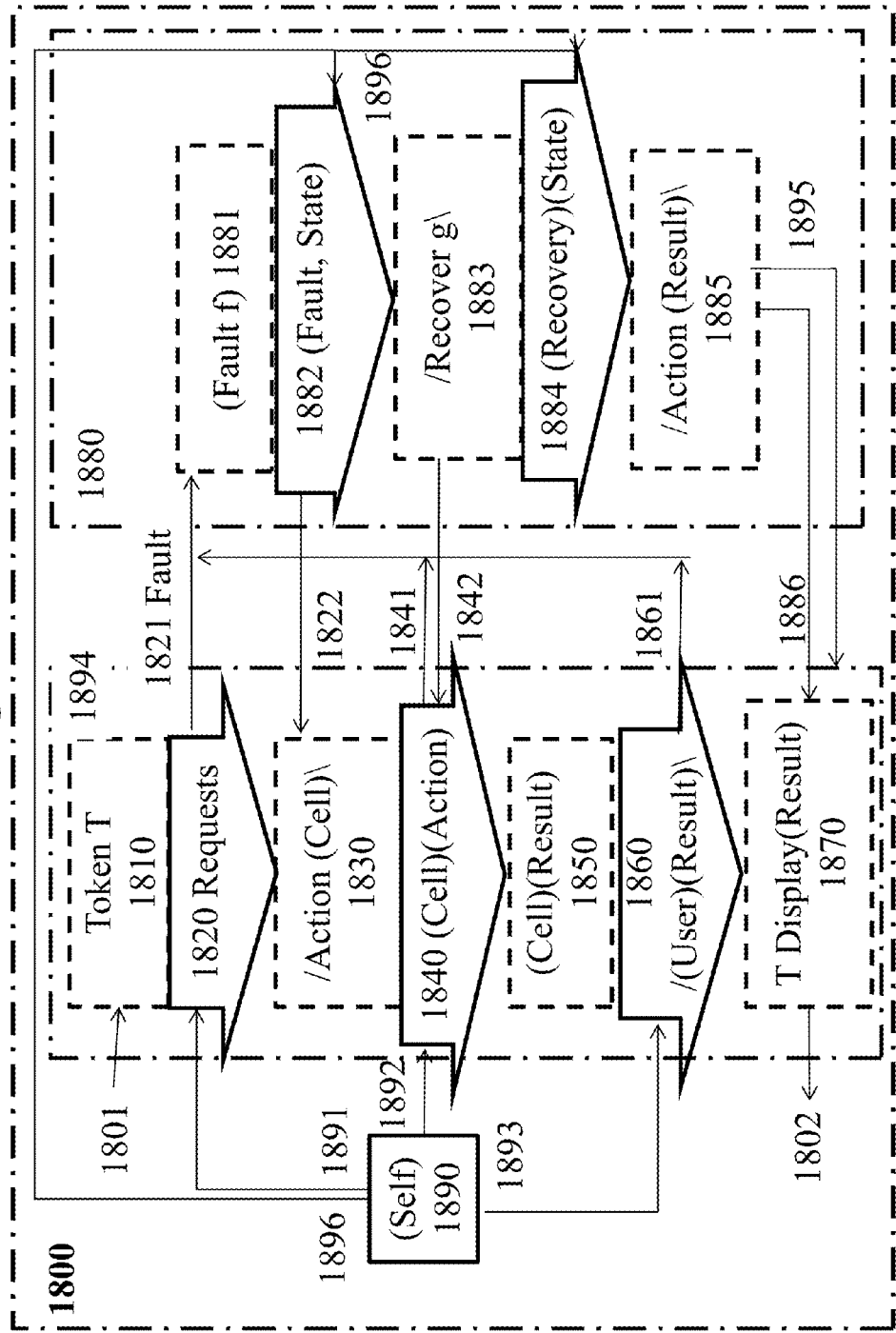
FIG. 18 illustrates example DUPPL machine circuitry for a DUPPL machine providing a spreadsheet application.

FIG. 18, a DUPPL Machine DM1

FIG. 18 illustrates example application-specific DUPPL machine circuitry, DM1, for a DUPPL machine providing a spreadsheet application. DM1 1800 of the illustrated example may result from, for example, applying the method of FIG. 9 to a spreadsheet application (such as spreadsheet of FIGS. 10 and 11). DM1 may comprise a multiplicity of circuits, (circuits 1200-1700 of FIGS. 12-17 provide examples of the types of circuits that may be used within DUPPL machine 1800). DM1 1800 may have core application circuitry 1894 according to a structure similar to circuitry 194 of FIG. 1, and a fault recovery circuitry 1880 according to a structure similar to circuitry 180 of FIG. 1. DM1 may have a (Self) 1890 that is self-descriptive according to a structure similar to 190 of FIG. 1 and (Self) 1890 may employ a notation similar to the example shown in FIG. 2.

At port 1801 an input arrow may generate tokens input to DM1 at memory block 1810. Token symbols T at memory block 1810 may be validated as application-specific requests to DM1 by a parallel pipeline 1820 realizing a Requests arrow, yielding either an annotated token at a memory block 1830 or a fault token via circuit 1821. An annotated token 1830 may employ a symbol /Action (Cell)\, employing notation of FIG. 2. Such a token then may be interpreted by a (Cell)(Action) arrow of parallel pipelines 1840 to perform a given /Action\ on a specified (Cell). Such an /Action\, for example, may include data entry, such as a symbol "/Set CB.8D=$25.00\" that may request that DM1 /set\ the symbol at cell '8D' of an example check book domain CB to a symbol '$25.00'. In another example, an alternate action symbol "/set TLC.8D=Green\" at memory block 1830 may request DM1 to /set\ a traffic light color at a street intersection of a cell '8D' in a domain TLC to a value 'Green'.

A DUPPL machine DM1 for JJJ at NewCo as an exemplar may incorporate within its core application machine 1894 circuits for three spreadsheets, each consisting of 2600 cells in 100 rows of 26 columns, with such cells embedded in a (Cell) (Action) arrow of parallel pipelines 1840. Within such a parallel pipeline 2600 such cells may interact with tokens that may embody Requests, validated by parallel pipeline 1820 to perform an /Action\ on a (Cell).

Such cells embedded in parallel pipeline 1840 may comprise three spreadsheets of the example of FIG. 10 and FIG. 11, i.e. one spreadsheet for keeping a checkbook of a checkbook domain CB, one spreadsheet for keeping timecards of a time card domain, and one spreadsheet for keeping status of traffic lights of a traffic light colors domain TLC. Spreadsheets of DM1 may total 7800 cells similarly constructed of circuits having a memory block holding a variable object with a fixed address circuit expressing a symbolic addresses reachable e.g. via a conveyor belt of parallel pipeline circuits 1840.

A (Self) description 1890 may authorize access to a domain by a user JJJ. A (Self) description 1890 may include a symbol '(Users [JJJ /write (CB.(X)D)\ (X [amounts (6, 7, . . . 99)])\' that may be mapped to verbose English "Users include JJJ. JJJ may write to the Check Book spreadsheet. JJJ may write amounts into cells 6D and 7D through 99D." A symbol '(Users [JJJ /read (CB.(X)D)\ (X [amounts (6, 7, . . . 99)])\' of (Self) 1890 may describe circuits of pipes containing token validation arrows associated with cells CB.6D, CB.7D, . . . CB.99D authorizing JJJ to read such cells of such a checkbook spreadsheet.

A user JJJ may interact with three spreadsheets of DM1 via parallel pipelines 1840, the (cells) of which may be distributed throughout ASICs, FPGAs, optical circuits, or other hardware of a DM1. Each cell may be accessed via tokens flowing on a conveyor belt of parallel pipeline circuits 1840. A memory block containing a cell may be isolated from other cells. Each cell may have in proximity and dedicated to it, pipes of form 740, 750, 760, and 780 as well as circuits of conveyor belt 800. Thus, there may be 7800 Cells, each with variable object, fixed label, and token object circuits; and with a multiplicity of pipe-segment circuits. Each such cell may have a constant designator, 1A, 1B, through 99Z by which a conveyor belt 800 at 1820 may map a token T at 1810 to a variable object 1830 for interaction with such Cells at 1840 of a circuit according to FIG. 7.

Parallel pipeline circuits 1840 may yield resulting tokens T at memory blocks 1850. Such tokens may be validated by (User) (Result) validation pipes 1860 for a user JJJ according to (Self) description 190. Subsequently validated tokens of memory block 1870 may be presented to users via a multi-media output port 1802.

Within DM1 1800 there may be traffic light cells and associated pipes for traffic light control actions 1840. Such cells may incorporate circuits of a traffic light colors (TLC) domain. TLC domain circuits at such a TLC cell may comprise colors {Red, Green, Yellow} embed within a hierarchical parallel pipeline 1840. A TLC variable object may be comprised of two flip-flops and associated combinatorial logic of circuits 1840 by which a token may set such a variable to produce a resulting value at 1850. A verbose human readable representation of resulting tokens 1850 of a TLC domain may be expressed at 1870 by the action of parallel pipeline 1860. A verbose form may be displayed via an output arrow 1802.

Therefore, taking the above Figures as a whole, the structure of circuits 100, the detailed circuits of domain 300, domain arrows 120, 160, and 184, and maps 140, 182, and 600, may be realized in DM1 core circuit 1894, circuits of which may be clarified via specific circuit examples 1200-1700. Understanding such circuits and structure of circuits, one of nominal skill in the art may employ, e.g. industry standard VHDL to synthesize images for circuits realizing a core application machine 1894, e.g. via ASICs, FPGAs, and other hardware.

In FIG. 18, fault management circuits 1880 realize an application-specific example of fault management circuitry 180 of FIG. 1. A fault symbol (Fault f) may enter circuits 1880 via circuits 1821, 1841, or 1861 for temporary storage at a memory block 1881. A fault recovery arrow (Fault, State) may be realized in a parallel pipeline circuit 1882. Such a parallel pipeline may result in a symbol /Recover g\ for temporary storage at a memory block 1883. Such a symbol g of a recovery domain G may be validated by a (Recovery) (State) arrow realized in parallel pipelines 1884. A resulting action may generate a response symbol /Action (Result)\ that may be stored temporarily at a memory block 1885 for delivery via circuits 1886 to core application machine 1894 for temporary storage in memory block 1870 for display via circuits 1802. Within parallel pipelines 1882 and 1884, fault management circuits may embody fault management domains comprising (1) a sub-domain expressive of faults for which a specific response may be known; (2) a sub-domain expressive of faults for which the (Self) may provide a solution that a fault management circuitry may construct with resources available and as authorized for self-guided fault recovery; (3) a sub-domain expressive of faults for which user interactive machine learning may be employed; (4) a sub-domain expressive of faults for which there is no recovery mechanism; and (5) a sub-domain expressive of an accumulation of changes of state of fault management circuitry that may precipitate a self-reconfiguration.

Figure 19:
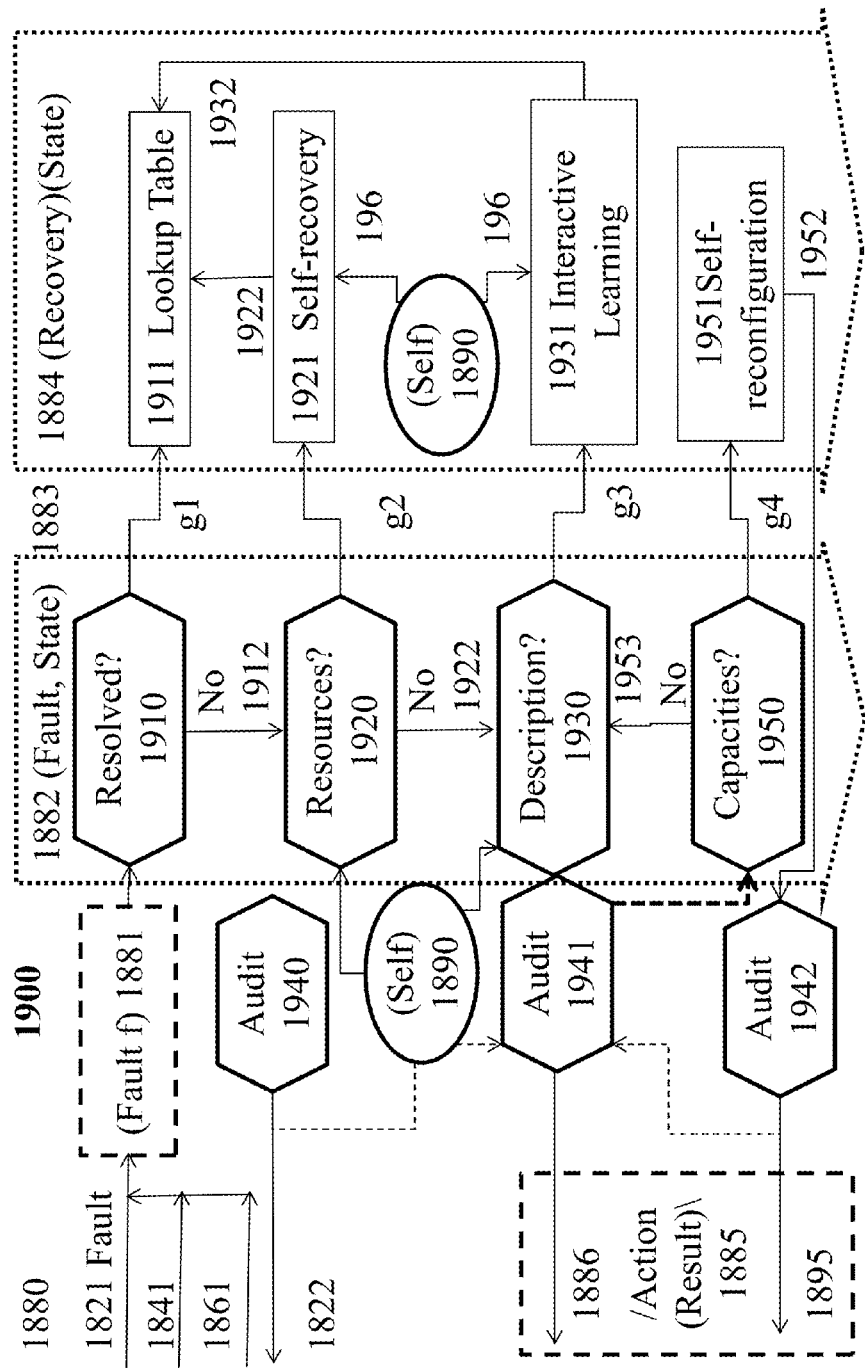
FIG. 19 illustrates an example logic flow of fault management circuitry.

FIG. 19, Fault Management

FIG. 19 illustrates an example fault management circuitry of parallel pipelines 1882 and 1884. Circuits 1910-1950 may determine applicable fault management capabilities, while circuits 1911-1951 may realize fault recovery.

Specifically in FIG. 19, circuits 1821, 1841, or 1861 may convey a symbol '(Fault f)' representative of a fault. Such a symbol may become the value of a variable object of a memory block 1881 of FIG. 19. A symbol for a (Fault f) held in a memory block 1881 may be examined by a circuit 1910 that may be a hidden map of arrow 1882. Circuit 1910 may pair fault f with a lookup table circuit 1911 based on whether logic circuits 1910 find f in lookup table 1911. If a fault f may be paired with lookup table 1911 for resolution, then circuits 1910 may convey a symbol (Fault f) to lookup table circuits 1911. If fault f is not found in lookup table 1911, the logic of circuits 1910 may initiate a further examination via circuits 1920.

A circuit 1920 may compare a fault f of a symbol (Fault f) of memory block 1881 with a (Self) description at 1890. A (Self) may incorporate descriptive expressions of FIG. 2 according to which a test 1920 may find a fault f within (Self) that may resolve f. If f is found in (Self) then a further test for "Resources?" of circuits 1920 may examine the state of a self-recovery circuit 1921 for sufficient self-recovery resources to recover from fault f according to self-description 1890. If resources 1921 may be sufficient for a recovery from f as specified in (Self), then circuits 1920 of arrow 1882 may map f via circuit g2 to fault recovery circuit 1921, with flow of control directed to self-recovery 1921. If fault f does not occur in (Self) as a self-recovery fault or if sufficient resources for recovery from f are not available within self-recovery circuitry 1921, then circuits 1920 may transfer control to a further test 1930.

A fault management circuit 1930, a hidden arrow of (Fault, State) arrow 1882 may examine (Fault f) at memory block 1991 further. Circuit 1930 realizing a "Description?" arrow may initiate circuits 1896 to examine (Self) description 1890 to test whether fault f may be resolved via interaction with a (User). If "Description?" test of circuits 1930 finds fault f in (Self) as a fault resolvable via interaction, then circuits 1930 may transfer control to fault recovery circuits 1931 for interactive learning. If interactive learning for (Fault f) of memory block 1881 is not available in (Self) description 1890 or if interactive learning circuitry 1931 is unavailable, then no further tests may be available. Thus recovery may not be possible. Circuits 1930 may energize audit circuits 1941 to record such a failure and to generate a symbol that may advise a (User) via circuits 1886 regarding fault g and of DM1's inability to recover from such a fault. In addition, an Audit map 1941 may incorporate circuits of variable objects and pipes by which to record failure at 1930, retaining such symbols as may establish thresholds for self-reconfiguration. Audit maps 1940 and 1941 may incorporate circuits of variable objects and pipes by which to record success at 1911, 1921, and 1931, retaining such symbols as may establish thresholds for self-reconfiguration. Audit map 1941 may record reconfigurations made by an Audit map 1942, retaining such symbols as may establish thresholds for further self-reconfiguration via circuits 1951, including reverting from an ineffective self-reconfiguration as explained further in conjunction with FIG. 23.

Figure 20:
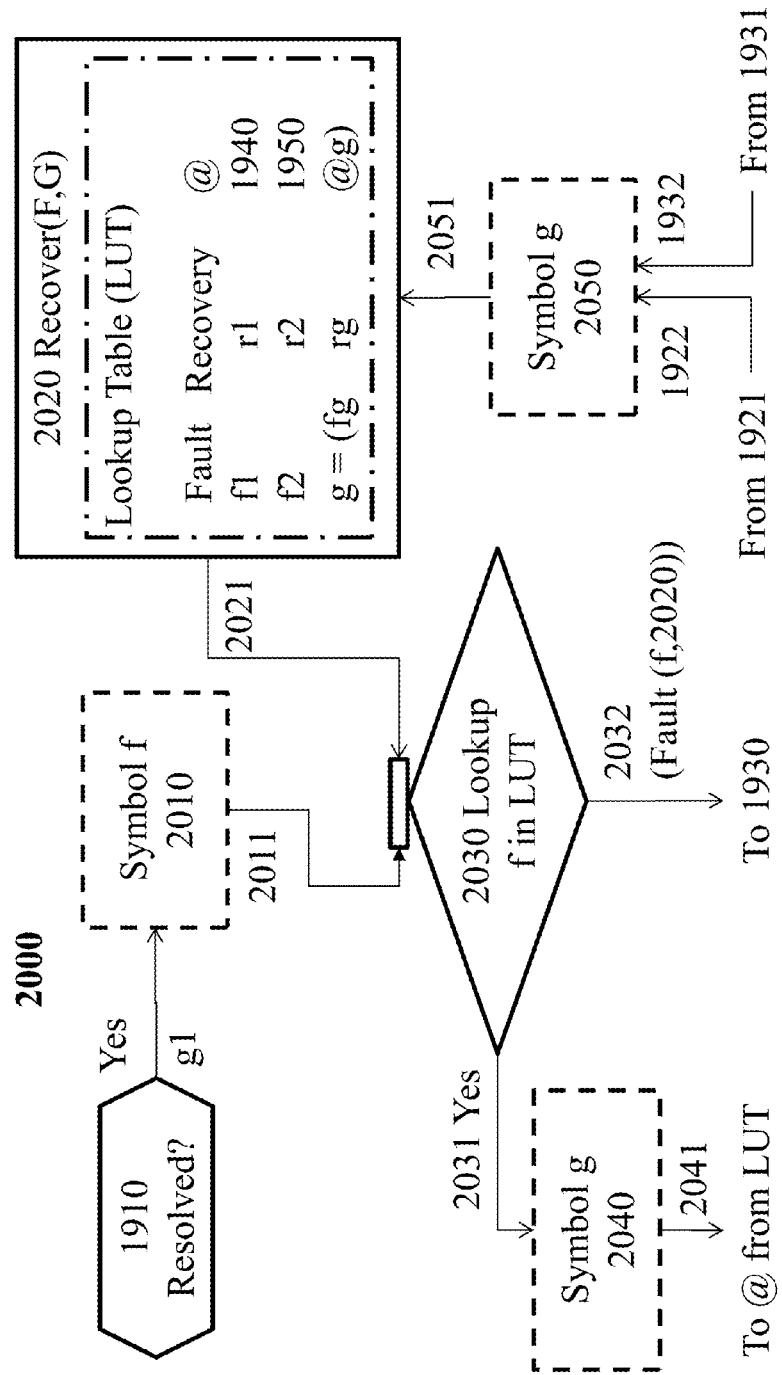
FIG. 20 illustrates an example block diagram of recovery from determined faults.

FIG. 20, Determined Fault Recovery

FIG. 20 illustrates example DUPPL machine circuitry for recovering from determined faults. A lookup table 1911 may employ recovery circuitry and logic illustrated in greater detail in FIG. 20. A lookup table 2020 may contain a row for each determined fault f1, f2, . . . fNF, according to a row pattern g=(fg, rg, @g), where g may be a symbol of a fault domain G; fg may be a symbol for a fault f; rg may be a symbol for an associated response to f; and @g may specify a circuit by which response rg may be provided to core circuits 1894 for use at the same time retaining an audit trail. A path @g may deliver a response r1 to circuits 1842 via an Audit map 1940 as shown for response r1 to fault f1 in row 1 of lookup table 2020.

A symbol f for a fault f1 presented at memory block 2010 may signify that a token T at 1810 comprises a request that is not a member of a Requests domain. Such a fault may have been successfully resolved previously. In such a case, three variable objects of lookup table 2020 may comprise a row (f1, r1, (Self [1940])). For example, a prior attempt of user JJJ to enter an expression '2^3' into a cell 5G may have been resolved as having a value '8'. A subsequent occurrence of '2^3' within a fault f at memory block 2010 may appear as a (Fault '2^3' in token T). A test 1910 "Resolved?" may identify a row of lookup table 2020 that may contain ('2^3' '8' '(1940[1822])'). Lookup table circuitry 2020 may transfer a response '8' to circuits '1822' via Audit map 1940. Audit map 1940 may insert '8' into an offending token T at '2^3' forming a revised token T8 provided via circuit 1822 to memory block 1830 that no longer makes an invalid request. Such simple direct substitution exemplifies a finite state substitution process of lookup table 2020 that effectively resolves such a fault.

Figure 21:
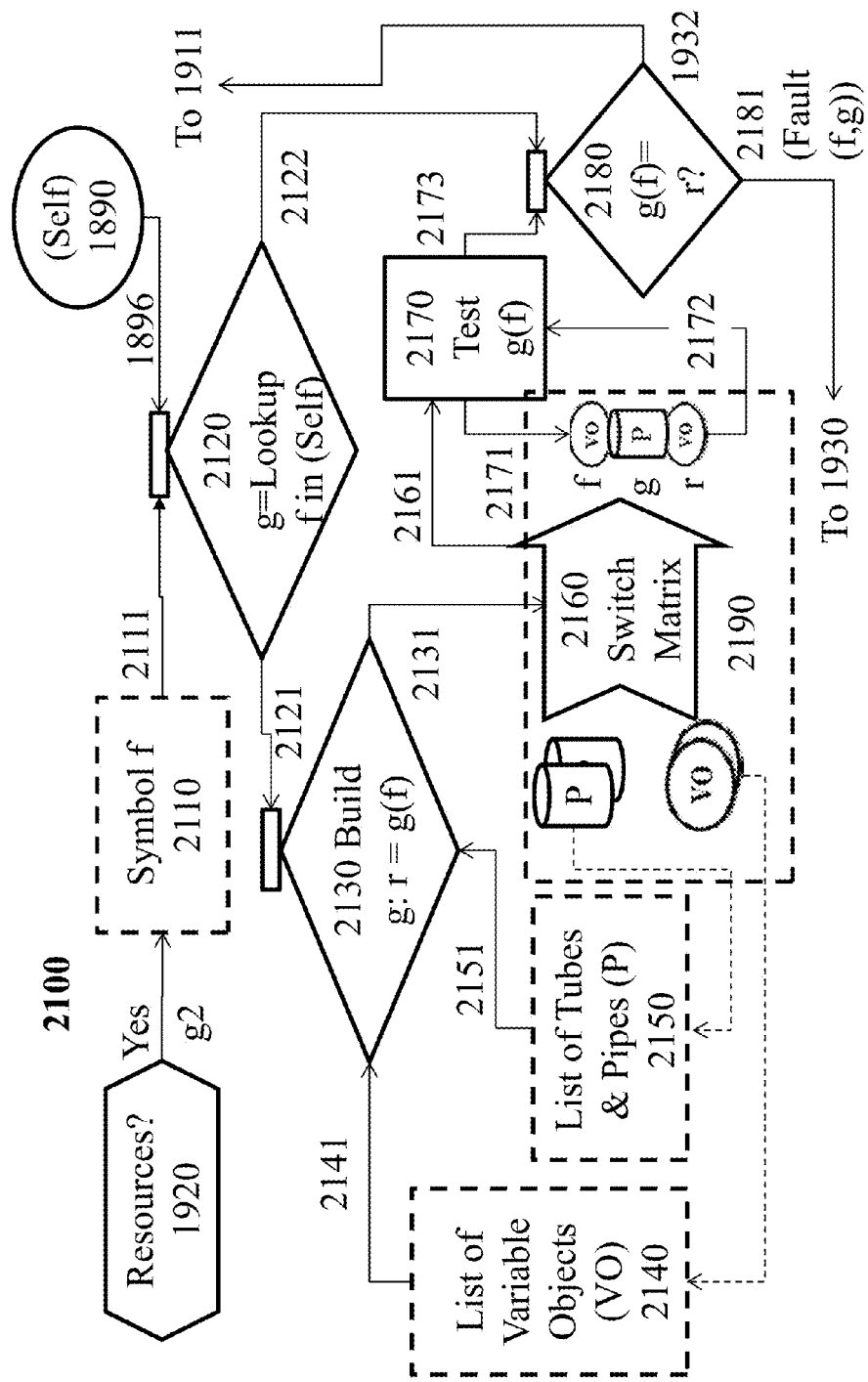
FIG. 21 illustrates an example block diagram of self-guided fault recovery.

FIG. 21, Self-Guided Fault Recovery

FIG. 21 illustrates example DUPPL machine circuitry for self-guided recovery from a fault. A self-recovery circuit 1921 may be comprised of circuits 2100. A transfer of control from a circuit 1920 may result in the occurrence of a symbol '(Fault f)' at memory block 2110 of FIG. 21. Such a fault may be described in a (Self) description 1890. A symbol g of a recovery method may be looked up from (Self) 1890 via circuits 1896. A recovery symbol g may specify circuits of variable objects (VO), pipes (P), and a switch matrix by which to interconnect such objects and pipes in to circuits for action /g\ according to symbol g. There may be circuits 2190 such that a configuration /g\ may act on a fault f to yield a response r, noted briefly as r=g(f). Pipes (P) may embody circuits realizing common maps of core applications circuits 1894, or that may have been listed in the process of FIG. 9 as potentially useful in fault recovery. Such circuitry 2190 may be configured by circuits 2130 via lines 2131 to configure circuits of switch matrix, VO, and P (resources') as temporary circuitry 2190 to recover from such a fault by performing /g(f)\ providing a result r to a test circuit 2170. Success of recovery circuit 2180 may transfer a new line (f, g(f), [1940]) to lookup table 1911 via circuits 1932.

In a given spreadsheet application, for example, a user may have entered an expression into a cell expressing a symbol '2^3' for exponentiation, e.g. at a cell 5G of token T. There may be no pipe '^' in maps of parallel pipeline 1840, e.g. if such an operation had not been considered relevant to such a spreadsheet application. A fault management circuit 2120 may access a (Self) description 1890 to find an exponentiation action /A\ in notation of FIG. 2. Circuitry 2120 may find such an expression that may describe circuits for performing action /^\, e.g. according to a symbol g=/^\ {(exponentiation '(x)^(y)') ({[number [x](x)] [number [y] (y)] {V1=/sequence [1][(y)]\} {V2=V1.each {v|v=(x)} {V3=V2.*} {b=V3}\)\. According to notation of FIG. 2, such a symbol may be read "To take an action named exponentiation, symbolically "(x)^(y)", configure a machine that first forms a text thing (x) to the left of '^' and a text thing (y) to the right of '^'; input y to a /sequence\ pipe mapping y to a variable object V1; input V1 to a V1.each machine that maps a composite variable object V1 to a multiplicity of y objects V1.1, V1.2, . . . V2.y; map each V1.j to a pipe x containing object (x) the output domain of which is V2; multiply each object of V2 times its adjacent object; map the product to domain V3; map singleton domain V3 to symbol (b), forming a machine /^\ for mapping a symbol '(x)^(y)' to b of a domain of numbers expressed in text form."

A fault recovery circuit 2160 may have variable objects and pipes that it may configure according to action /^\ noted in a (Self) description 190. There may be constraints of such a (Self) that may limit the numbers and types of resources of circuitry 2190 may be available for self-recovery. If not prohibited by constraints, a machine g(f)=/(x)^(y)\ may be formed via switch 2160 configuring variable objects V1, V2, and V3 listed at 2140 with pipes listed at 2150 for multiplication /*\ according to the symbol g at 2130. Such a temporary machine g(f) may compute 2^3 yielding text symbol '8' as resultant 2172. Self-recovery circuits 2180 may map fault f and result r to a row of lookup table 1911, e.g., as a new row ('2^3', 8, [1822]), completing fault management via self-recovery. Failure of circuits 2100 may transfer control outside of circuits 2100 to circuits 1930.

Figure 22:
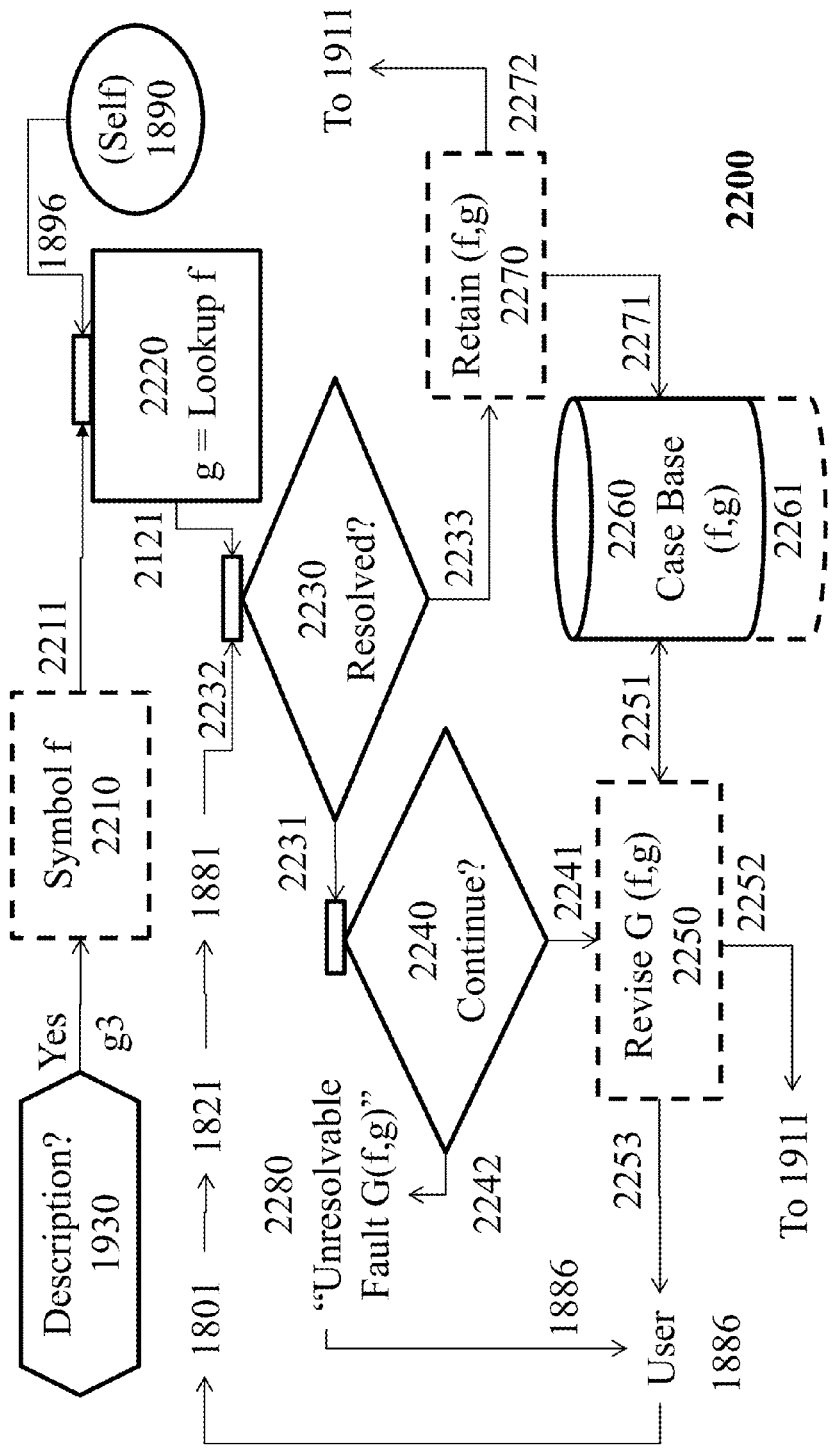
FIG. 22 illustrates an example block diagram of autonomous learning.

FIG. 22, Autonomous Learning

FIG. 22 illustrates example DUPPL machine circuitry for fault recovery via autonomous learning, e.g. via interacting with an external entity such as a user or such as another DUPPL machine. An interactive learning circuitry 1931 may be further explained with reference to FIG. 22. A symbol (Fault f) may occur at memory block 2210. Circuits 2220 may lookup fin a (Self) description 1890 via circuits 1896. A symbol g may specify [steps] of a {dialog path} for interactive fault resolution, e.g. via a {dialog} with a user. A circuit 2230 may apply symbol {g}. Initially, a fault f will be unresolved, resulting in a transfer of control from circuit 2230 to circuit 2240 that may determine whether to continue the dialog. Initially, the dialog has not yet begun, so circuits 2240 may lookup (f, g) in a case-base of fixed objects 2260. By applying a best match of case base 2260 to revise pair (f,g), a symbol may be formed in memory block 2250 via circuits 2240 to send such a symbol to a user, e.g. to display such a symbol via circuits 2253 to output port 1802. A user may respond via input port 1801 that may be transferred via fault path 1821 to be transferred via temporary path 1881 to circuits 2200, entering at port 2232. Circuits 2230 may compare user response to sub-symbols of {g}. If such a response resolves the fault, then control may be transferred at 2233 to a memory block 2270 to retain (f,g) in case base 2260, while transferring the response to lookup table 1911 as a new row (fg, rg, @g). That failing, a dialog may continue via 2240 until {dialog script g} may be exhausted at which point, circuits 2240 may report to the user that fault f is unresolvable via {g}. Otherwise, interactive machine learning may follow {user dialog g} via circuits 2240 to a successful fault response rg.

As an example, in a TLC spreadsheet application, a data communications input arrow from traffic lights may have introduced symbol '00' into a status message, e.g. for a cell 9X of token T. A token T may express a valid request to update the status of a cell 9X and thus may map T via pipe 1820 of FIG. 18 to /Action\ on a (Cell), e.g. /Update 9X=00\. A cell action 1840 may perform such an action generating value '00' of a variable object of a cell labeled '9X'. A results validation map may fail, causing a (Cell)(Action) fault at 1840 via circuits 1841 that may result in a (Fault Domain.TLC [9X(00)]) that may be mapped to English for a user as "There is a domain fault of a variable object labeled TLC9X. Value '00' is not an object of Domain TLC." Circuits 2220 may locate an expression regarding Domain.TLC from (Self) 1890 that may include a symbol (TLC {[TLC.0] [01 (Red)] [10 (Green)] [11 (Yellow)] [TLC.1]}) so that Domain.TLC has an object "Red" with code 01; an object Green with code 10; and an object, Yellow with code 01" but no match to a pattern ['00'(?)]. According to a mapping from notation 250 to English, such a result may be read "There is no object '00' in domain TLC."

Fault recovery circuitry 2240 may have variable objects and pipes that may express interactive learning such as case-based reasoning 2260. A response {g} at 2220 may specify a sequence of interactions with a human user. Such a path may comprise symbol g '{[explain] [analyze] [propose] [retrieve] [revise] [respond]}' according to notation of FIG. 2. Constraints of (Self) 1890 may limit interaction circuitry 2240 for interactive fault recovery, such as number of iterations. If not prohibited, circuitry 2240 may interact with a user according to g by configuring variable objects of memory blocks 2241 for user interaction.

A first step of {g} may be to [explain] according to which 2240 may express ((Fault Domain.TLC [9X(00)]) to a user via text: "There is no object '00' in domain TLC.". A user may enter (e.g., via a keyboard 1801) a symbol 2232 such as "Code '00' means that the traffic light is off." Such symbol may be provided to circuits 2230. An English language parser of circuits 2230 may [analyze] such a response synthesizing a symbol '(TLC {[TLC.0] [00 (off)] [TLC.0]})' by which a new object 'off' may become an object of Domain TLC. A circuit 2240 may then [propose] to a user via 2253 add such a state to Domain TLC. A positive user response may result in the addition of a new row at 1911 via circuits 2272 ((Fault Domain.TLC [?? (00)]) 1931, 1932). Accordingly, subsequent faults regarding traffic light status '00' may be directed to circuitry 1931.

Using case based reasoning (CBR), a prior case where code '00' was mapped by the user to a color that the user termed 'off' may be [retrieved], [revised] to apply to the current fault '00' so that circuitry 1931 may [respond] with 'off', such as by producing a variable object with a code (e.g., '00') that is indicative of 'off'. Following interactive learning, circuitry 1931 may more permanently map a TLC code (e.g., '00') to 'off' in lookup table 1911, transferring control of map 1884 to lookup table 1911 and delivering result 'off' to circuits 1882 via Audit map 1940 and completing fault management via interactive case-based learning.

Fault management circuitry 2240 may determine that symbol f is inconsistent in some way, such as the symbol 'This sentence is false,' which is a paradox. Such a fault may lead to the inclusion of a row ("This sentence is false" (inconsistent) 1940) in a lookup table at 1911 so that future occurrences of such a sentence may quickly yield a value of "inconsistent".

Variable maps of FIG. 22 may be acquired via methods other than case based reasoning, e.g. via other forms of machine learning and associative learning. Circuits 2230, 2240, and 1940-1942 may observe stimuli including user interaction over time, may form correlations via hardwired correlation processes, and may apply hardwired machine learning techniques such as neural networks, support vector machines, reinforcement learning, fuzzy logic, inductive inference and abductive inference. Learning may employ variable objects forming variable maps derived from learning processes. Learning may be hardwired to conform to bounds and constraints of a (Self) description.

Figure 23:
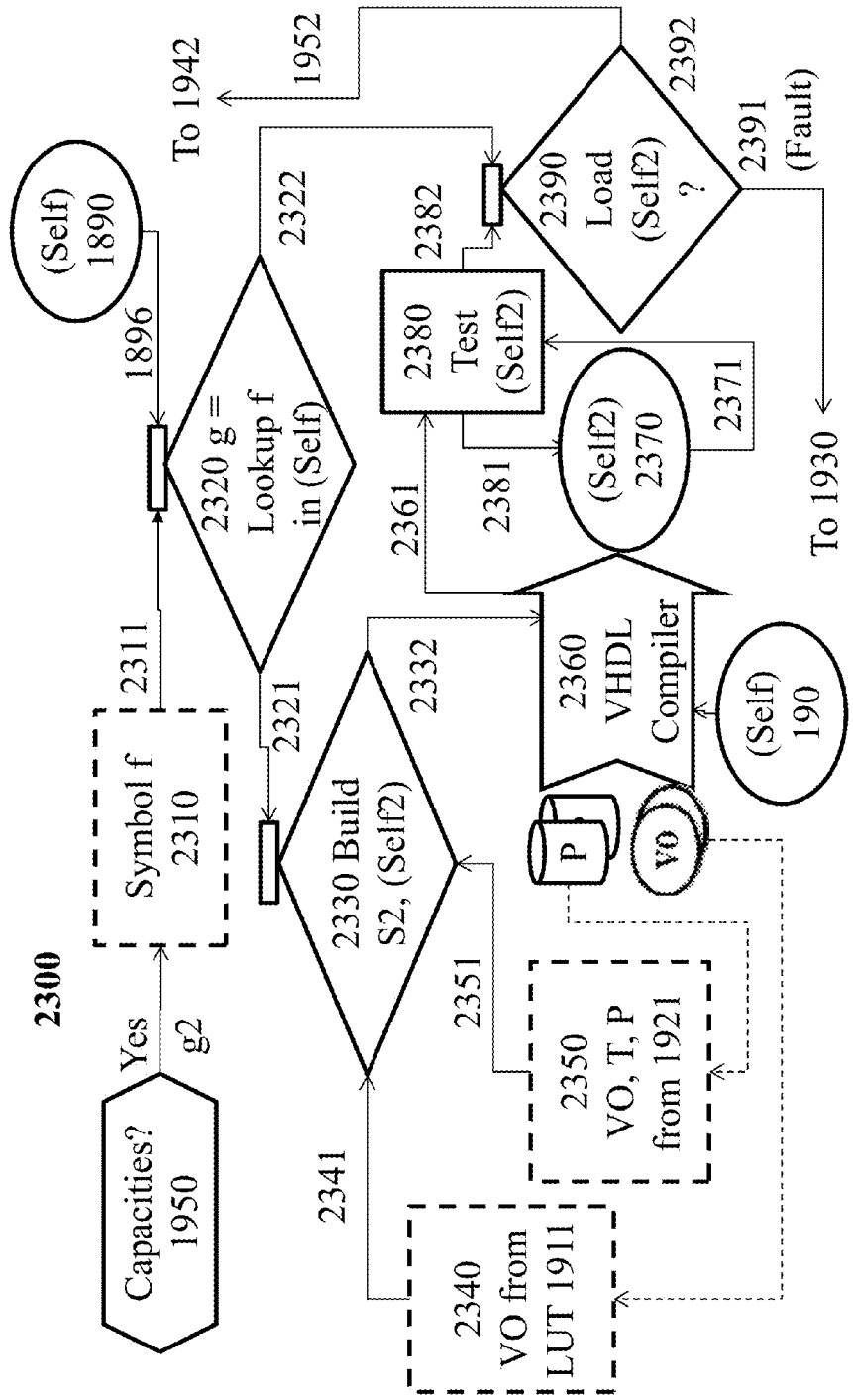
FIG. 23 illustrates an example block diagram of self-reconfiguration.

FIG. 23, Self-Reconfiguration

FIG. 23 illustrates example DUPPL machine circuitry for self-reconfiguration. An Audit map at 1941 may keep a tally of rows remaining in a lookup table 1911, of variable object and pipe resources remaining in a self-recovery object 1931, and of variable objects at 1931 remaining for case based reasoning for interactive learning. According to criteria compactly embodied in a (Self) description at 1890, an Audit map 1941 may initiate self-reconfiguration at 1951. Decision point 1950 may ascertain whether there may be sufficient reprogrammable resources for self-reconfiguration such as FPGA circuit space among the circuits of a DUPPL machine DM1. If there are no such resources, then Audit map 1941 may so indicate to a user via circuits 1886 of FIG. 19 expressing a symbol such as "Running out of capacity. Please call your supplier for a hardware update."

On the other hand, Audit map 1941 and Capacities test at 1950 may determine that there may be sufficient FPGA space for a self-reconfiguration at 1951. Such a self-reconfiguration may be realized via circuits 1951 more fully described in circuits 2300 of FIG. 23.

A fault symbol generated by an audit map 1941 may cause a test by circuits 1950 to generate a (Fault f) at memory block 2310. Circuits 2300 may respond to such a fault indicative of the need to reconfigure core machine 1894 of FIG. 18. Circuits 2320 may look up such a fault in a (Self) 1890 via circuits 1896. Circuits 2320 may determine that response g allows circuits 2330 to rebuild a core machine 1894, having symbol S (e.g. of an FPGA image) and a (Self) description 1890 into a new core machine S2 and a new self description (Self2) as illustrated in the circuit 2330. Circuits 2330 may map entries of a lookup table at 1911 from audit list 2340 and of temporary machines 1921 listed at 2350 to a new FPGA image v2370 via a VHDL complier 2360 that may be embodied within circuits 2300. A new (Self2) including a new core machine 1894 S2 may be tested via circuits 2380. If tests are successful then circuits 2390 may transfer {(Self2), S2} via audit circuits 1942 for installation via self-reconfiguration circuits 1895.

For example, in the above examples, a domain TLC lacking an object [00 'off'] at 1840 may be reconfigured at cells of spreadsheet TLC to include [00 'off'] as a member of domain TLC, fully integrated into circuits 1230, 1300 and comparable circuits at 1840. Thus, entries of rows at 1911 may become fixed objects of a reconfigured core applications machine 1894 via S2 at 2370. Similarly, temporary machines of self-recovery 1921 may become pipes of a reconfigured core applications machine 1894.

A fault management circuitry 1880 may incorporate variable objects and pipes at 1951 self-reconfiguration by which to map variable object into fixed objects and pipes of arrows according to circuits 980. DM1 1800 may embody in a (Self) description sufficient VHDL representing its core application circuitry 1894 so that self-reconfiguration circuitry 1951 may configure a reconfigured FPGA image. The reconfigured FPGA image may be uploaded to core application circuitry 1894 via circuits 1895 through an Audit map 1942.

Thus, a DUPPL machine DM1 1800 may fully realize core application circuitry 1894, with fault management circuitry 1880 that may incorporate efficient self-recovery, user-assisted recovery, and self-reconfiguration via circuits realized according to aspects described in connection with FIG. 19, and as further explained in FIGS. 20, 21, 22, and 23.

FIG. 24, a Conventional Mechanization of a Spreadsheet 1000

FIG. 24 illustrates how a conventional computer executes a spreadsheet application. Along the top of the figure at times T1, T2, etc., operating system (OS) and applications share a fixed set of instruction registers of a fixed number of CPUs. In contrast to a conventional computer, and as illustrated and described in the above examples, a DUPPL machine requires no such shared registers since each variable may be represented in its own variable object memory block and the value of the variable object may be constrained by domains hardcoded into the DUPPL machine.

Malware may infect random access memory (RAM) of a general purpose computer 2000. In contrast, a DUPPL machine retains information in the isolated memory blocks that cannot be randomly accessed. Indeed, the memory blocks of a DUPPL machine can only be accessed via hardcoded maps (e.g., pipelines) that perform validation checks on symbols as they are passed through the maps' circuitry. As a result of the validation, memory blocks may contain only validated results that satisfy the constraints of the hard-coded domains of the application being implemented in the DUPPL machine. Thus, the circuits of a DUPPL machine may prove much more resistant to software and network-based malware that uses RAM, and in some cases impervious to the types of malware that prey on computers having RAM.

The invention claimed is:

1. A domain-specific symbolic computing apparatus comprising:
   first circuitry configured to receive input via an interface;
   second circuitry configured to generate an input symbol based on the input;
   third circuitry configured to validate that a value of the input symbol is valid according to a first domain, wherein the first domain is one of a plurality of domains embedded into hardware of the domain-specific symbolic computing apparatus;
   fourth circuitry configured to generate an output symbol by mapping the input symbol from the first domain to a second domain of the plurality of domains;
   fifth circuitry configured to generate data based on the output symbol; and
   sixth circuitry configured to transmit the data to another apparatus.

2. The domain-specific symbolic computing apparatus of claim 1, wherein the domain-specific computing apparatus has no registers; no central processing unit (CPU); no Random Access Memory (RAM); no instruction registers; no Instruction Set Architecture (ISA); has no operating system (OS); and has no applications programming.

3. The domain-specific symbolic computing apparatus of claim 1, further comprising a first memory block configured to store the input symbol in a symbolic notation;
   a second memory block configured to store the output symbol in the symbolic notation; and
   seventh circuitry configured to validate that a value of the output symbol is valid according to the second domain.

4. The domain-specific symbolic computing apparatus of claim 1 further comprising semantically coded symbols that are self-referentially consistent.

5. The domain-specific symbolic computing apparatus of claim 1 further comprising semantically coded symbols that employ conversational human language; and
   seventh circuitry configured to:
      read, verify, validate, and interpret the semantically coded symbols,
      employ the semantically coded symbols when communicating with portions of the domain-specific symbolic computing apparatus, and
      employ the semantically coded symbols to generate an interactive dialog with users of the domain-specific symbolic computing apparatus.

6. The domain-specific symbolic computing apparatus of claim 1 further comprising:
   seventh circuitry configured to store a computational self-description of the domain-specific symbolic computing apparatus, wherein the computational self-description provides a description of what the domain-specific computing apparatus is configured to perform.

7. The domain-specific symbolic computing apparatus of claim 1 further comprising:
   seventh circuitry configured to reconfigure other circuitry of the domain-specific symbolic computing apparatus based on one or more forms of machine learning and interactions with a user.

8. The domain-specific symbolic computing apparatus of claim 1, further comprising:
   seventh circuitry configured to generate, based on one or more forms of machine learning, a field-programmable gate array (FPGA) image to reconfigure other circuitry of the domain-specific symbolic computing apparatus.

9. The domain-specific symbolic computing apparatus of claim 1 further comprising:
   seventh circuitry configured to reconfigure other circuitry of the domain-specific computing apparatus based on one or more faults generated by the other circuitry.

10. The domain-specific symbolic computing apparatus of claim 1,
    wherein the first circuitry, the second circuitry, the third circuitry, the fourth circuitry, the fifth circuitry and the sixth circuitry are embodied in one or more field-programmable gate arrays (FPGAs) or one or more application-specific integrated circuits (ASICs).

11. An apparatus, comprising:
    a plurality of memory blocks configured to store symbols of textual data;
    first circuitry configured as a plurality of domains that define valid textual data values of the symbols, wherein the plurality of domains is hardwired into the apparatus;
    second circuitry configured as a first pipe segment, wherein the first pipe segment includes combinatorial logic and is configured to, via its combinatorial logic, receive a symbol for mapping from a first memory block, validate that the textual data of the symbol for validating is valid according to one of the plurality of domains to generate a validated symbol, and output the validated symbol to a second memory block; and
    third circuitry configured as a second pipe segment, wherein the second pipe segment includes combinatorial logic and is configured to, via its combinatorial logic, receive a symbol for mapping from the second memory block, map the textual data of the symbol for mapping from a first of the plurality of domains to a second of the plurality of domains to generate a mapped symbol, and output the mapped symbol to a third memory block.

12. The apparatus of claim 11, further comprising self-description circuitry that provides a description of what the apparatus can and cannot perform, wherein the plurality of domains is hardwired in the self-description circuitry.

13. The apparatus of claim 11, wherein the plurality of memory blocks, the first circuitry, the second circuitry, and the third circuitry are embodied in one or more field-programmable gate arrays (FPGAs) or one or more application-specific integrated circuits (ASICs).

14. The apparatus of claim 11, wherein the plurality of memory blocks, the plurality of domains, the first pipe segment, and the second pipe segment are arranged to perform one or more designated functions related to a software application.

15. The apparatus of claim 11, further comprising reconfiguration circuitry configured to generate field-programmable gate array (FPGA) image based on a fault generated during operation of the apparatus.

16. A method comprising:
    receiving a definition of a function of an application to be implemented in an apparatus;
    determining a list of domains, a list of variable objects and a list of maps based on the definition;
    determining, based on the list of domains, domain validation pipe circuitry to produce a plurality of domain validation pipe circuits that are each configured to validate input as having a valid value according to at least one domain in the list of domains;

determining, based on the list of maps, domain manning pipe circuitry to produce a plurality of domain mapping pipe circuits that are each configured to man input between a first domain in the list of domains to a second domain in the list of domains;

determining, based on the list of variable objects, memory block circuitry to produce a plurality of memory block circuits, the plurality of memory block circuits being configured to (a) provide input to and receive output from the plurality of domain validation pipe circuits and (b) provide input to and receive output from the plurality of domain mapping pipe circuits; and implementing the plurality of domain validation pipe circuits, the plurality of domain mapping pipe circuits and the plurality of memory block circuits into the apparatus such that the apparatus is capable of performing the function.

17. The method of claim 16, wherein implementing the plurality of domain validation pipe circuits, the plurality of domain mapping pipe circuits and the plurality of memory block circuits includes:

converting the plurality of domain validation pipe circuits, the plurality of domain mapping circuits and the plurality of memory block circuits into a field programmable gate array (FPGA) image, and compiling the FPGA image into an FPGA.

18. The method of claim 16 further comprising:
determining a list of constraints based on the definition; and determining self-description circuitry based on the list of constraints, wherein the self-description circuitry defines what the apparatus is configured to perform and includes an identification of the application;

wherein implementing the plurality of domain validation pipe circuits, the plurality of domain mapping circuits and the plurality of memory block circuits further includes implementing the self-description circuitry into the apparatus.

19. The method of claim 16, wherein the plurality of domain validation pipe circuits includes a first pipe circuit that determines whether a textual symbol has a valid value according to a first domain from the list of domains; and wherein the plurality of domain mapping pipe circuits includes a second pipe circuit that maps the textual symbol from the first domain to a second domain from the list of domains.

20. The method of claim 19, wherein a first of the plurality of memory block circuits is configured to provide the textual symbol as input to the first pine circuit; and wherein a second of the plurality of memory block circuits is configured to receive the textual symbol as output from the first pine circuit and provide the textual symbol as input to the second pine circuit.

* * * * *

UNITED STATES PATENT AND TRADEMARK OFFICE
CERTIFICATE OF CORRECTION

| | | |
|---|---|---|
| PATENT NO. | : 9,519,804 B2 | Page 1 of 1 |
| APPLICATION NO. | : 13/799277 | |
| DATED | : December 13, 2016 | |
| INVENTOR(S) | : Mitola, III | |

It is certified that error appears in the above-identified patent and that said Letters Patent is hereby corrected as shown below:

On the Title Page

Item (71), Column 1, Applicant, Line 1:
Delete "Technologies" and insert --Technologies,--

Item (71), Column 1, Applicant, Line 2:
Delete "Augstine" and insert --Augustine--

Page 2, Column 1, under Other Publications, Line 9:
Delete "Wirtten" and insert --Written--

In the Claims

Column 49, Claim 16, Line 1:
Delete "manning" and insert --mapping--

Column 49, Claim 16, Line 3:
Delete "man" and insert --map--

Column 50, Claim 20, Line 22:
Delete "pine" and insert --pipe--

Column 50, Claim 20, Line 25:
Delete "pine" and insert --pipe--

Column 50, Claim 20, Line 26:
Delete "pine" and insert --pipe--

Signed and Sealed this
Twenty-fifth Day of April, 2017

Michelle K. Lee
*Director of the United States Patent and Trademark Office*